(12) United States Patent
Fukuda et al.

(10) Patent No.: US 8,335,287 B2
(45) Date of Patent: Dec. 18, 2012

(54) COMMUNICATION APPARATUS AND SIGNAL PROCESSING METHOD

(75) Inventors: Shinichi Fukuda, Kanagawa (JP); Akihiro Kikuchi, Chiba (JP)

(73) Assignee: Sony Corporation, Tokyo (JP)

( * ) Notice: Subject to any disclaimer, the term of this patent is extended or adjusted under 35 U.S.C. 154(b) by 463 days.

(21) Appl. No.: 12/623,557

(22) Filed: Nov. 23, 2009

(65) Prior Publication Data

US 2010/0128773 A1    May 27, 2010

(30) Foreign Application Priority Data

Nov. 21, 2008 (JP) ................................. 2008-297629
Jul. 16, 2009 (JP) ................................. 2009-167460

(51) Int. Cl.
*H04B 1/10* (2006.01)
(52) U.S. Cl. ........................................ 375/350; 375/343
(58) Field of Classification Search .................. 375/350, 375/343
See application file for complete search history.

(56) References Cited

U.S. PATENT DOCUMENTS

| | | | | |
|---|---|---|---|---|
| 5,077,742 A * | 12/1991 | Tsumura et al. | ............... | 714/748 |
| 5,150,400 A * | 9/1992 | Ukegawa | ................. | 379/100.17 |
| 5,351,134 A * | 9/1994 | Yaguchi et al. | ............... | 358/435 |
| 5,708,703 A * | 1/1998 | Nagaraj | ......................... | 379/340 |
| 5,787,118 A * | 7/1998 | Ueda | ............................. | 375/232 |
| 5,877,816 A * | 3/1999 | Kim | ............................. | 348/526 |
| 5,940,454 A * | 8/1999 | McNicol et al. | ............. | 375/347 |
| 6,356,598 B1 * | 3/2002 | Wang | ............................. | 375/321 |
| 6,449,002 B1 * | 9/2002 | Markman et al. | ............. | 348/21 |
| 6,765,956 B1 * | 7/2004 | Gatherer | ........................ | 375/222 |
| 7,724,816 B2 * | 5/2010 | Chen et al. | .................... | 375/231 |
| 7,751,502 B2 * | 7/2010 | Kwak et al. | ................... | 375/326 |
| 2002/0012391 A1 * | 1/2002 | Ahn | .............................. | 375/232 |
| 2002/0024995 A1 * | 2/2002 | Kim | .............................. | 375/231 |
| 2004/0156459 A1 * | 8/2004 | Kwon et al. | .................. | 375/350 |
| 2005/0286625 A1 * | 12/2005 | Jung | ............................. | 375/232 |
| 2008/0181292 A1 * | 7/2008 | Yang et al. | .................... | 375/232 |
| 2009/0274242 A1 * | 11/2009 | Kwon et al. | .................. | 375/295 |

FOREIGN PATENT DOCUMENTS

| | | |
|---|---|---|
| JP | SHO 61-167229 | 7/1986 |
| JP | HEI 10-056406 | 2/1998 |
| JP | HEI 11-039441 | 2/1999 |
| JP | 2000244777 A * | 9/2000 |
| JP | 2001-016032 | 1/2001 |
| JP | 2001-238372 | 8/2001 |
| JP | 2004-040675 | 2/2004 |
| JP | 2004-072666 | 3/2004 |

(Continued)

OTHER PUBLICATIONS

Oh, "Sparse equalizer using adaptive weight activation for fast start-up in ATSC DTV systems" IEEE Transactions on Consumer Electronics, vol. 52 , Issue: 1 Publication Year: 2006 , pp. 92-96.*

(Continued)

*Primary Examiner* — Juan A Torres
(74) *Attorney, Agent, or Firm* — K&L Gates LLP

(57) ABSTRACT

A communication apparatus includes a signal detector that detects incoming (i.e., receives) information from a signal received wirelessly. The signal detector includes a wave detector, an equalizer, and a detector. The wave detector accepts an incoming signal wherein information is modulated onto a carrier signal, analyzes the envelope variation of the incoming signal, and generates a detection signal containing the incoming information. The equalizer corrects the detection signal and outputs a corrected detection signal. The detector then detects the incoming information from the corrected detection signal.

13 Claims, 33 Drawing Sheets

FOREIGN PATENT DOCUMENTS

| | | |
|---|---|---|
| JP | 2006-238398 | 7/2006 |
| JP | 2007-065977 | 3/2007 |
| JP | 2008-027270 | 2/2008 |
| WO | 2008/114715 | 9/2008 |

OTHER PUBLICATIONS

Oh, "Equalizer with data recycling algorithm for fast convergence in 8-VSB DTV systems" Global Telecommunications Conference, 2003. GLOBECOM '03. IEEE vol. 6 Publication Year: 2003, pp. 3371-3375 vol. 6.*

Broadband NFC—A System Analysis for the Uplink, CSNDSP08, Proceedings pp. 292-296.

Japanese Office Action issued on Oct. 5, 2010 for corresponding Japanese Patent Application 2009-167460.

* cited by examiner

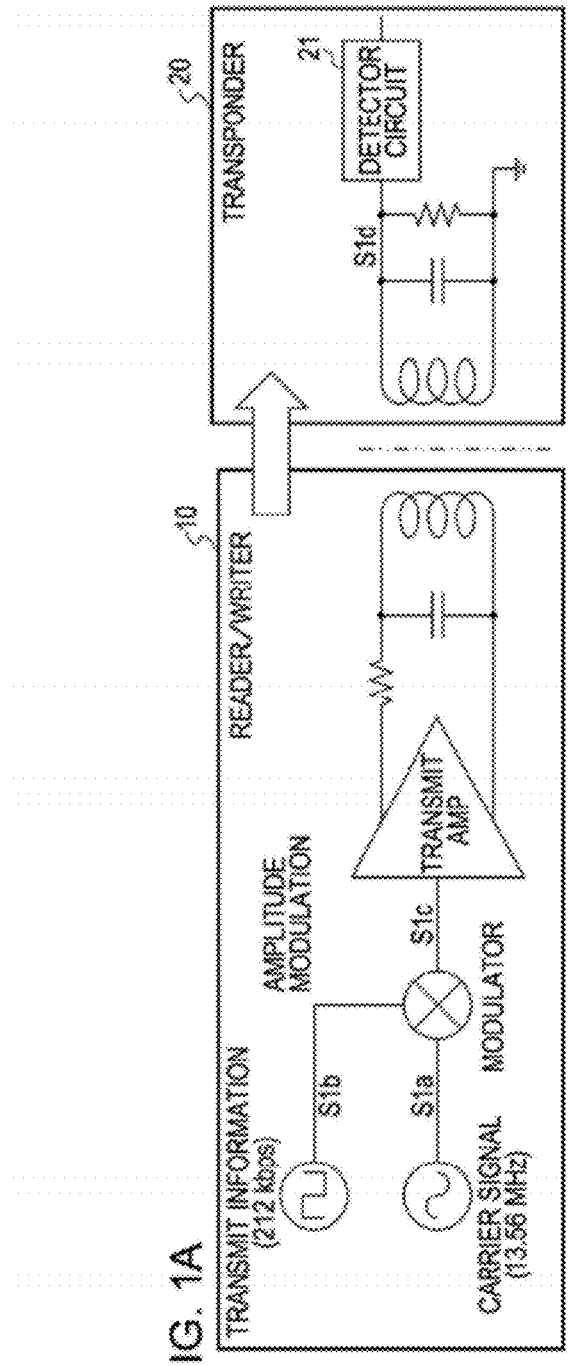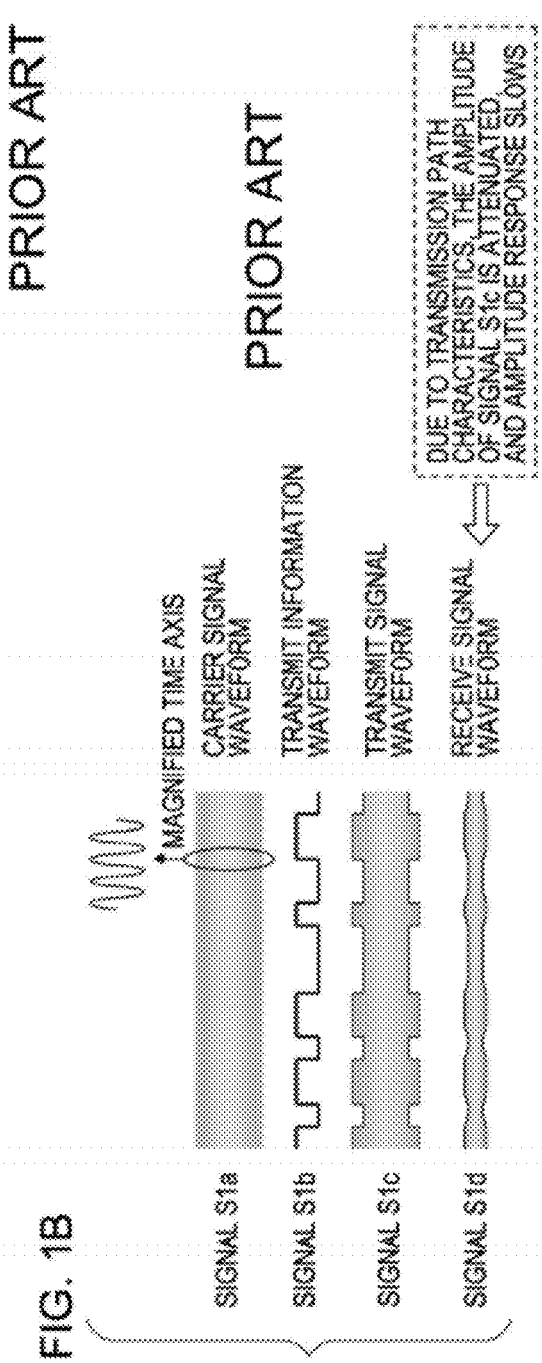

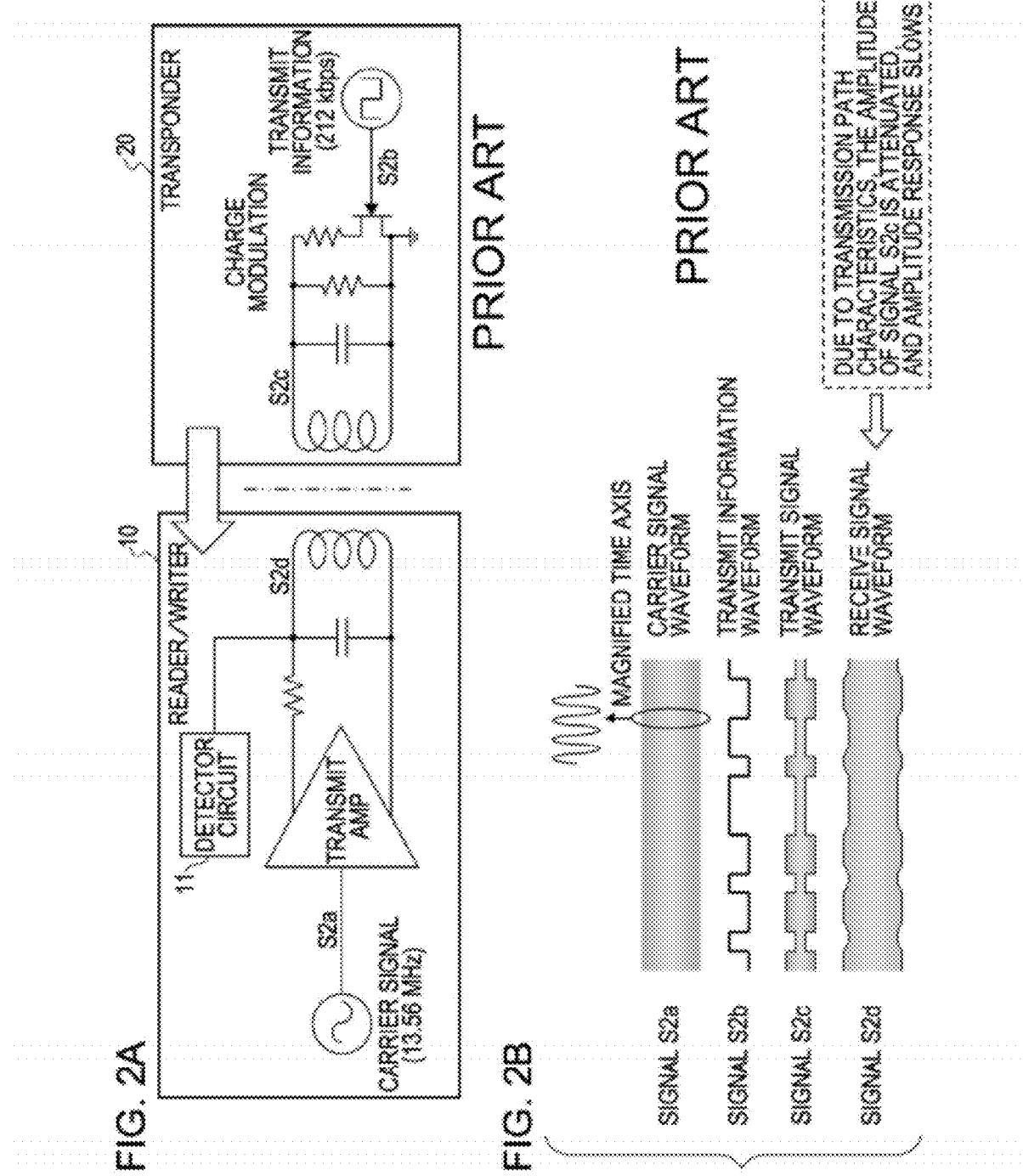

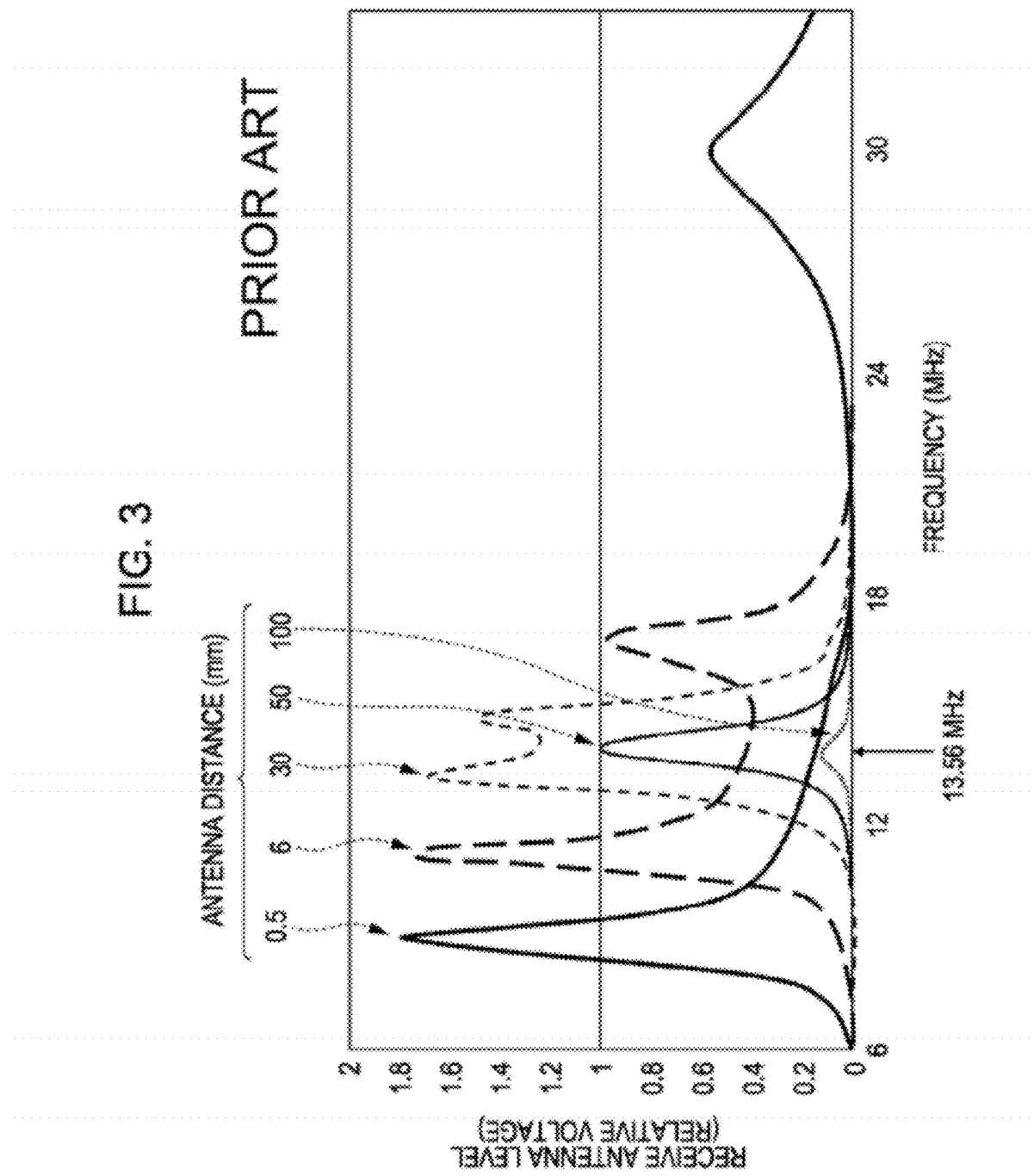

FIG. 26
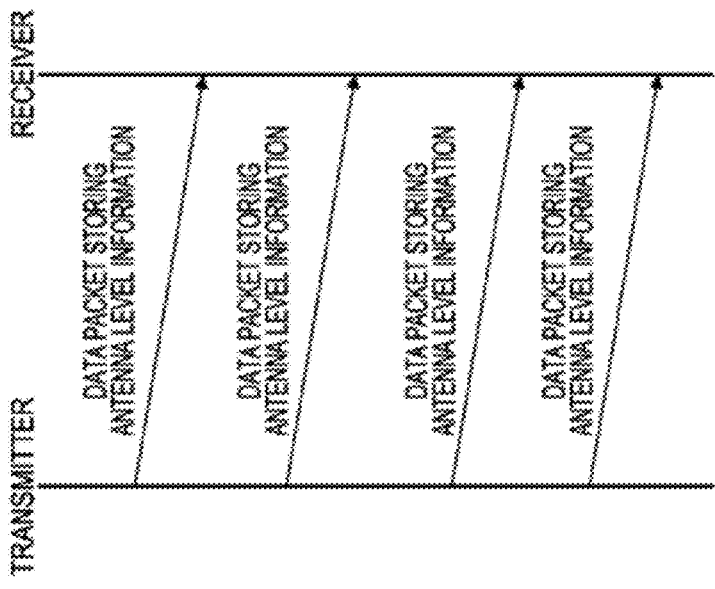
(1) EXAMPLE OF STORING ANTENNA LEVEL INFORMATION ONLY IN ADVANCE PACKET WHEN STARTING COMMUNICATION
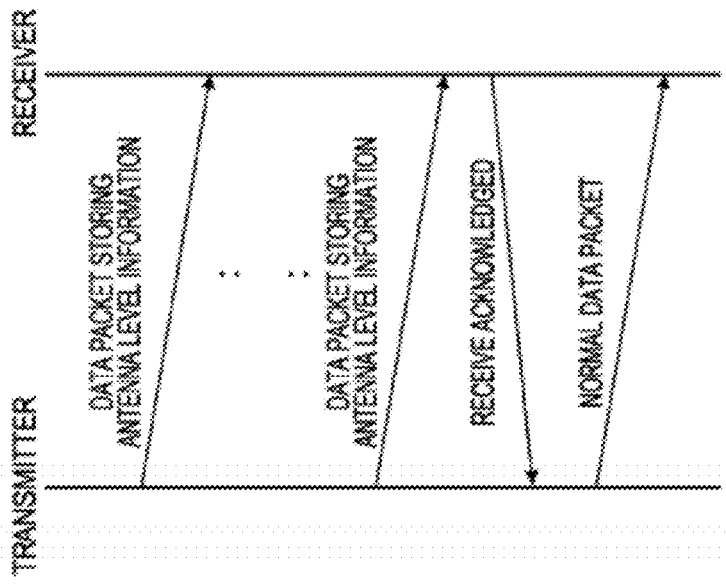
(2) EXAMPLE OF STORING ANTENNA LEVEL INFORMATION IN ALL PACKETS

FIG. 27 ately 10 cm. At these distances, communication may be thought of as magnetic coupling between two transformers, with the transmit and receive antenna acting as coils.

COMMUNICATION APPARATUS AND SIGNAL PROCESSING METHOD

CROSS REFERENCES TO RELATED APPLICATIONS

The present application claims priority to Japanese Priority Patent Application JP 2008-297629 filed in the Japan Patent Office on Nov. 21, 2008 and Japanese Priority Patent Application JP 2009-167460 filed in the Japan Patent Office on Jul. 16, 2009, the entire content of which is hereby incorporated by reference.

BACKGROUND

The present disclosure relates to a communication apparatus and a signal processing method. More particularly, the present invention relates to a communication apparatus and a signal processing method able to use the short-range communication conducted with respect to technology such as smart cards (i.e., IC cards), for example.

Recently, portable devices such as smart cards and mobile phones having short-range communication functions are being widely used. There is, for example, the FeliCa™ smart card developed by Sony. A short-range wireless communication standard called NFC (Near Field Communication) has also been developed by Sony and Philips.

In near field communication, a carrier frequency such as 13.56 MHz is used to communicate over a range from contact (i.e., 0 cm) to approximately 10 cm. Such communication will be summarized with reference to FIGS. 1A to 2B. At these distances, communication may be thought of as magnetic coupling between two transformers, with the transmit and receive antenna acting as coils.

FIG. 1A illustrates a process for transmitting data from a reader/writer 10 to a smart card or similar transponder 20, for example. FIG. 2A illustrates a process for transmitting data from the transponder 20 to the reader/writer 10.

The process for transmitting data from the reader/writer 10 to a smart card or similar transponder 20 will now be described with reference to FIGS. 1A and 1B. As shown in FIG. 1A, the reader/writer 10 modulates 212 kbps transmit information (the signal S1b) onto a 13.56 MHz carrier signal (the signal S1a) to produce a modulated signal (the signal S1c), which is then transmitted from a transmit amp to the transponder 20 via a coil. The transponder 20 receives an incoming (i.e., receive) signal (the signal S1d) via another coil.

FIG. 1B illustrates the signal waveforms of the carrier signal (signal S1a), the transmit information (signal S1b), the transmit signal (signal S1c), and the incoming (i.e., receive) signal (signal S1d). Herein, amplitude shift keying (ASK) is adopted as the modulation method.

The process for transmitting data from a smart card or similar transponder 20 to the reader/writer 10 will now be described with reference to FIGS. 2A and 2B. As shown in FIG. 2A, the reader/writer 10 transmits a 13.56 MHz carrier signal (the signal S2a) from a transmit amp to the transponder 20 via a coil. The transponder 20 modulates 212 kbps transmit information (the signal S2b) onto the carrier signal, and then transmits the generated transmit signal (the signal S2c) to the reader/writer 10. The reader/writer 10 receives an incoming (i.e., receive) signal (the signal S2d) via the coil.

FIG. 2B illustrates the signal waveforms of the carrier signal (signal S2a), the transmit information (signal S2b), the transmit signal (signal S2c), and the receive signal (signal S2d).

The reader/writer 10 and the transponder 20 shown in FIGS. 1A and 2A communicate over a range from contact (i.e., 0 cm) to approximately 10 cm. At these distances, communication may be thought of as magnetic coupling between two transformers, with the transmit and receive antenna acting as coils.

The characteristics of these transformers are such that each coil resonates with the carrier frequency at a high Q. By resonating near the carrier frequency, signals are amplified to enable transmission over greater distances. However, if the two resonating coils are in close proximity and mutually interfere, then the frequency characteristics of the transmission signal become like those shown in FIG. 3. As shown in FIG. 3, the resonant peak splits into two, with the carrier frequency lying in the valley between the two peaks.

FIG. 3 illustrates the correspondence between frequency and antenna level in two antennas made up of coils, for respective antenna distances between 0.5 mm to 100 mm. In other words, FIG. 3 illustrates the frequency characteristics of the transmission signal. For example, at antenna distances of 50 mm and 100 mm, the antenna level exhibits just one peak near the carrier frequency of 13.56 Mhz. At antenna distances of 30 mm, 6 mm, and 0.5 mm, the antenna level splits into two resonant peaks. Such splits are due to mutual interference of the two resonating coils when the antenna distance is decreased. As a result, the 13.56 MHz carrier frequency falls into the valley between the two peaks.

The above occurs because the resonant frequency of the two coils varies according to the inter-coil distance. The principle behind this variation will now be described with reference to FIGS. 4 and 5. FIG. 4 illustrates two coils a and b, which correspond to the respective coils in the reader/writer 10 and the transponder 20 shown in FIGS. 1A and 2A. The impedance $Z_{O(s)}$ to the right of the point P indicated by the arrow in FIG. 4 is given by the following Eq. 1.

$$Z_{O(s)} = \frac{G_{(s)}}{\{s^2 + CL(k+1)\} + \{s^2 + CL(k-1)\}} \quad \text{Eq. 1}$$

In Eq. 1, k is a coupling coefficient, while $G_{(s)}$ is a third-order function of s (the resonant frequency). The resonant frequencies $\omega_{O1}$ and $\omega_{O2}$ are as follows, expressed as the roots of s computed from the above Eq. 1.

$$\omega_{O1} = \frac{1}{\sqrt{CL}} \cdot \frac{1}{\sqrt{1+k}} \quad \text{Eq. 2}$$

$$\omega_{O2} = \frac{1}{\sqrt{CL}} \cdot \frac{1}{\sqrt{1-k}}$$

Eq. 2 thus demonstrates that the resonant frequencies $\omega_{O1}$ and $\omega_{O2}$ differ according to the value of the coupling coefficient k. FIG. 5 illustrates how the resonant frequencies $\omega_{O1}$ and $\omega_{O2}$ vary according to the coupling coefficient k. FIG. 5 illustrates the correspondence between frequency and antenna level for values of the coupling coefficient k from 0.01 to 0.05.

Frequency characteristics near the carrier frequency (13.56 MHz) are influenced by the frequency characteristics of the detection signal (i.e., the signal reverted to the baseband). In other words, the frequency characteristics of the baseband signal match those of the carrier frequency near the DC level. FIG. 6 illustrates the frequency characteristics of a baseband signal obtained by decoding a carrier that has passed through a system having the characteristics shown in FIG. 5.

FIG. 6 illustrates baseband frequency characteristics, and shows the correspondence between the frequency and the relative (linear) level of the incoming signal strength for various values of the coupling coefficient k from 0.01 to 0.5. The level of the 13.56 MHz carrier frequency shown in FIG. 5 corresponds to the DC (i.e., 0 Hz frequency) level in FIG. 6. The average of the measured incoming signal levels (13.56+X) MHz and (13.56−X) MHz in FIG. 5 is thus equivalent to the relative level of the frequency X (MHz) shown in FIG. 6.

FIG. 6 compares the frequency characteristics over the frequency interval from 0.625 MHz to 1.25 MHz for different values of the coupling coefficient k.

When the coupling coefficient k is 0.2, the frequency characteristics over the frequency interval from 0.625 MHz to 1.25 MHz tend toward the upper range, as shown by the double broken line a. In other words, there is a tendency for the relative level of the incoming signal strength to increase as the frequency increases.

In contrast, when the coupling coefficient k is 0.1, the frequency characteristics over the frequency interval from 0.625 MHz to 1.25 MHz tend toward the lower range, as shown by the double broken line b. In other words, there is a tendency for the relative level of the incoming signal strength to decrease as the frequency increases.

If the communication distance is estimated according to matching points (i.e., peak frequencies) in FIGS. 3 and 5, then the frequency characteristics for the coupling coefficient k equal to 0.2 shown in FIG. 5 corresponds to an antenna distance of approximately 14 mm, while the frequency characteristics for the coupling coefficient k equal to 0.1 shown in FIG. 5 corresponds to an antenna distance of approximately 20 mm. This large variation in the incoming signal strength and resonant frequency for small differences in distance is characteristic of the present communication method.

When the coupling coefficient k is small (i.e., when the communication distance is large), the upper range attenuates sharply. However, when the coupling coefficient k increases (i.e., when the communication distance becomes smaller), the signal level peaks in the upper range.

However, such variation in the frequency characteristics has not posed a significant problem in the related art. This is because the transmission rates used in the systems of the related art are not particularly large. For example, in the FeliCa™ and NFC (Near Field Communication) standards, Manchester code at a transmission rate of 212 kbps is implemented. In other words, the frequency of the highest repeating waveform is 212 kHz.

FIG. 6 shows that when the communication distance separating the antennas is large, 212 kHz is approximately halved in level with respect to DC, and is flat at most distances. Consequently, the signal is large unaltered by the frequency characteristics of the channel (i.e., the transmission path), and the determination of 1s and 0s in the incoming signal is unhindered at the receiver.

However, if the transmission rate is increased, then the baseband signal spectrum widens by a factor of the rate increase, increasing the range of frequencies to be detected for the incoming signal. For this reason, the effects exerted by frequency characteristics of the channel increase, causing an increase (i.e., a worsening) in the data error rate.

A typical configuration of an incoming signal detector circuit in a communication apparatus of the related art, as well as the detection signals in such a detector circuit, will now be described with reference to FIGS. 7A and 7B. FIG. 7A illustrates the configuration of an incoming signal detector circuit in a communication apparatus of the related art. The configuration shown in FIG. 7A corresponds to the detector circuit 21 of the smart card or similar transponder 20 shown in FIG. 1, or to the detector circuit 11 of the reader/writer 10 shown in FIG. 2, for example. FIG. 7B illustrates signal waveforms at respective points along the detector circuit shown in FIG. 7A.

As shown in FIG. 7A, the detector circuit includes an amplifier 31, a wave detector 32, a high-pass filter (HPF) 33, and a comparator 34. An incoming signal is input via a coil that acts as an antenna, and exhibits an input waveform like that of the signal S3a shown in FIG. 7B.

This input waveform (signal S3a) is suitably amplified or attenuated in the amplifier 31 so as to exhibit sufficient amplitude. The amplifier 31 outputs a signal S3b like that shown in FIG. 7B. In some cases, the amplifier 31 herein may be realized by means of an attenuator or automatic gain controller (AGC), for example.

The output (signal S3b) of the amplifier 31 is input into the wave detector 32 and processed such that amplitude information regarding the amplitude signal is extracted therefrom. As a result, the wave detector 32 outputs a signal S3c like that shown in FIG. 7B.

The detection signal (signal S3c) of the wave detector 32 is then input into the high-pass filter (HPF) 33. The high-pass filter (HPF) 33 removes the DC component of the signal by setting the median potential of the waveform as the zero level, thereby generating a detection waveform from which the DC offset has been removed. The generated signal is the signal S3d shown in FIG. 7B.

The output of the high-pass filter (HPF) 33 (i.e., the detection waveform minus the DC offset (signal S3d)) is input into the comparator 34. The comparator 34 generates and outputs a binary (1/0) signal, using the zero level as the threshold value. In other words, the comparator 34 generates and outputs the signal S3e shown in FIG. 7B as the incoming (i.e., receive) information waveform.

Incoming signal detector circuits for near field communication in the related art are configured as shown in FIG. 7A, and as a result of the signal processing produced by such a configuration, output received information in the form a binary signal (signal S3e) generated from an incoming signal (signal S3a).

The above configuration enables processing without problems for low transmission rates of approximately 212 kbps. However, if the transmission rate is increased, the signal might be significantly altered by the frequency characteristics of the channel (i.e., the transmission path), and the ability to accurately determine 1s and 0s from the detection waveform by removing the DC offset might be compromised.

In light of the foregoing problems, it is desirable to provide a communication apparatus and a signal processing method able to reduce the error rate and accurately receive data, even at fast transmission rates.

SUMMARY

A communication apparatus in accordance with a first embodiment includes: a signal detector configured to execute processing to detect incoming information from a signal received wirelessly. The signal detector includes: a wave detector configured to accept as input an incoming signal wherein incoming information has been modulated onto a carrier signal, analyze the envelope variation of the incoming signal, and generate a detection signal containing the incoming information; an equalizer configured to execute correction processing with respect to the detection signal and output a corrected detection signal; and a detector configured to accept as input the corrected detection signal generated by the equalizer, and detect incoming information therefrom.

In the communication apparatus in accordance with an embodiment, the equalizer is configured to execute processing for correcting distortion contained in the detection signal, and is configured to execute processing for correcting distortion produced with respect to the incoming signal along the wireless communication path.

In the communication apparatus in accordance with an embodiment, the equalizer is configured to revert the incoming signal back to its original state by applying a filter whose characteristics are the inverse of those of the distortion produced with respect to the incoming signal along the wireless communication path.

The communication apparatus in accordance with an embodiment, further includes an analog-to-digital converter configured to generate a digital signal by digitally converting the detection signal generated by the wave detector. The equalizer accepts the digital signal as input, generates a corrected digital signal by means of digital signal processing, and outputs the corrected digital signal to the detector.

In the communication apparatus in accordance with an embodiment, the equalizer includes an adaptive equalizer configuration that executes different equalization processing according to the distortion in the input signal with respect to the equalizer.

In the communication apparatus in accordance with an embodiment, the equalizer analyzes the optimal equalization characteristics with respect to the characteristics of the incoming signal, and executes equalization processing according to the analysis result.

In the communication apparatus in accordance with an embodiment, the equalizer is made up of a plurality of equalizers configured to execute processing in accordance with different equalization characteristics. The equalizer also includes a selector configured to select the optimal equalization result according to the characteristics of the incoming signal from among the outputs of the plurality of equalizers, and outputs the selected result to the detector.

The communication apparatus in accordance with an embodiment, further includes: a header detector configured to analyze headers contained in the plurality of equalization results output from the plurality of equalizers; and a signal selector configured to select the equalizer output to be input into the detector, according to the analysis result of the header detector. The header detector detects at least one of either the synchronization (SYNC) information or the error rate in the headers. According to the detection result of the header detector, the signal selector selects one equalizer that output an optimal equalization result from among the plurality of equalizers, and according to the selection result, selects the equalization output to be input into the detector.

The communication apparatus in accordance with an embodiment, further includes a level information detector configured to extract, from the incoming signal, transmit antenna level information indicating the voltage of the transmit antenna as measured at the data transmitting apparatus, and then output the extracted antenna level information to the equalizer. The equalizer determines the optimal equalization characteristics according to the antenna level information, and outputs an equalization result in accordance with the optimal equalization characteristics.

In the communication apparatus in accordance with an embodiment, the equalizer determines the optimal equalization characteristics to be frequency characteristics that are the approximate inverse of the frequency characteristics of the transmission path as estimated according to the antenna level information.

In the communication apparatus in accordance with an embodiment, the equalizer includes: a plurality of equalizers configured to execute equalization processing in accordance with a plurality of different equalization characteristics; and a selector configured to accept the antenna level information as input, and selectively output one equalization result from among the equalization results of the plurality of equalizers. The selector selectively outputs the equalization result of the equalizer that executed equalization processing using frequency characteristics that are the approximate inverse of the frequency characteristics of the transmission path as estimated according to the antenna level information.

The communication apparatus in accordance with an embodiment, further includes an analog-to-digital converter configured to generate a digital signal by digitally converting the detection signal generated by the wave detector. The equalizer also includes: a filter configured to accept the digital signal as input, filter the digital signal by applying filter coefficients and thereby generate a corrected digital signal, and then output the corrected digital signal to the detector; and a filter coefficients selector configured to select a set of filter coefficients from among a plurality of sets of filter coefficients configured for the filter in advance, and then output the selected set of filter coefficients to the filter. A set of filter coefficients is selected by the filter coefficients selector such that equalization processing is executed using frequency characteristics that are the approximate inverse of the frequency characteristics of the transmission path as estimated according to the antenna level information.

In the communication apparatus in accordance with an embodiment, the filter is a finite impulse response (FIR) filter.

In the communication apparatus in accordance with an embodiment, the incoming signal is a signal that has been modulated by means of amplitude shift keying (ASK).

A communication apparatus in accordance with another embodiment includes: an antenna configuration to wirelessly transmit data; a level measuring unit configured to measure the voltage of the antenna; and a packet generator configured to store antenna level information indicating the measured voltage values from the level measuring unit in outgoing (i.e., transmit) data. A packet storing antenna level information and generated by the packet generator is output via the antenna.

In the communication apparatus in accordance with an embodiment, the packet generator: defines within a packet a unique signal pattern region made up of a signal sequence different from that of the stipulated data conversion rules to be applied to the data constituting the packet; and generates a packet, wherein the signal pattern defined in the unique signal pattern region differs according to the antenna level.

In the communication apparatus in accordance with an embodiment, the packet generator generates a packet wherein the signal sequence defined in the unique signal pattern region is a mono-frequency signal sequence whose frequency differs according to the antenna level.

In the communication apparatus in accordance with an embodiment, the packet generator: defines a low frequency rate signal region in the region of a simple repeating signal defined in the packet, such that the frequency rate in the low frequency rate signal region differs from the simple signal; and generates a packet wherein the signal pattern defined in the low frequency rate signal region differs according to the antenna level.

In a signal processing method in accordance with another embodiment, incoming (i.e., receive) information is detected in a communication apparatus. The method includes: detecting incoming information from a signal received wirelessly; accepting as input an incoming signal where incoming information has been modulated onto a carrier signal, analyzing the envelope variation of the incoming signal, and generating a detection signal containing the incoming information; equalizing the detection signal and outputting a corrected detection signal; and detecting incoming information from the corrected detection signal generated in the equalizing step.

In a signal processing method in accordance with another embodiment, data transmission is conducted in a communication apparatus provided with an antenna. The method includes: measuring the voltage of the antenna to be used to transmit data; generating a packet storing antenna level information indicating the measured voltage values; and outputting the packet storing the antenna level information that was generated in the generating step via the antenna.

An embodiment is configured to execute processing to detect incoming signal information from a signal received wirelessly. Incoming signal information that has been modulated onto a carrier signal is input into a signal detector, which generates a detection signal containing the incoming information. An equalizer then corrects distortions in the detection signal. More specifically, the equalizer corrects distortions produced in the wireless communication path. The signal thus corrected in the equalizer is then input into a detector that obtains the incoming signal information. The detector may be realized by means of a comparator, for example. As a result of the above configuration, distortions produced along the communication path are corrected in the equalizer, and the incoming signal information is obtained from the corrected signal. This enables accurate information transmission, even for fast-rate communication.

Additional features and advantages are described herein, and will be apparent from the following Detailed Description and the figures.

BRIEF DESCRIPTION OF THE FIGURES

FIG. 1A illustrates a typical configuration of a communication apparatus that conducts near field communication;

FIG. 1B illustrates exemplary processing of transmit and receive signals in a communication process;

FIG. 2A illustrates a typical configuration of a communication apparatus that conducts near field communication;

FIG. 2B illustrates exemplary processing of transmit and receive signals in a communication process;

FIG. 3 explains mutual interference between two resonating coils in close proximity, as well as the frequency characteristics of a transmission signal;

FIG. 26 illustrates timings in the process for transmitting a packet storing antenna level information;

FIG. 27 illustrates a specific example of storing antenna level information;

DETAILED DESCRIPTION

Hereinafter, a communication apparatus and a signal processing method in accordance with embodiments will be described in detail and with reference to the accompanying drawings. A communication apparatus in accordance with an embodiment is able to reduce the error rate and receive data even over fast-rate communication. Hereinafter, embodiments will be described as follows.

A. Embodiment wherein equalization is conducted in the detector circuit of a receiving apparatus
   A1. Embodiment of a detector circuit (Embodiment 1)
   A2. Embodiment of a detector circuit (Embodiment 2)
   A3. Embodiment of a detector circuit (Embodiment 3)
   A4. Embodiment of a detector circuit (Embodiment 4)
   A5. Embodiment of a detector circuit (Embodiment 5)
   A6. Embodiment of a detector circuit (Embodiment 6)

B. Embodiment wherein optimal equalization is conducted on the basis of signal level information from the transmitting apparatus
   B1. Explanation of optimal equalizer frequency characteristics with respect to transmit signal
   B2. Embodiment wherein equalization is optimized on the basis of signal level information (Embodiment 7)

A. Embodiment wherein Equalization is Conducted in the Detector Circuit of a Receiving Apparatus First, an embodiment wherein equalization is conducted in the detector circuit of a receiving apparatus will be described. More specifically, the embodiment described hereinafter is provided with a circuit for correcting frequency characteristics, such as an equalizer in the form of a filter circuit, for example. The embodiment is thus configured to correct the incoming signal before performing signal detection.

Figure 8:
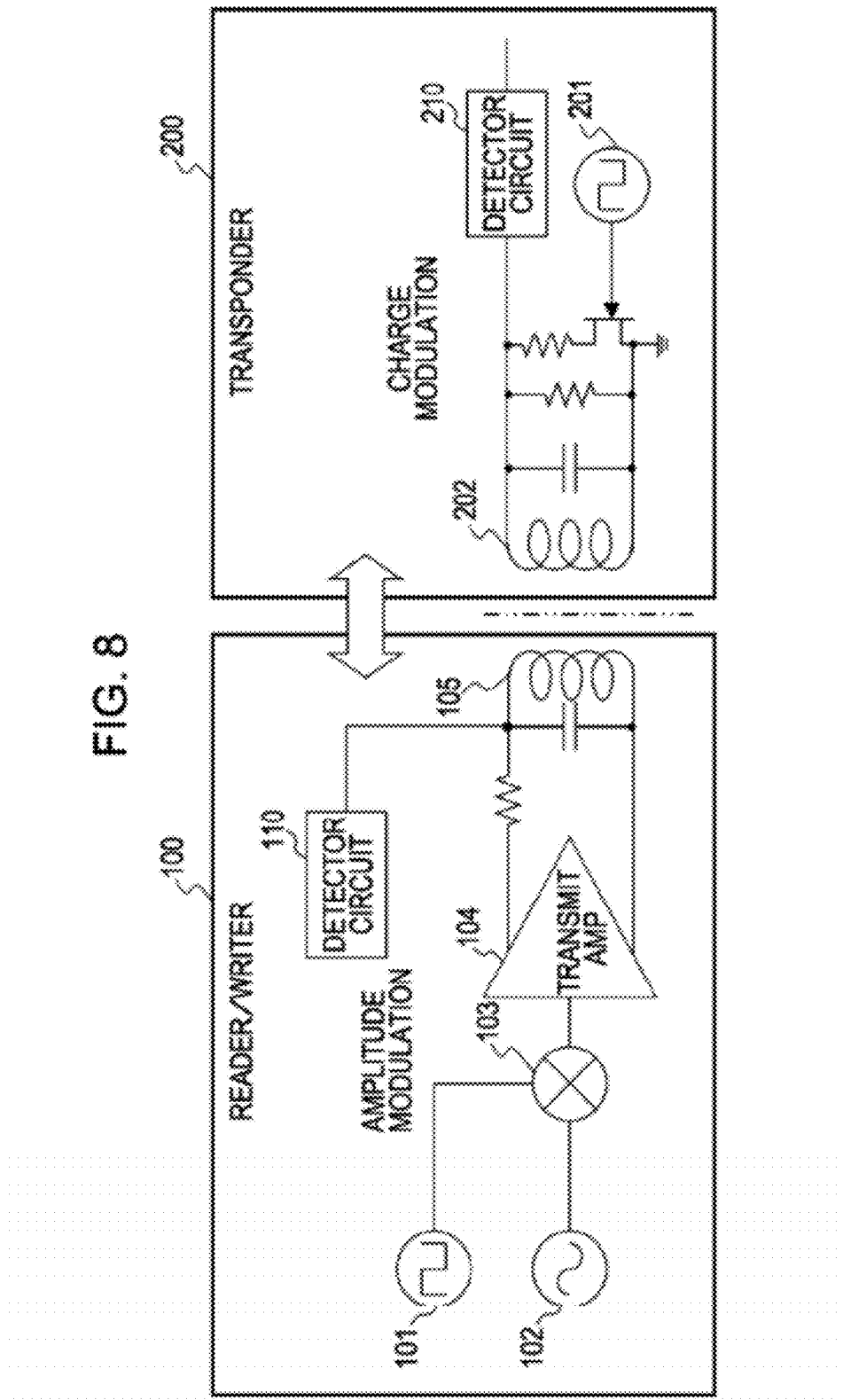
FIG. 8 illustrates an exemplary configuration of a communication apparatus in accordance with an embodiment.

An exemplary configuration of a communication apparatus in accordance with an embodiment will now be described with reference to FIG. 8. FIG. 8 illustrates a pair of communication apparatus conducting near field communication, similar to that described earlier with reference to FIGS. 1A and 2A. In other words, FIG. 8 respectively illustrates a reader/writer 100 as well as a smart card or similar transponder 200. Both the reader/writer 100 and the transponder 200 are exemplary utilizations of a communication apparatus in accordance with an embodiment of the present invention.

Processing is executed to transmit data from the reader/writer 100 to the transponder 200, or to transmit data from the transponder 200 to the reader/writer 100. The process flow whereby data is transmitted is similar to that described with reference to FIGS. 1A to 2B.

In the process to transmit data from the reader/writer 100 to the smart card or similar transponder 200, the reader/writer 100 generates a modulated signal in a modulator 103, wherein transmit information 101 is modulated onto a carrier signal 102. The modulated signal thus generated is then transmitted to the transponder 200 from a transmit amp 104 via a coil 105.

The transponder 200 receives a signal via a coil 202, and the signal is detected in a detector circuit 210. Herein, amplitude shift keying (ASK) may be implemented as the modulation method, for example.

In contrast, the process to transmit data from the smart card or similar transponder 200 to the reader/writer 100 is conducted as follows. The reader/writer 100 transmits the carrier signal 102 to the transponder 200 via the coil 105. The transponder 200 modulates transmit information 201 to generate a transmit signal, which is then transmitted to the reader/writer 100 via the coil 202. The reader/writer 100 receives the signal via the coil 105, and the signal is detected in a detector circuit 110.

In this way, the basic sequence in the process for transmitting data is similar to that described with reference to FIGS. 1A to 2B. In the process described earlier with reference to FIGS. 1A to 2B, the transmission rate of the transmit information was taken to be 212 kbps. However, an embodiment enables faster communication at higher transmission rates. The configuration of the detector circuit is modified in order to analyze communicated data at higher transmission rates. These modified detector circuits are the detector circuit 110 in the reader/writer 100, and the detector circuit 210 in the transponder 200.

A1. Embodiment of a Detector Circuit

Embodiment 1

Figure 9:
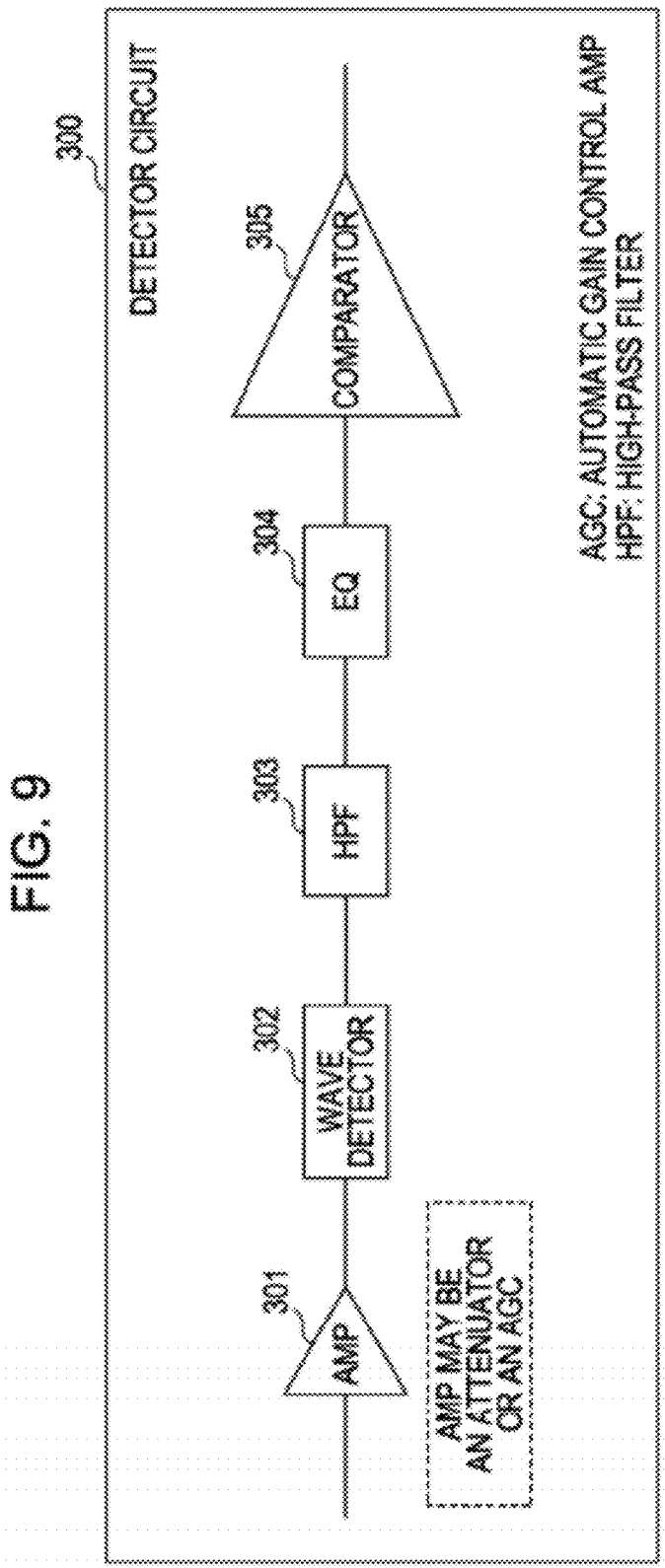
FIG. 9 illustrates the configuration of a detector circuit in a communication apparatus in accordance with an embodiment.

The configuration of a detector circuit in a communication apparatus in accordance with an embodiment is illustrated in FIG. 9. The detector circuit 300 shown in FIG. 9 functions as a signal detector executing processing to detect incoming information from a signal received wirelessly.

More specifically, the detector circuit 300 executes processing to extract transmit information that has been modulated onto a carrier signal received via a coil that functions as an antenna. The detector circuit 300 thus extracts a bit (1/0) sequence constituting the incoming information. The detector circuit 300 shown in FIG. 9 corresponds to the detector circuit 110 in the reader/writer 100, or to the detector circuit 210 in the transponder 200, both shown in FIG. 8.

As shown in FIG. 9, the detector circuit 300 includes an amp 301, a wave detector 302, a high-pass filter (HPF) 303, an equalizer (EQ) 304 that corrects distortions in the incoming signal, and a comparator 305. Thus, the detector circuit 300 in a communication apparatus in accordance with an embodiment is provided with an equalizer (EQ) 304 that performs signal correction by removing distortions from the signal contained in the detection signal. By means of the equalizer (EQ) 304, distortions received along the channel (i.e., the transmission path) are removed, thereby enabling the comparator 305 to analyze the incoming signal and accurately extract the bit sequence therefrom.

The transitions in the signal transferred among the respective components of the detector circuit 300 shown in FIG. 9 will now be described with reference to FIGS. 10A and 10B. FIG. 10A illustrates the configuration of the detector circuit 300 shown in FIG. 9. FIG. 10B illustrates the signal waveforms at various points along the detector circuit 300 shown in FIG. 10A.

The incoming signal that is input via the coil acting as an antenna exhibits an input waveform like that of the signal S5$a$ shown in FIG. 10B. This input waveform (signal S5$a$) is suitably amplified or attenuated in the amp 301 so as to exhibit sufficient amplitude. The amp 301 outputs a signal S5$b$ like that shown in FIG. 10B. In some cases, the amp 301 herein may be realized by means of an attenuator or automatic gain controller (AGC), for example.

The output (signal S5*b*) of the amp 301 is input into the wave detector 302 and processed such that amplitude information regarding the amplified signal is extracted therefrom. As a result, the wave detector 302 outputs a signal S5*c* like that shown in FIG. 10B.

The detection signal (signal S5*c*) of the wave detector 302 is then input into the high-pass filter (HPF) 303. The high-pass filter (HPF) 303 removes the DC component from the detection signal (signal S5*c*) by setting the median potential of the waveform as the zero level, thereby generating a detection waveform from which the DC offset has been removed. The generated signal is the signal S5*d* shown in FIG. 10B.

The output of the high-pass filter (HPF) 303 (i.e., the detection waveform minus the DC offset (signal S5*d*)) is input into the equalizer (EQ) 304. The equalizer (EQ) 304 removes distortions received along the channel (i.e., the transmission path). The equalizer (EQ) 304 reverts the signal to its original state by applying a filter with inverse characteristics with respect to the distortions received along the channel (i.e., the transmission path). The equalizer (EQ) 304 may be realized by means of a high-pass filter (HPF), a low-pass filter, or a level shifter, for example. The equalizer (EQ) 304 corrects distortions contained in the detection waveform minus the DC offset (i.e., the signal S5*d*) that was received as input from the high-pass filter (HPF) 303. In other words, the equalizer (EQ) 304 executes correction processing with respect to the detection signal, and outputs a corrected detection signal.

Subsequently, the signal thus corrected for distortion by the equalizer (EQ) 304 is input into the comparator 305. The comparator 305 functions as a detector that accepts the corrected detection signal generated by the equalizer (EQ) 304 as input, and detects incoming information therefrom. The comparator 305 generates and outputs a binary (1/0) signal, using the zero level as the threshold value. In other words, the comparator 305 generates and outputs the signal S5*e* shown in FIG. 10B as the incoming information waveform.

An embodiment is thus provided with a equalizer (EQ) 304, which removes distortions received along the channel (i.e., the transmission path), thereby enabling the comparator 305 to analyze the incoming signal and accurately extract the bit sequence therefrom.

A2. Embodiment of a Detector Circuit

Embodiment 2

Figure 10:
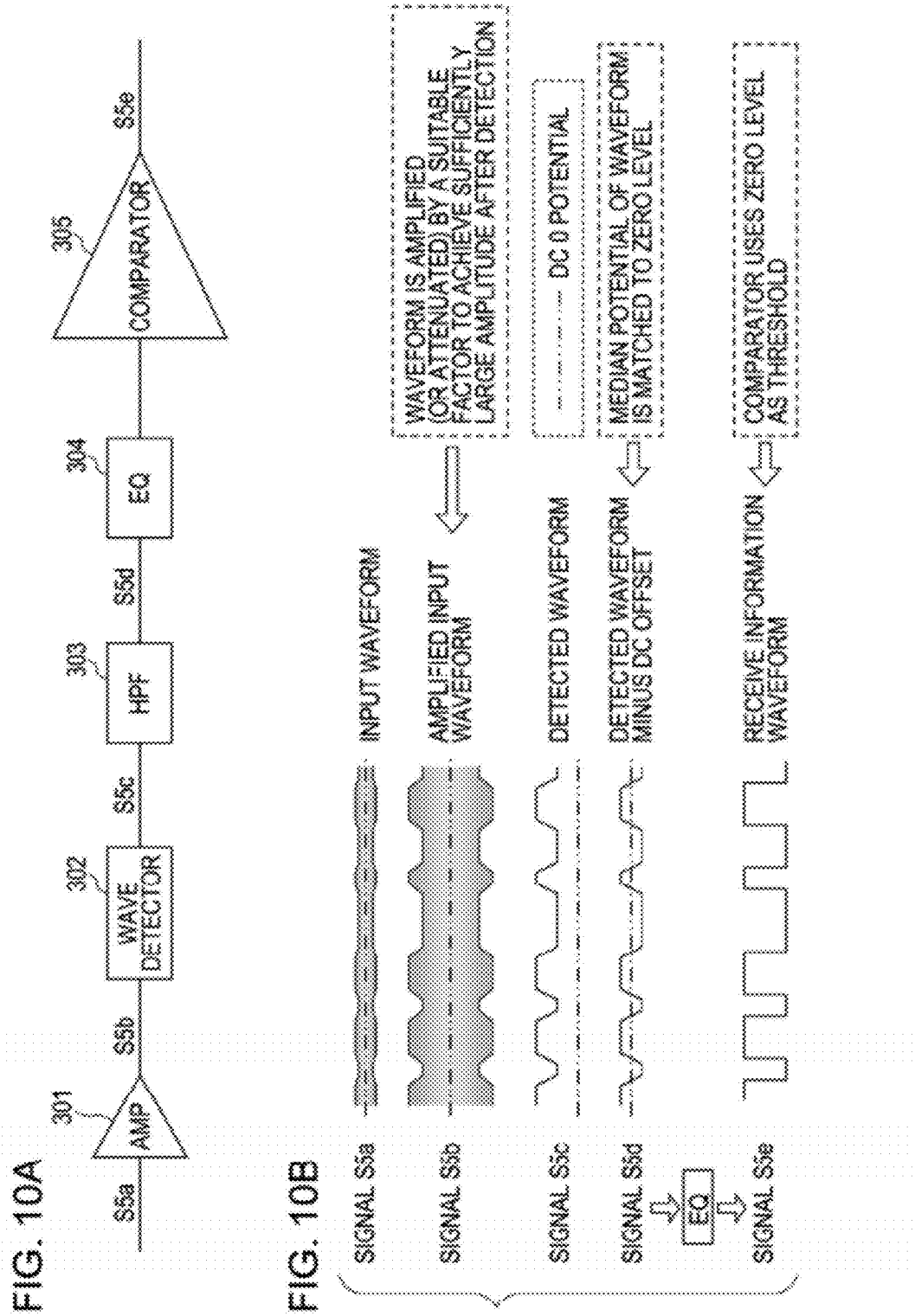
FIG. 10A illustrates the configuration of a detector circuit in a communication apparatus in accordance with an embodiment.
FIG. 10B explains the transitions in the signal transferred among the respective components of the detector circuit 300 shown in FIGS. 9 and 10A.

The detector circuit 300 described with reference to FIGS. 9 to 10B is configured to process analog signals by way of example. The wave detector 302 is configured as an analog processing circuit, while the comparator 305 makes 1/0 determinations as an analog comparator.

However, it is also possible for the wave detector and the high-pass filter to convert the detection signal into a digital signal. A detector circuit configuration in accordance with the second embodiment will now be described with reference to FIG. 11. In the second embodiment, the detection signal is first converted into a digital signal before signal extraction is conducted in the detector.

Figure 11:
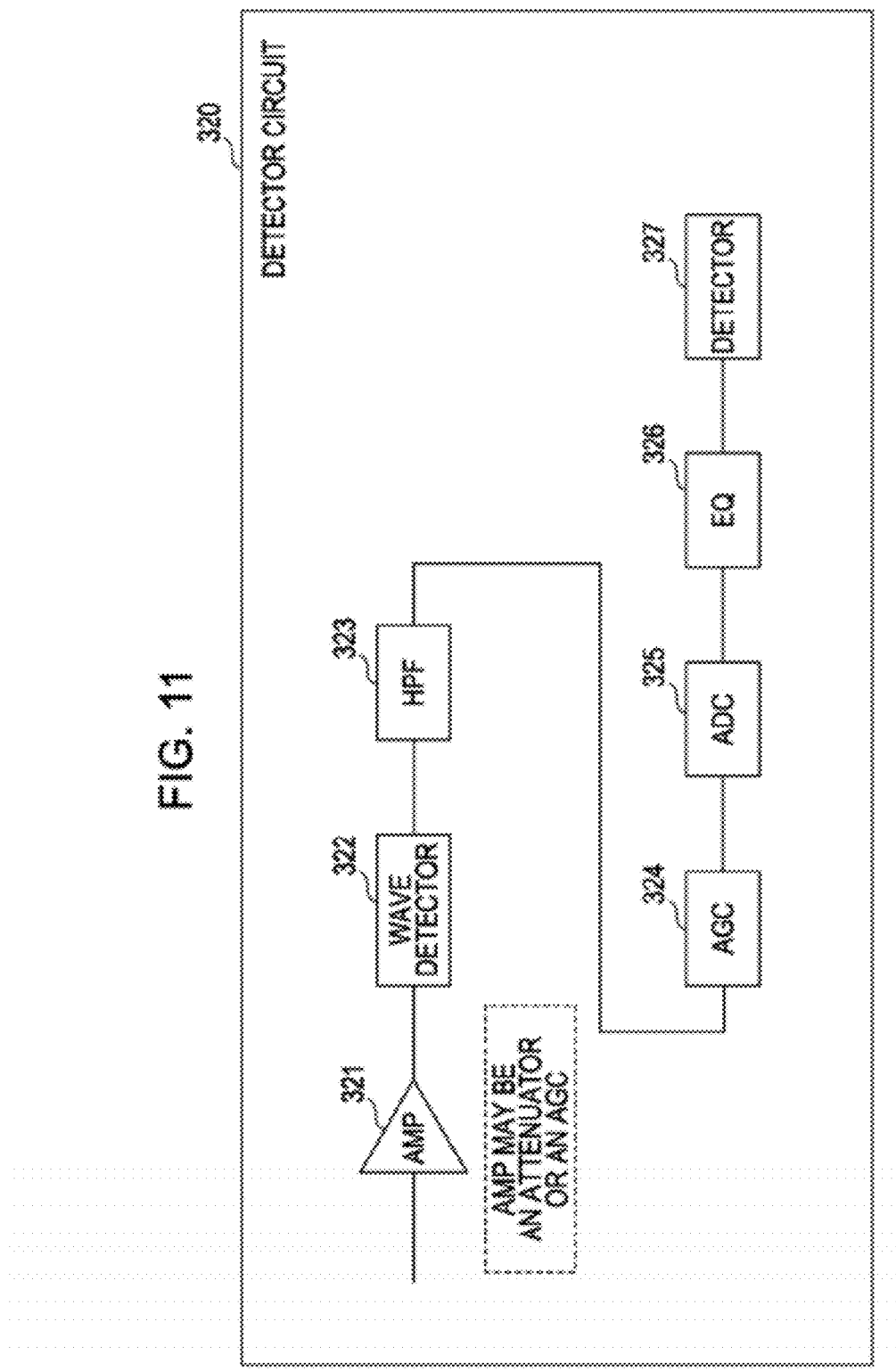
FIG. 11 illustrates the configuration of a detector circuit in a communication apparatus in accordance with a second embodiment.

The detector circuit 320 shown in FIG. 11 includes an amp 321, a wave detector 322, a high-pass filter (HPF) 323, an automatic gain controller (AGC) 324, an analog-to-digital converter (ADC) 325, an equalizer (EQ) 326, and a detector 327.

The amp 321, the wave detector 322, and the high-pass filter (HPF) 323 in the detector circuit 320 of the second embodiment are similar to those of the first embodiment. In other words, an incoming signal input via a coil acting as an antenna is input into the amp 321, and amplified or attenuated by a suitable scaling factor so as to exhibit sufficient amplitude. In some cases, the amp 321 herein may be realized by means of an attenuator or automatic gain controller (AGC), for example.

The output of the amp 321 is input into the wave detector 322, and amplitude information regarding the amplified signal is extracted therefrom. In other words, the wave detector 322 accepts incoming information modulated onto a carrier signal as input, analyzes the envelope variation of the carrier signal, and generates a detection signal containing the incoming information. The detection signal of the wave detector 322 is then input into the high-pass filter (HPF) 323. The high-pass filter (HPF) 323 removes the DC component of the detection signal by setting the median potential of the waveform as the zero level, thereby generating a detection waveform from which the DC offset has been removed.

The output of the high-pass filter (HPF) 323 (i.e., the detection waveform minus the DC offset) is gain-controlled in the automatic gain controller (AGC) 324, subsequently input into the analog-to-digital converter (ADC) 325, and converted into a digital signal.

After that, the digital signal is input into the equalizer (EQ) 326. The equalizer (EQ) 326 is configured to be a digital signal processing circuit. The goal of the processing executed by the equalizer (EQ) 326 is similar to that of the equalizer (EQ) in the first embodiment; namely, to remove distortions received along the channel (i.e., the transmission path). In other words, the equalizer (EQ) 326 executes correction processing with respect to the detection signal, and outputs a corrected detection signal. However, the input signal in this case is a digital signal, and distortions contained in digital information are removed. In other words, the signal correction is conducted by means of digital signal processing.

Subsequently, the signal thus corrected for distortion by the equalizer (EQ) 326 is input into the detector 327. The detector 327 accepts the corrected detection signal (a digital signal) generated by the equalizer (EQ) 326 as input, and detects incoming information therefrom. On the basis of the corrected digital signal, the detector 327 outputs a binary (1/0) signal as the incoming information.

Similarly to the first embodiment, the second embodiment is provided with an equalizer (EQ) 326, which removes distortions received along the channel (i.e., the transmission path). For this reason, the detector 327 is able to correctly analyze the incoming signal with a reduced error rate.

A3. Embodiment of a Detector Circuit

Embodiment 3

The detector circuit described with reference to FIG. 11 is configured to conduct digital signal processing in the equalizer (EQ) 326 by way of example. However, in the case of digital signal processing, it is also possible to an adaptive equalizer. An adaptive equalizer automatically optimizes the equalization characteristics according to the type of distortion in the input signal.

Figure 12:
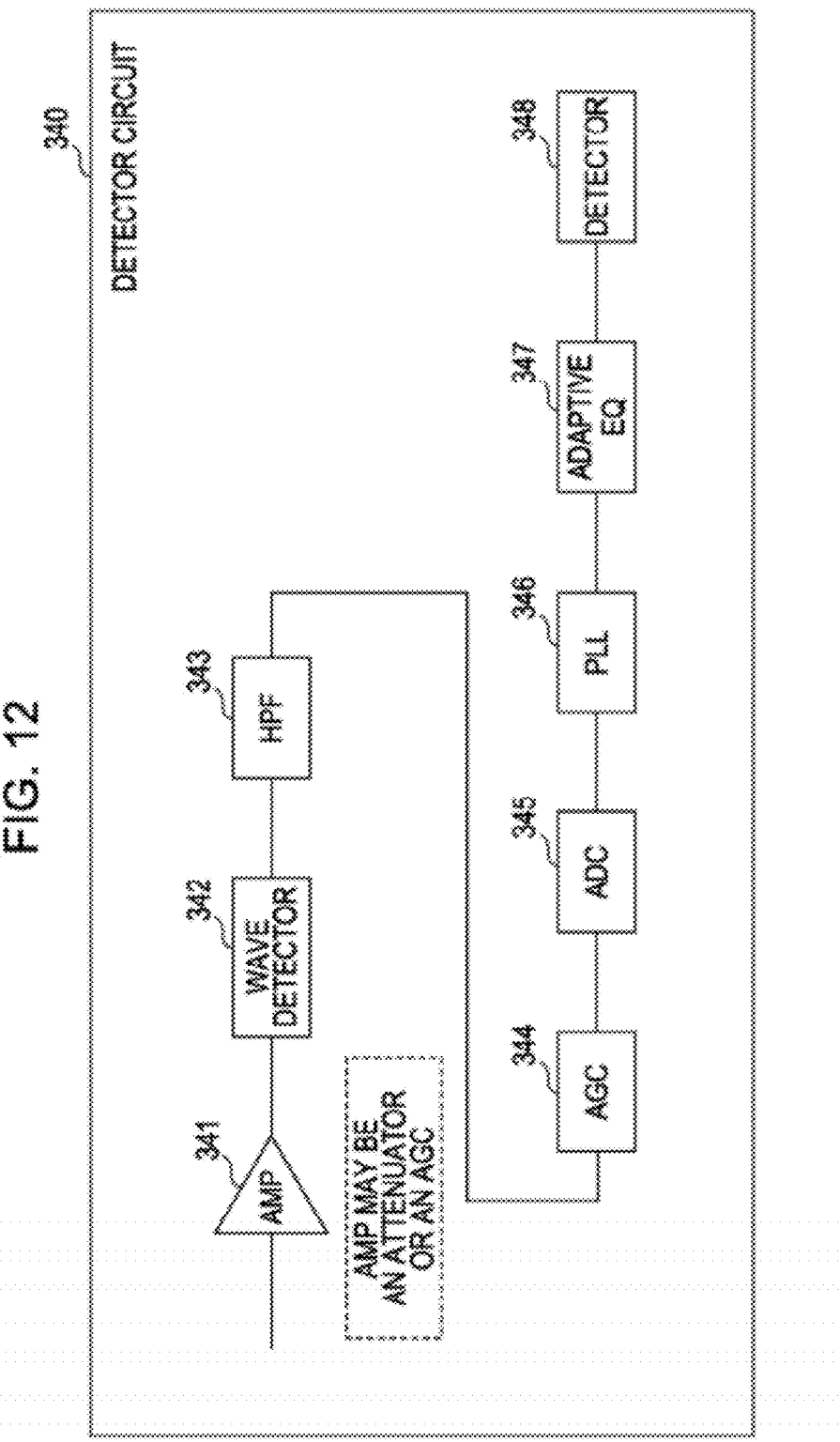
FIG. 12 illustrates the configuration of a detector circuit in a communication apparatus in accordance with a third embodiment.

As described earlier with reference to FIG. 6, near field communication uses a channel (i.e., a transmission path) whose characteristics vary significantly with distance. If the transmission rate is increased and the band is widened in such a configuration, an equalizer (EQ) conducting specific, predetermined processing might not be sufficient. Consequently, it is preferable to configure the equalizer to execute optimal correction processing in an adaptive manner according to the incoming data. FIG. 12 illustrates an exemplary configuration of a detector circuit 340 having an equalizer (EQ) that adaptively executes different correction processing depending on the incoming data.

The detector circuit 340 shown in FIG. 12 includes an amp 341, a wave detector 342, a high-pass filter (HPF) 343, an automatic gain controller (AGC) 344, an analog-to-digital converter (ADC) 345, a phase locked loop (PLL) 346, an adaptive equalizer (EQ) 347, and a detector 348.

The amp 341, the wave detector 342, and the high-pass filter (HPF) 343 in the detector circuit 340 of the third embodiment are similar to those of the first embodiment. In other words, an incoming signal input via a coil acting as an antenna is input into the amp 341, and amplified or attenuated by a suitable scaling factor so as to exhibit sufficient amplitude. In some cases, the amp 341 herein may be realized by means of an attenuator or automatic gain controller (AGC), for example.

The output of the amp 341 is input into the wave detector 342, and amplitude information regarding the amplified signal is extracted therefrom. In other words, the wave detector 342 accepts incoming information modulated onto a carrier signal as input, analyzes the envelope variation of the carrier signal, and generates a detection signal containing the incoming information. The detection signal of the wave detector 342 is then input into the high-pass filter (HPF) 343. The high-pass filter (HPF) 343 removes the DC component of the detection signal by setting the median potential of the waveform as the zero level, thereby generating a detection waveform from which the DC offset has been removed.

The output of the high-pass filter (HPF) 343 (i.e., the detection waveform minus the DC offset) is gain-controlled in the automatic gain controller (AGC) 344, subsequently input into the analog-to-digital converter (ADC) 345, and converted into a digital signal.

After that, the digital signal is input into the PLL 346, subjected to PLL processing in accordance with the clock of the data rate, and the result is input into the adaptive equalizer (EQ) 347. The adaptive equalizer (EQ) 347 accepts the PLL processing result as input, and conducts signal correction by means of digital signal processing. The adaptive equalizer (EQ) 347 may be configured as a finite impulse response (FIR) filter, for example. In this case, error is detected for each tap coefficient of the FIR filter from error voltages that deviate from the detected voltages that should constitute the adaptive equalizer output. The signal is then automatically corrected such that the error voltages are minimized. By means of such adaptive equalization, systems wherein the equalization characteristics vary significantly can be accommodated with a single circuit.

Subsequently, the digital signal thus corrected in the adaptive equalizer (EQ) 347 is input into the detector 348. The detector 348 accepts the corrected detection signal (a digital signal) generated by the adaptive equalizer (EQ) 347 as input, and detects incoming information therefrom. On the basis of the corrected digital signal, the detector 348 outputs a binary (1/0) signal as the incoming information.

Similarly to the first and second embodiments, the third embodiment is provided with an adaptive equalizer (EQ) 347 that removes distortions received along the channel (i.e., the transmission path). For this reason, the detector 348 is able to correctly analyze the incoming signal with a reduced error rate. More particularly, signal correction in the present embodiment is executed by an adaptive equalizer (EQ) 347 configured as a finite impulse response (FIR) filter, for example. For this reason, the equalization characteristics are automatically optimized according to the type of distortion in the input signal, thereby enabling the correction of various types of distortion produced by channel (i.e., transmission path) conditions. As a result, accurate signal detection is realized for diverse incoming signals.

A4. Embodiment of a Detector Circuit

Embodiment 4

Realizing adaptive equalization functions is difficult when equalizing analog signals, but in some cases fixed analog equalization characteristics are sufficient. In some systems, usage is more strictly defined, wherein the transponder (such as a smart card) may simply be placed on top of the reader/writer, for example. Although such systems may involve equalization, the desired equalization characteristics do not vary significantly. In such cases, an analog filter with fixed characteristics is sufficient. Moreover, such systems may be provided with circuits that measure other information, such as the carrier signal level or the frequency characteristics of other channels. The characteristics of the equalizer may then modified according to the measured results.

The configuration of such a detector circuit that causes optimal equalization processing to be executed for an analog signal will now be described with reference to FIG. 13.

Figure 13:
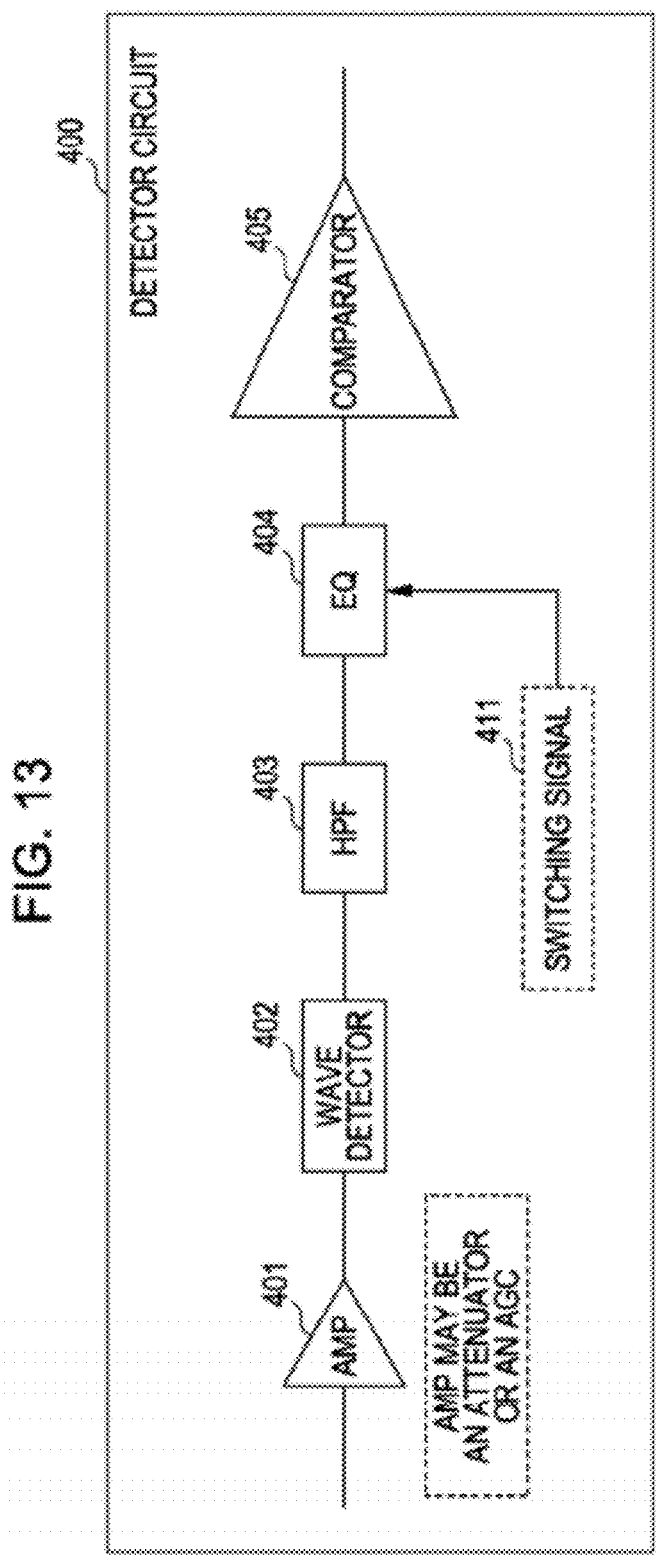
FIG. 13 illustrates the configuration of a detector circuit in a communication apparatus in accordance with a fourth embodiment.

The detector circuit 400 shown in FIG. 13 includes an amp 401, a wave detector 402, a high-pass filter (HPF) 403, an equalizer (EQ) 404, and a comparator 405.

The detector circuit 400 of the fourth embodiment is an analog signal processing circuit similar to that described earlier with reference to FIGS. 9 to 10B. The amp 401, the wave detector 402, and the high-pass filter (HPF) 403 are similar to those of the first embodiment. In other words, an incoming signal input via a coil acting as an antenna is input into the amp 401, and amplified or attenuated by a suitable scaling factor so as to exhibit sufficient amplitude. In some cases, the amp 401 herein may be realized by means of an attenuator or automatic gain controller (AGC), for example.

The output of the amp 401 is input into the wave detector 402, and amplitude information regarding the amplified signal is extracted therefrom. In other words, the wave detector 402 accepts incoming information modulated onto a carrier signal as input, analyzes the envelope variation of the carrier signal, and generates a detection signal containing the incoming information. The detection signal of the wave detector 402 is then input into the high-pass filter (HPF) 403. The high-pass filter (HPF) 403 removes the DC component of the detection signal by setting the median potential of the waveform as the zero level, thereby generating a detection waveform from which the DC offset has been removed.

The output of the high-pass filter (HPF) 403 (i.e., the detection waveform minus the DC offset) is input into the equalizer (EQ) 404. The equalizer (EQ) 404 additionally receives a switching signal 411 as input, and modifies its equalization characteristics according to the characteristics of the input signal.

The switching signal 411 is generated by an incoming signal validation circuit not shown in the drawings. The incoming signal validation circuit measures factors such as the incoming signal level and the frequency characteristics of other channels and outputs a switching signal 411 to the equalizer (EQ) 404 that causes optimal equalization processing to be executed according to the measurement results.

The equalizer (EQ) 404 modifies its equalization characteristics according to the switching signal 411, and corrects the output of the high-pass filter (HPF) 403 (i.e., the detection waveform minus the DC offset).

Subsequently, the signal thus corrected for distortion in the equalizer (EQ) 404 is input into the comparator 405. The comparator 405 generates and outputs a binary (1/0) signal, using the zero level as the threshold value.

Similarly to the other embodiments, the fourth embodiment is provided with an equalizer (EQ) 404, which removes distortions received along the channel (i.e., the transmission path). For this reason, the incoming signal can be correctly analyzed with a reduced error rate. More particularly, the characteristics of the incoming signal are analyzed in the fourth embodiment, and the processing to be executed by the equalizer (EQ) 404 is modified according to the analysis results. In other words, optimal processing is executed according to the type of distortion in the input signal. Consequently, it becomes possible to accurately correct various types of distortion produced by channel (i.e., transmission path) conditions. As a result, accurate signal detection is realized for diverse incoming signals.

A5. Embodiment of a Detector Circuit

Embodiment 5

It is also possible provide a detector circuit with a plurality of equalizers (EQ) executing fixed equalization processing. The output of the high-pass filter (HPF) 403 may then be respectively input into each equalizer (EQ) and processed in parallel. The optimal processing result is then selected from the plurality of processing results. A detector circuit having such a configuration is illustrated in FIG. 14.

Figure 14:
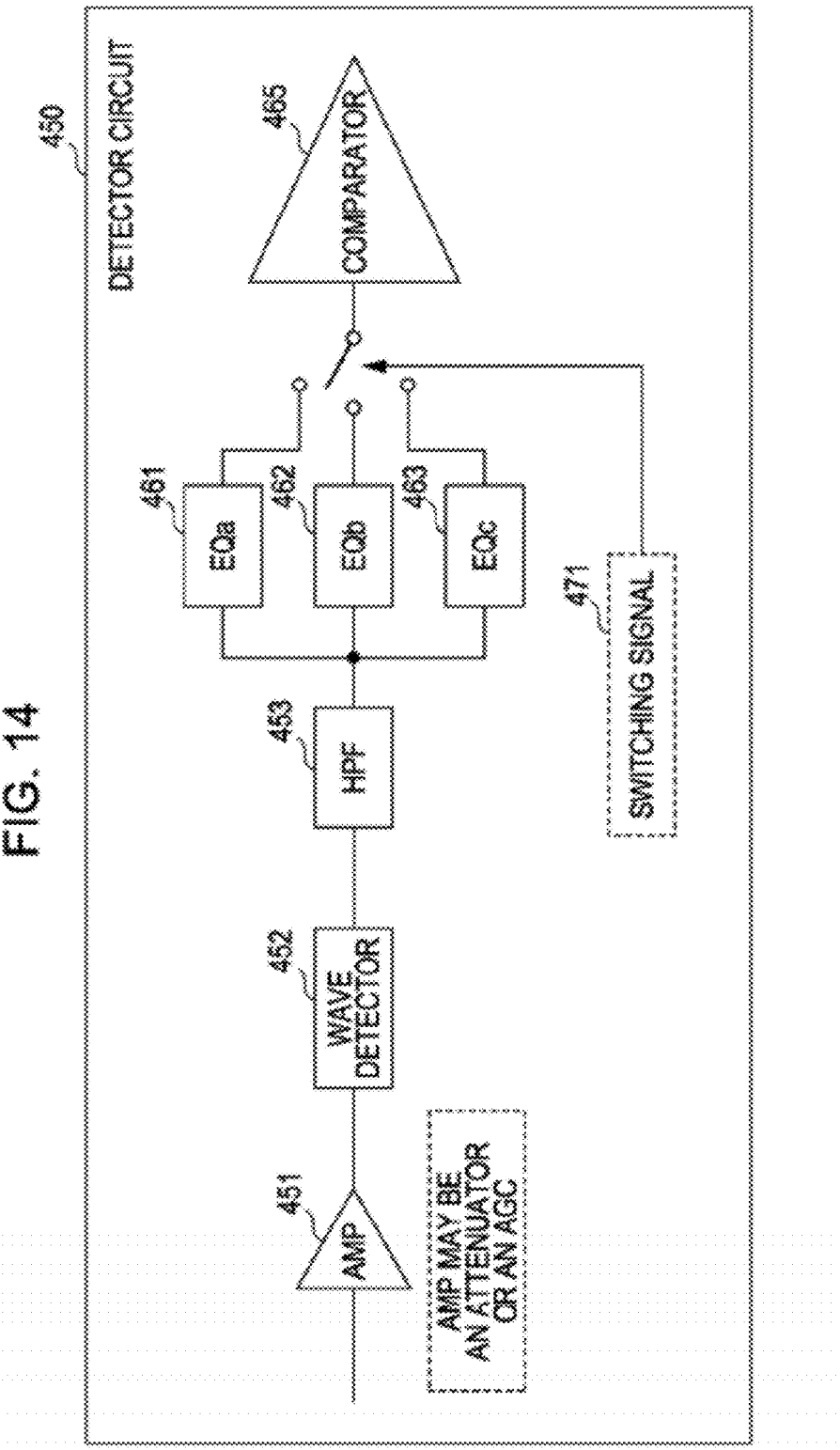
FIG. 14 illustrates the configuration of a detector circuit in a communication apparatus in accordance with a fifth embodiment.

The detector circuit 450 shown in FIG. 14 includes an amp 451, a wave detector 452, a high-pass filter (HPF) 453, an equalizer a (EQa) 461, an equalizer b (EQb) 462, an equalizer c (EQc) 463, and a comparator 465.

The detector circuit 450 of the fifth embodiment is an analog signal processing circuit similar to that described earlier with reference to FIG. 13. The fifth embodiment differs in that three different equalizers conducting three different types of distortion correction are provided.

The equalizer a (EQa) 461, the equalizer b (EQb) 462, and the equalizer c (EQc) 463 receive, in parallel, the output from the high-pass filter (HPF) 453 as input. The high-pass filter (HPF) 453 removes the DC component from the detection signal by setting the median potential of the waveform as the zero level, thereby generating a detection waveform from which the DC offset has been removed.

The equalizer a (EQa) 461, the equalizer b (EQb) 462, and the equalizer c (EQc) 463 each apply different distortion correction to the output of the high-pass filter (HPF) 453. The processing results are output in parallel, but the comparator 465 only accepts one output selected from among the plurality of outputs as input.

In other words, an output selector (i.e., a switch) is controlled according to a switching signal 471, such that only one output is selected from the processing results of the plurality of equalizers and input into the comparator 465. The switching signal 471 is generated in an incoming signal validation circuit not shown in the drawings. The incoming signal validation circuit measures factors such as the incoming signal level and the frequency characteristics of other channels. Input selection is conducted according to the measured results from the incoming signal validation circuit, such that the processing result of the equalizer determined to have executed the optimal equalization processing is input into the comparator 465.

The output signal from the single equalizer (EQ) selected in this way is input into the comparator 465. The comparator 465 generates and outputs a binary (1/0) signal, using the zero level as the threshold value.

Similarly to the other embodiments, the fifth embodiment is provided with an equalizer (EQ), which removes distortions received along the channel (i.e., the transmission path). For this reason, the incoming signal can be correctly analyzed with a reduced error rate. More particularly, the characteristics of the incoming signal are analyzed in the fifth embodiment, and a processing result from one of a plurality of equalizers (EQ) is selected according to the analysis results. In other words, optimal processing is selected according to the type of distortion in the input signal. Consequently, it becomes possible to accurately correct various types of distortion produced by channel (i.e., transmission path) conditions. As a result, accurate signal detection is realized for diverse incoming signals.

The configuration shown in FIG. 14 includes three equalizers, more specifically the equalizer a (EQa) 461, the equalizer b (EQb) 462, and the equalizer c (EQc) 463. Each of the above equalizers conducts different equalization processing. An exemplary configuration of three specific types of equalization will now be described with reference to FIGS. 15A and 15B.

Figure 15A:
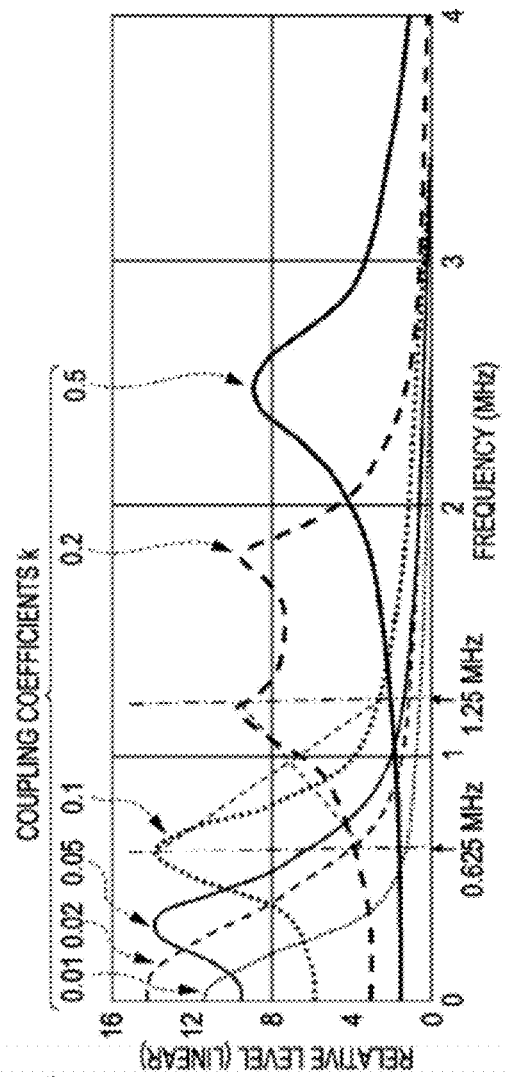
FIG. 15A illustrates frequency characteristics of a baseband signal decoded from a carrier signal that has passed through a system having the characteristics shown in FIG. 5.

FIG. 15A is similar to that described earlier with reference to FIG. 6. FIG. 15A illustrates baseband frequency characteristics, and shows the correspondence between the frequency and the relative (linear) level of the incoming signal strength for various values of the coupling coefficient k from 0.01 to 0.5. As FIG. 15A demonstrates, the frequency characteristics vary significantly depending on the distance (i.e., depending on the coupling coefficient k). Such variation will now be classified into three types.

Consider the frequency with the shortest repeating wavelength (referred to as 1T, since the wavelength varies every clock), a frequency with double that length (referred to as 2T, since the wavelength varies every two clocks), and the DC frequency.

By way of example, consider a transmission system having a 1T of 1.25 MHz and a 2T of 0.625 MHz. In this case, the relationships among the magnitudes of the DC, 2T, and 1T amplitudes can be divided into the following three patterns. These three patterns correspond to the graphs (b1) to (b3) shown in FIG. 15B.

(b1) A(DC)>A(2T)>A(1T)
(b2) A(DC)<A(2T)>A(1T)
(b3) A(DC)<A(2T)<A(1T)

The respective broken lines shown in graphs (b1) to (b3) illustrate relationships between the frequency and incoming signal level for various antenna distances (i.e., different coupling coefficients k).

The frequency characteristics that correct (i.e., equalize) the above relationships should exhibit inverse amplitude characteristics. Consequently, the correction characteristics (i.e., equalization curves) with respect to the graphs (b1) to (b3) shown in FIG. 15B are as follows.

(b1) A(DC)<A(2T)<A(1T)
(b2) A(DC)>A(2T)<A(1T)
(b3) A(DC)>A(2T)>A(1T)

Figure 15B:
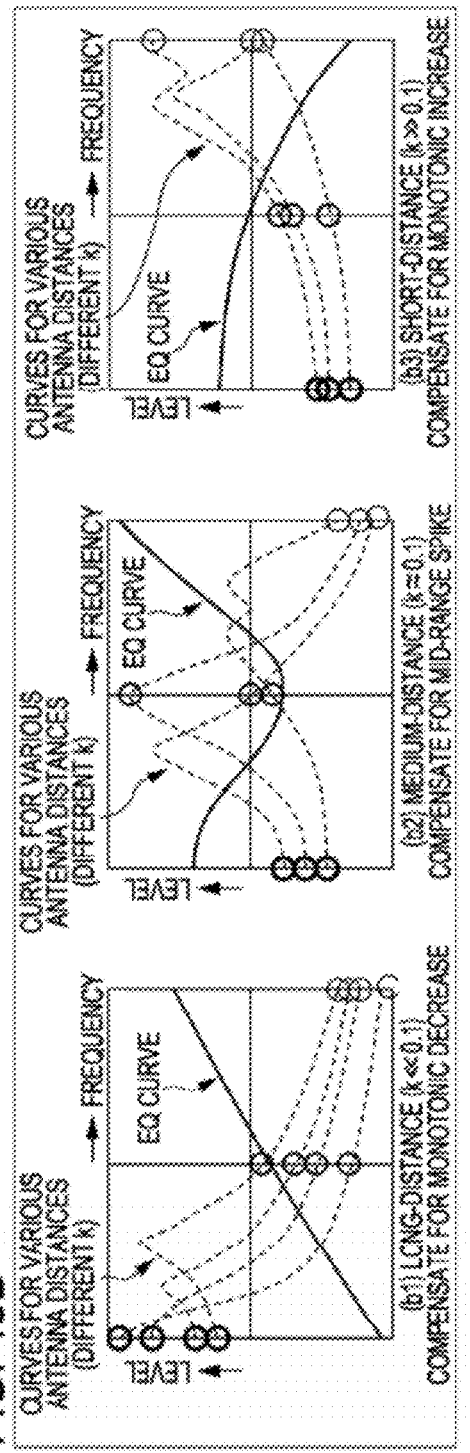
FIG. 15B explains the processing executed by three equalizers of a detector circuit in a communication apparatus in accordance with the fifth embodiment.

The respective solid lines in the graphs (b1) to (b3) shown in FIG. 15B represent these correction characteristics (i.e., equalization curves).

The three equalizers EQa 461, EQb 462, and EQc 463 shown in FIG. 14 are respectively set to conduct processing in accordance with the equalization curves indicated by the solid lines in graphs (b1) to (b3) shown in FIG. 15B. Further-more, the input signal is analyzed, it is determined which broken line pattern in the graphs (b1) to (b3) is most similar to the input signal, and the line pattern determined to be the most similar is selected. The output of the equalizer that conducts processing according to the equalization curve (i.e., one of the solid lines in graphs (b1) to (b3)) corresponding to the selected pattern is then selected as the input for the comparator.

By processing in this way, the optimal equalization result (i.e., distortion-corrected result) for the input signal is selected and input into the comparator 465, thereby enabling accurate signal detection in the comparator 465.

A6. Embodiment of a Detector Circuit

Embodiment 6

Another example similar to the fifth embodiment will now be described with reference to FIG. 16. In this example, a plurality of equalizers (EQ) executing fixed equalization processing are provided, with each equalizer (EQ) made to execute different processing. The optimal processing result is then selected therefrom.

Figure 16:
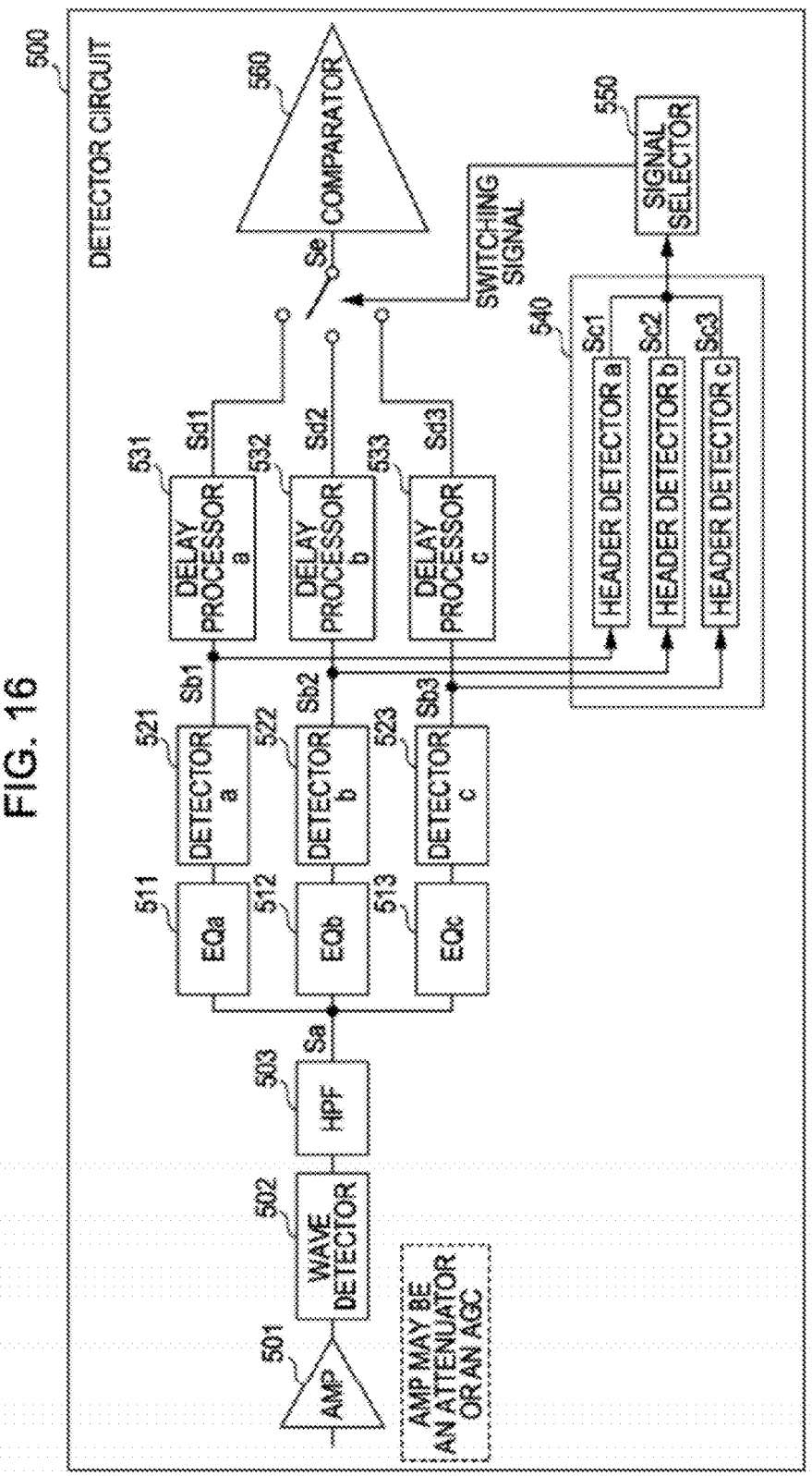
FIG. 16 illustrates the configuration of a detector circuit in a communication apparatus in accordance with a sixth embodiment.

The detector circuit 500 shown in FIG. 16 includes an amp 501, a wave detector 502, a high-pass filter (HPF) 503, an equalizer a (EQa) 511, an equalizer b (EQb) 512, an equalizer c (EQc) 513, detectors a to c (521 to 523), delay processors a to c (531 to 533), a header detector 540, a signal selector 550, and a comparator 560.

The detector circuit 500 of the sixth embodiment is an analog processing signal similar to that described earlier with reference to FIGS. 13 and 14. Similarly to the fifth embodiment described with reference to FIG. 14, the sixth embodiment includes three different equalizers conducting three different types of distortion correction.

The equalizer a (EQa) 511, the equalizer b (EQb) 512, and the equalizer c (EQc) 513 receive, in parallel, the output from the high-pass filter (HPF) 503 as input. The high-pass filter (HPF) 503 removes the DC component from the detection signal by setting the median potential of the waveform as the zero level, thereby generating a detection waveform from which the DC offset has been removed.

The equalizer a (EQa) 511, the equalizer b (EQb) 512, and the equalizer c (EQc) 513 each apply different distortion correction to the output of the high-pass filter (HPF) 503.

The processing results are respectively input into the detectors a to c (521 to 523). The detectors a to c (521 to 523) are, for example, comparators that make a binary (1/0) determination based on whether the signal waveform of a given equalization result is above or below the center potential.

Figure 17:
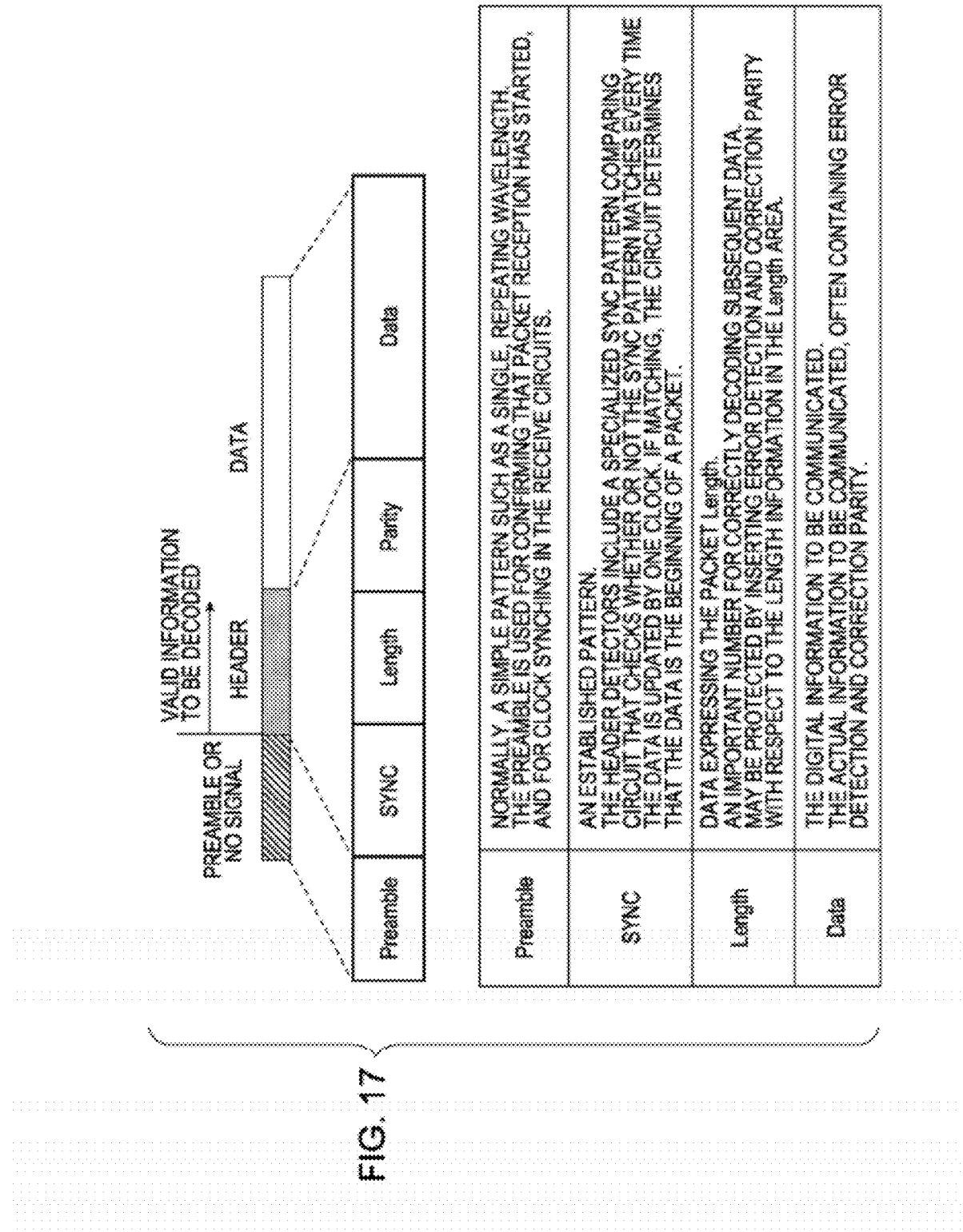
FIG. 17 explains the structure of packets sent and received by a communication apparatus in accordance with an embodiment.

The output of the detectors a to c (521 to 523) is input into the header detector 540. Data exchanged between communication apparatus has the structure shown in FIG. 17. As shown in FIG. 17, a packet contains a preamble (or null signal portion), a header, and data.

The header contains portions such as a synchronization (SYNC) signal used for bit synchronization, a length specifying the packet length, and an error detection (parity) signal with respect to the length. The header is an important part for detecting the packet as a whole.

The header detector 540 included in the detector circuit 500 shown in FIG. 16 detects the SYNC pattern signal from the header. The SYNC pattern signal is pre-established in the receiver. The header detector 540 is a comparing circuit specifically for the SYNC pattern, and operates by shifting the header data in predetermined units every time the data is updated by one clock, and then determining whether or not a portion matching the pre-established SYNC pattern exists. If a matching portion does exist, that portion can be determined to be the beginning of a packet.

If a matching portion is discovered, it is determined that there has been little to no distortion during data transmission. If a matching portion is not found, then it can be determined that the signal has been significantly distorted during data transmission. By making such determinations with respect to the processing results from the three types of equalizers, it becomes possible to select the equalizer that has succeeded in extracting the correct transmit information by means of optimal distortion correction.

If parity is set in the header as an error detection function, then the header detector 540 may also use the parity data in the header to detect the presence or absence of error, in addition to the SYNC detection. The packet with the least amount of error can then be determined to be the optimal equalization result.

The signal selector 550 receives at least one of either the results of the SYNC information detection or error detection that were executed in the header detector 540 with respect to the processing results of the three equalizers. The signal selector 550 then selects the equalizer that either succeeded in detecting the SYNC information or produced the output with the least amount of detection error. This equalizer is selected by the signal selector 550 as the equalizer that has conducted the optimal equalization processing. In other words, the output select (i.e., the switch) is controlled by the selection result of the signal selector 550, with the output of the selected equalizer being input into the comparator 560.

The delay processors 531 to 533 are set with a delay that takes into account the processing time of the header detector 540 and the signal selector 550. The delay processors 531 to 533 output their contents after holding the output of the detectors 521 to 523 for an amount of time equivalent to the processing time of the header detector 540 and the signal selector 550.

Figure 18:
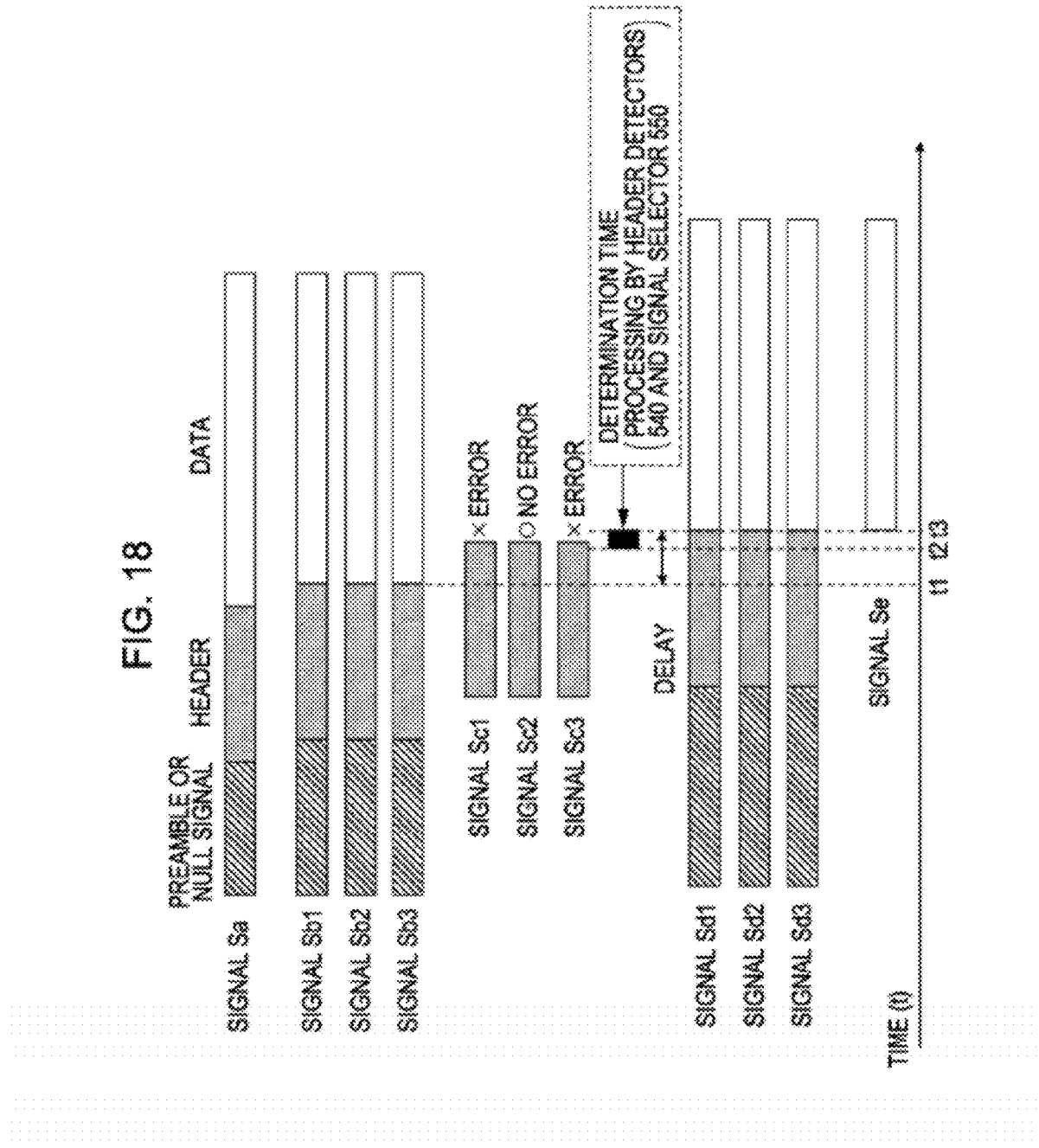
FIG. 18 explains the transmission sequence for a signal in the detector circuit of the communication apparatus in accordance with the sixth embodiment (FIG. 16)

FIG. 18 is a timing chart explaining the signal input and output timings for the respective components of the detector circuit shown in FIG. 16. Time t passes from left to right as shown in FIG. 18. The output packet is made up of a preamble, a header, and a data portion, as described using FIG. 17.

The signals Sa to Se shown in FIG. 18 correspond to the signals Sa to Se shown in FIG. 16. The signal Sa corresponds to the output of the high-pass filter (HPF) 503. The signals Sb1 to Sb3 correspond to the outputs of the detectors a to c (521 to 523). The signals Sc1 to Sc3 correspond to the output of the header detector 540. The signals Sd1 to Sd3 correspond to the output of the delay processors 531 to 533. The signal Se corresponds to the input of the comparator 560.

The time from t1 to t3 is the delay processing time in the delay processors 531 to 533. The time from t2 to t3 is equivalent to the processing time of the header detector 540 and the signal selector 550. Thus, at the time t3, the completion of the determination processing coincides with the output from the delay processors 531 to 533.

According to the evaluation results produced in the header detector 540 with respect to the headers in the three equalization results, and also according to the selection result specifying the equalizer that conducted optimal equalization, the signal selector 550 conducts a control such that the output of the selected equalizer is input into the comparator 560. In the example shown in FIG. 18, the header corresponding to the signal Sc2 is evaluated highly, and thus the output of the equalizer that output that header (such as the equalizer b (EQb) 512 shown in FIG. 16, for example) is output to the comparator 560.

The output signal of the selected equalizer (EQ) thus selected is input into the comparator 560. The comparator 560 generates and outputs a binary (1/0) signal, using the zero level as the threshold value.

Similarly to the other embodiments, the sixth embodiment is provided with an equalizer (EQ), which removes distortions received along the channel (i.e., the transmission path). For this reason, the incoming signal can be correctly analyzed with a reduced error rate. More particularly, the header contained in the incoming signal is analyzed in the sixth embodiment, and at least one of either the SYNC pattern or the error rate is analyzed.

Using the analysis result, the optimal processing result is selected from among the processing results of a plurality of equalizers (EQ). By means of such processing, the equalizer (EQ) that actually executed optimal equalization is selected. Consequently, it becomes possible to accurately correct various types of distortion produced by channel (i.e., transmission path) conditions. As a result, accurate signal detection is realized for diverse incoming signals.

B. Embodiment wherein Optimal Equalization is Conducted on the Basis of Signal Level Information from the Transmitting Apparatus Next, an embodiment will be described wherein optimal equalization is conducted on the basis of signal level information from the transmitting apparatus. As described in the above section A, an equalizer (EQ) is provided in the detector circuit of the receiving apparatus, and distortion received along the channel (i.e., the transmission path) is removed by equalization. In so doing, it becomes possible to increase the extraction precision of the incoming bit sequence.

For example, as shown in FIGS. 14 and 16, the detector circuits of the fifth and sixth embodiments described earlier include a plurality of equalizers (EQ) having different equalization curves, with different distortion correction being executed in each equalizer (EQ). By utilizing a plurality of equalizers (EQ) having different equalization curves in this way, it becomes possible to optimally correct (i.e., equalize) signals having a variety of distortion patterns.

As described earlier with reference to FIG. 15A, the baseband frequency characteristics differ according to the coupling coefficient k, or more specifically, according to the distance between the transmitter and receiver antennas, for example. These characteristics can be roughly classified into patterns like those indicated by the broken lines in graphs (b1) to (b3) shown in FIG. 15B. More specifically, the baseband frequency characteristics can be classified into the following three patterns.

(b1) Monotonically decreasing (i.e., a falling curve)
(b2) Central spike (i.e., a peaked curve)
(b3) Monotonically increasing (i.e., a rising curve)

Preferably, the corrections for these three different patterns of frequency characteristics (i.e., the equalizer frequency characteristics applied during equalization) exhibit amplitude characteristics that are the respective inverses of the above three patterns. In other words, the solid lines in graphs (b1) to (b3) shown in FIG. 15B are the optimal equalizer frequency characteristics with respect to each pattern.

In the fifth embodiment described earlier and with reference to FIG. 14, the three equalizers are configured having the equalizer frequency characteristics respectively indicated by the solid lines in graphs (b1) to (b3) shown in FIG. 15B. In other words, the equalizer a (EQa) 461, the equalizer b (EQb) 462, and the equalizer c (EQc) 463 shown in FIG. 14 each conduct equalization processing using the equalizer frequency characteristics indicated by the solid lines in graphs (b1) to (b3) shown in FIG. 15B, for example.

In this way, the fifth embodiment described with reference to FIG. 14 is configured to analyze the characteristics of the input signal, determine which of the broken line patterns in graphs (b1) to (b3) shown in FIG. 15B is most similar to the input signal, and then select the pattern determined to be the most similar. The equalization output produced using the equalizer frequency characteristics that are the inverse of the selected pattern (i.e., one among the equalizer frequency characteristics according to the solid lines in graphs (b1) to (b3) shown in FIG. 15B) is then selected as the input for the comparator.

Additionally, the sixth embodiment described with reference to FIG. 16 is configured similarly to the fifth embodiment, with the equalizer a (EQa) 511, the equalizer b (EQb) 512, and the equalizer c (EQc) 513 configured to conduct three different equalization processes. In the sixth embodiment, the equalization results from the above three equalizers are all inspected, and the signal with the highest signal detection accuracy is selected as the final output.

In fifth and sixth embodiments described above, special processing is not conducted in the data transmitter, with the process for obtaining the optimal equalization result being conducted only in the receiver. In contrast, in the embodiment to be hereinafter described, the transmitting apparatus that transmits the signal measures the signal level of the signal to be transmitted, and transmits the measured information to the receiving apparatus. The receiving apparatus then executes optimal equalization processing using this signal level information.

B1. Explanation of Optimal Equalizer Frequency Characteristics with Respect to Transmit Signal Before describing the present embodiment, optimal equalizer frequency characteristics with respect to the transmit signal from the transmitter will be described with reference to FIGS. 19 to 21.

Figure 19:
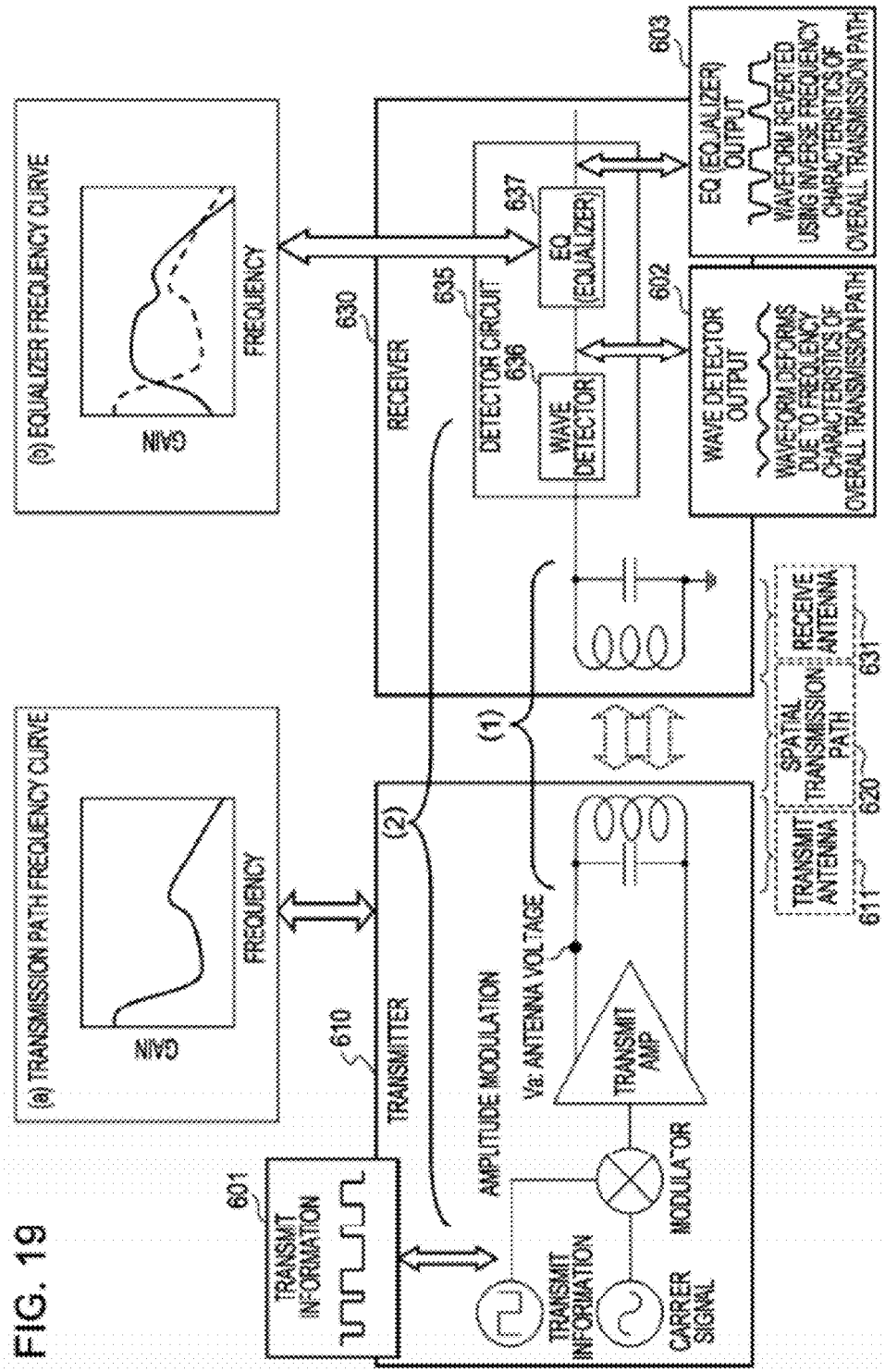
FIG. 19 illustrates an exemplary configuration of a communication apparatus in accordance with an embodiment.

FIG. 19 illustrates an extracted portion of the configuration of the reader/writer and the transponder described earlier with reference to FIG. 8. One apparatus is depicted as the transmitter 610, while the other apparatus is depicted as the receiver 630. The configuration shown in FIG. 19 is a simplified one, with the components pertinent to transmission shown in the transmitter 610, and the component pertinent to reception shown in the receiver 630. The receiver 630 is provided with an equalizer (EQ) 637 like those described in each of the foregoing embodiments.

The transmitter 610 modulates transmit information 601 onto a carrier signal and transmits via a transmit antenna 611. The transmit signal travels along a spatial transmission path 620 and is received by the receive antenna 631 of the receiver. The incoming (i.e., receive) signal of the receive antenna 631 is then input into a wave detector 636 within the detector circuit 635. The wave detector 636 receives the incoming information modulated onto the carrier signal as input, analyzes the envelope variation of the carrier signal, and generates a detection signal containing the incoming information. As a result, the wave detector 636 outputs the wave detector output 602 shown in FIG. 19. As shown in FIG. 19, this wave detector output 602 is a signal whose waveform has been distorted by the frequency characteristics of the entire transmission path.

At this point, if the signal is detected in the comparator or similar component, there is a high probability of detection error. In order to prevent such error, equalization is performed as a means of distortion correction in the equalizer (EQ) 637, as described in the earlier embodiments. As a result of the equalization, the corrected equalizer output 603 shown in FIG. 19 is obtained. In the equalizer (EQ) 637, optimal correction is made possible by conducting equalization using a signal having frequency characteristics that are the inverse of the transmission path frequency characteristics.

The transmission path frequency characteristics in graph (a) shown at the top of FIG. 19 are exemplary frequency characteristics for the transmission path between the output of the transmit information at the transmitter 610 and the wave detector 636 in the receiver 630. These frequency characteristics vary according to factors such as the distance between the transmitter and receiver antennas.

Meanwhile, the solid shown in graph (b) indicates the frequency characteristics of the signal applied in the equalization processing in the equalizer, while the broken line indicates the transmission path frequency characteristics shown in graph (a). In this way, optimal equalization thus becomes possible by means of a signal having frequency characteristics in an inverse pattern to the transmission path characteristics.

Figure 20:
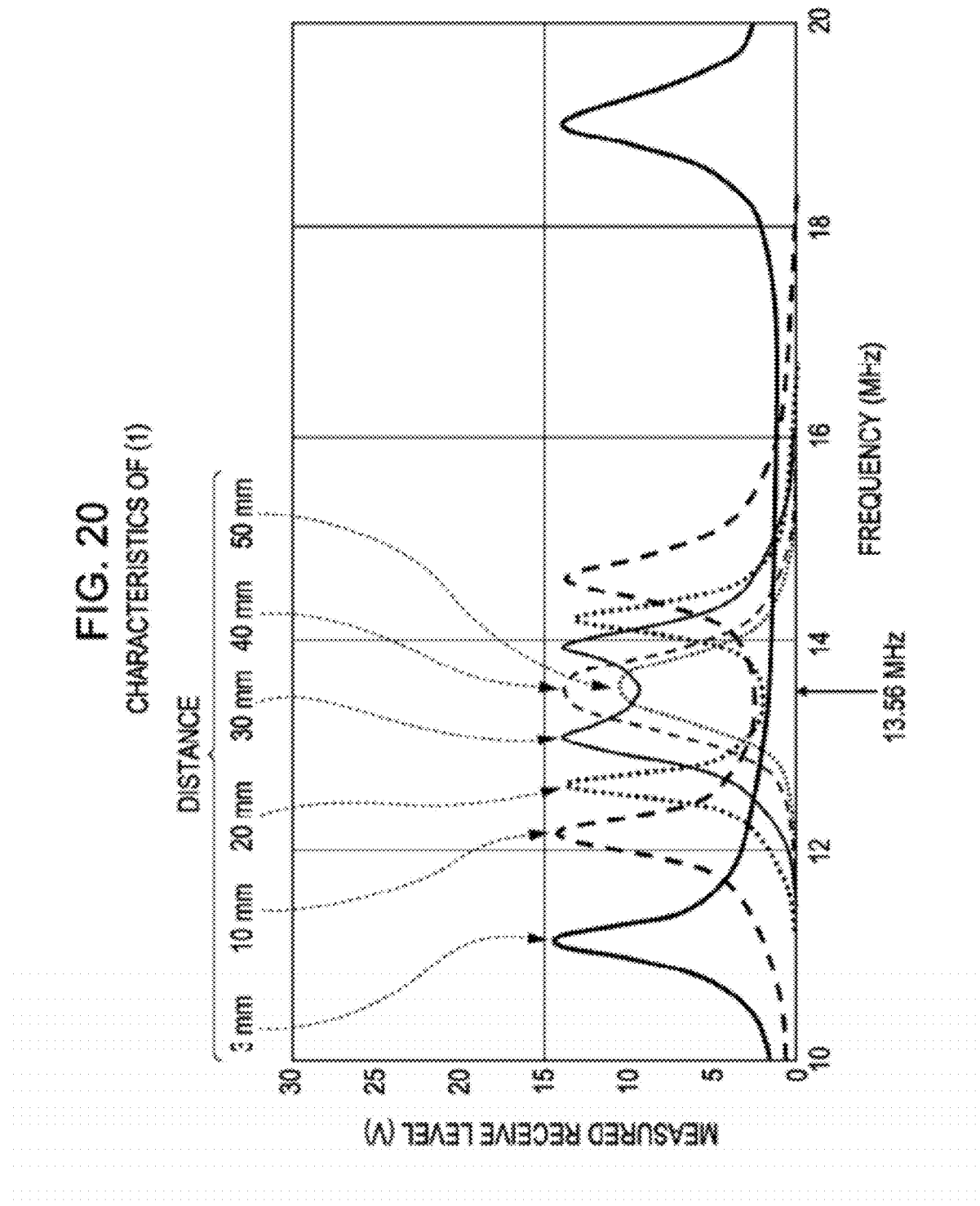
FIG. 20 illustrates the transmission frequency characteristics between the antennas of a transmitter and a receiver.
Figure 21:
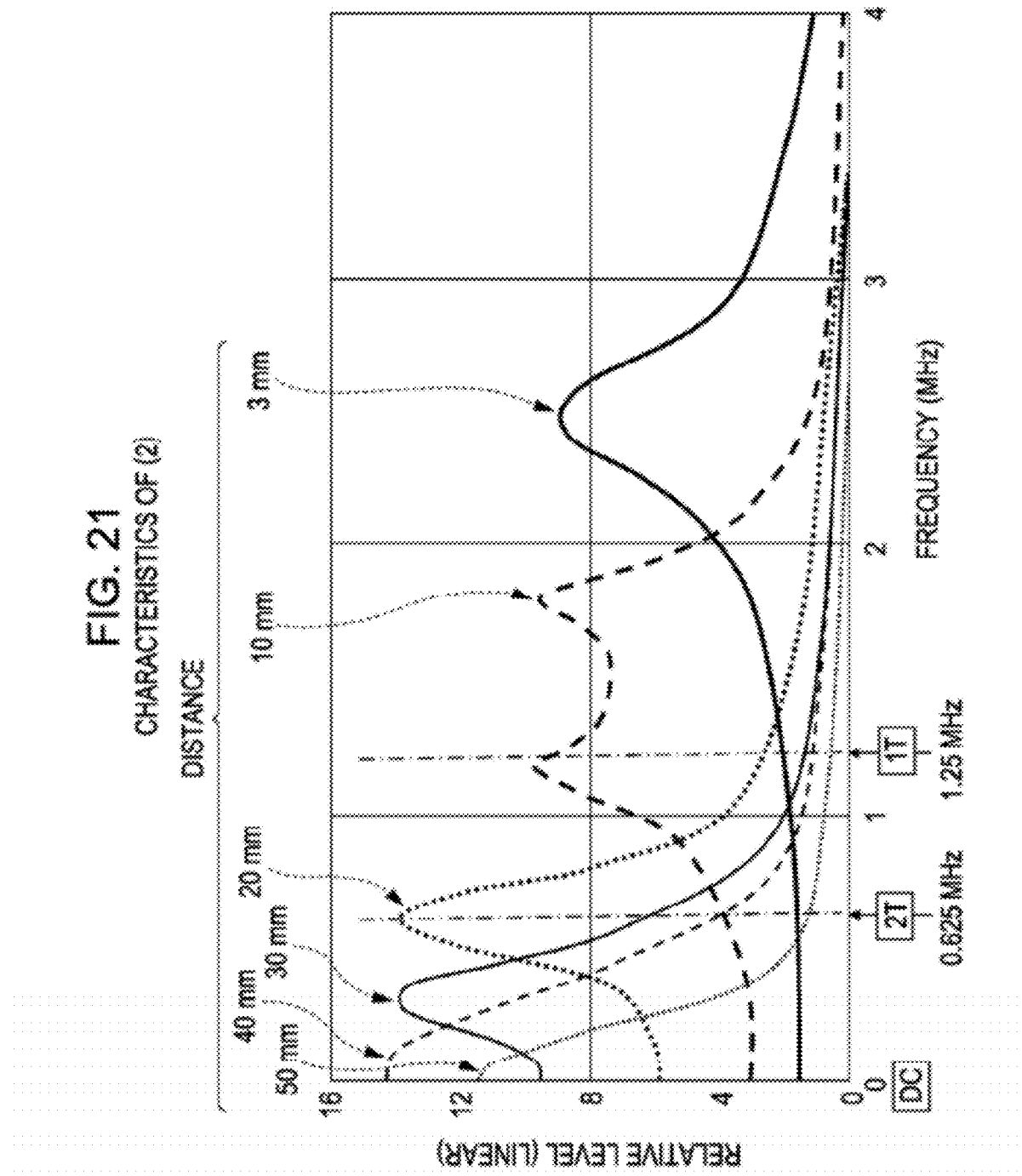
FIG. 21 illustrates the frequency characteristics of a baseband signal (i.e., a post-detection signal)

FIGS. 20 and 21 illustrate the frequency characteristics of the signal transmission segments (1) and (2) shown in FIG. 19. More specifically, (1) transmission frequency characteristics between antennas (FIGS. 20), and (2) frequency characteristics of the baseband signal (i.e., the post-detection signal) (FIG. 21) are illustrated.

Figure 4:
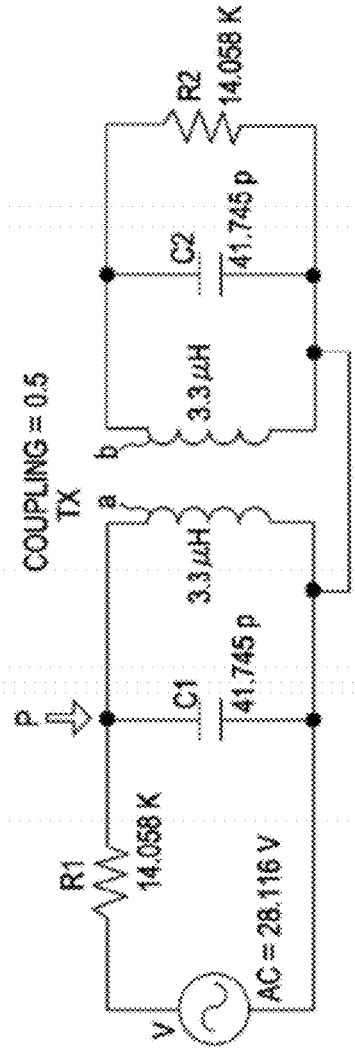
FIG. 4 explains the principle whereby the resonating frequency of two coils varies according to the distance between the coils, and how a 13.56 MHz carrier frequency falls into the valley between two peaks.
Figure 5:
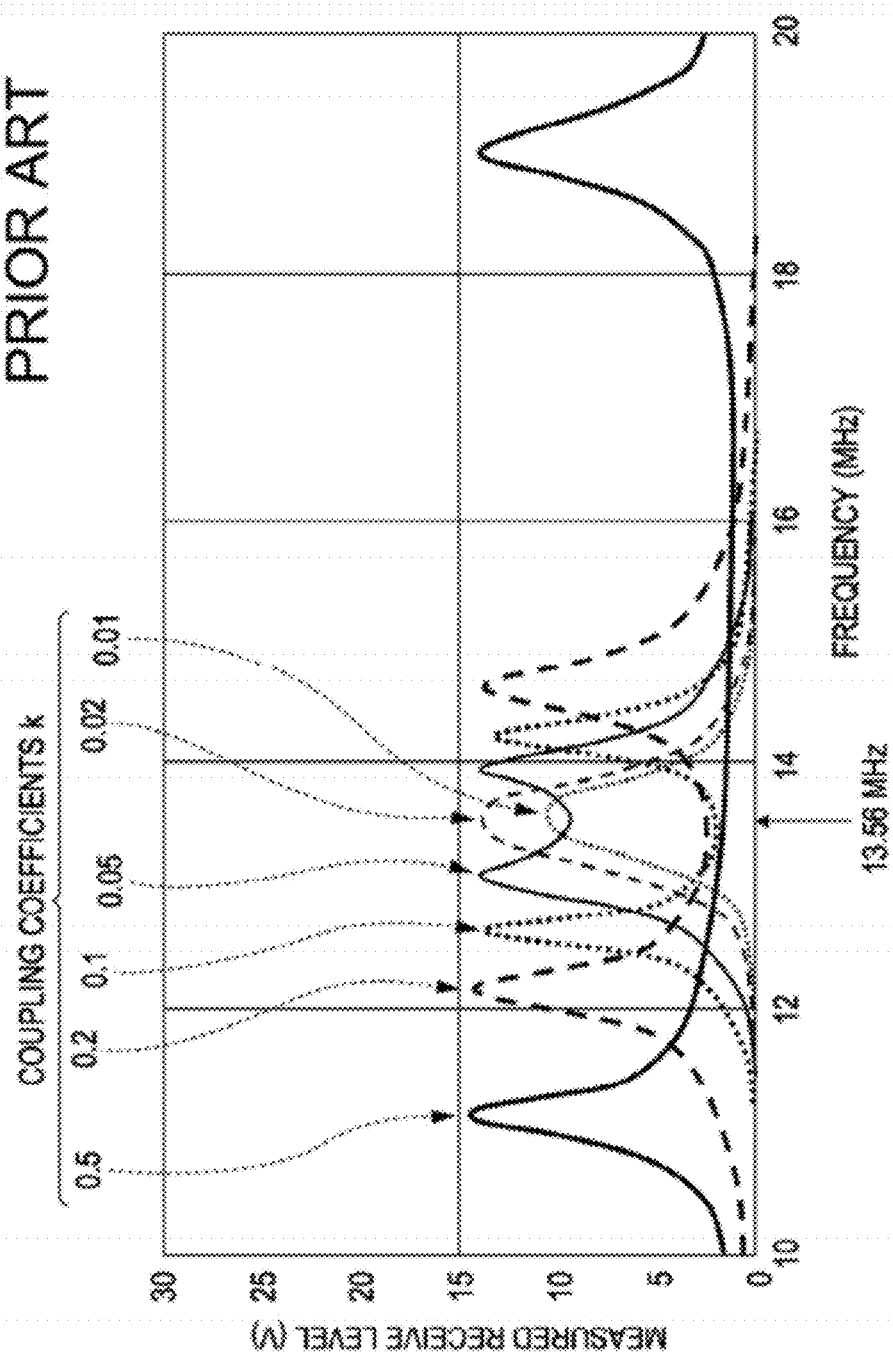
FIG. 5 explains the principle whereby the resonating frequency of two coils varies according to the distance between the coils, and how a 13.56 MHz carrier frequency falls into the valley between two peaks.

In the graph (1) of transmission frequency characteristics between antennas in shown in FIG. 20, the horizontal is set to frequency, while the vertical axis is set to the incoming signal level. The graph (1) shown in FIG. 20 is similar to the graph of frequency characteristics described earlier with reference to FIG. 5. However, while FIG. 5 illustrates characteristics with respect to the coupling coefficient k, FIG. 20 illustrates characteristics with respect to the distance between the transmitter and receiver antennas. FIG. 20 illustrates the relationship between the frequency and the incoming signal level for antenna distances from 3 mm to 50 mm.

Figure 6:
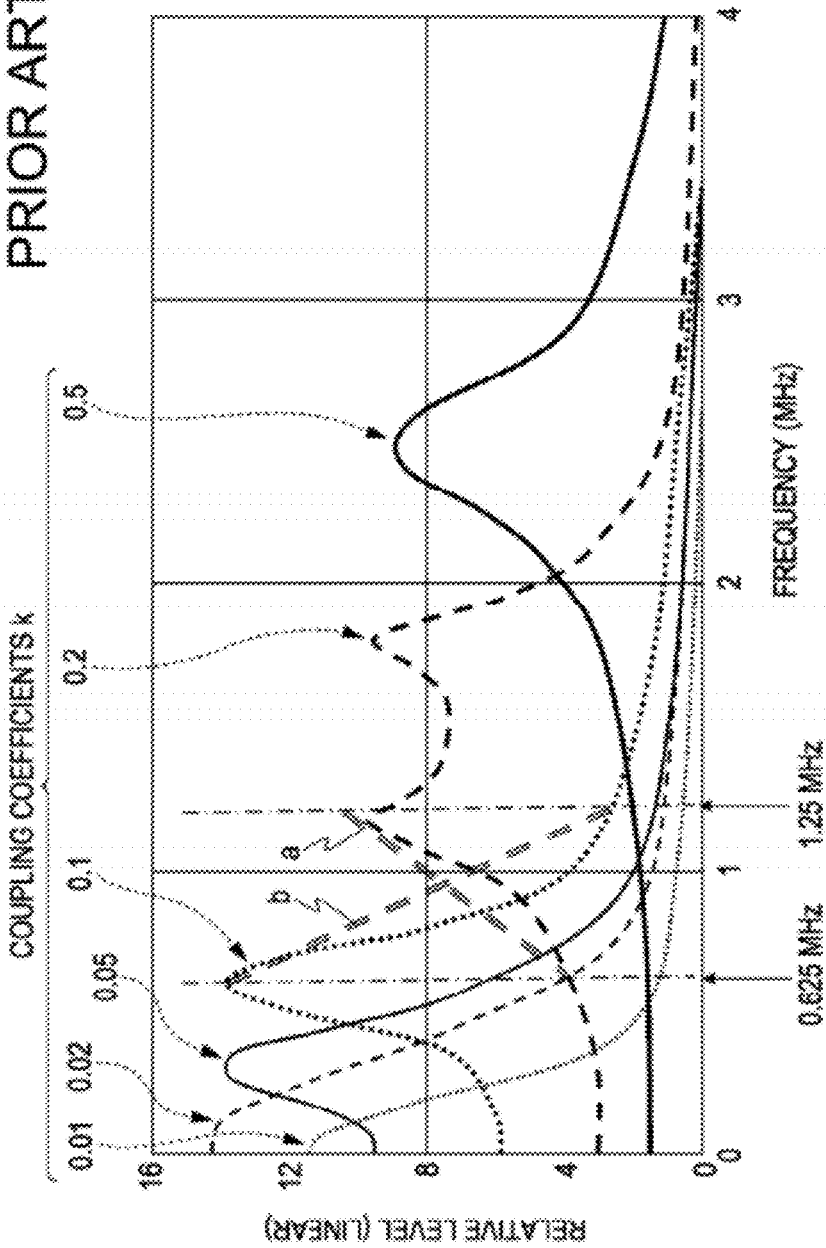
FIG. 6 illustrates the frequency characteristics of a baseband signal decoded from a carrier signal that has passed through a system having the characteristics shown in FIG. 5.
Figure 7:
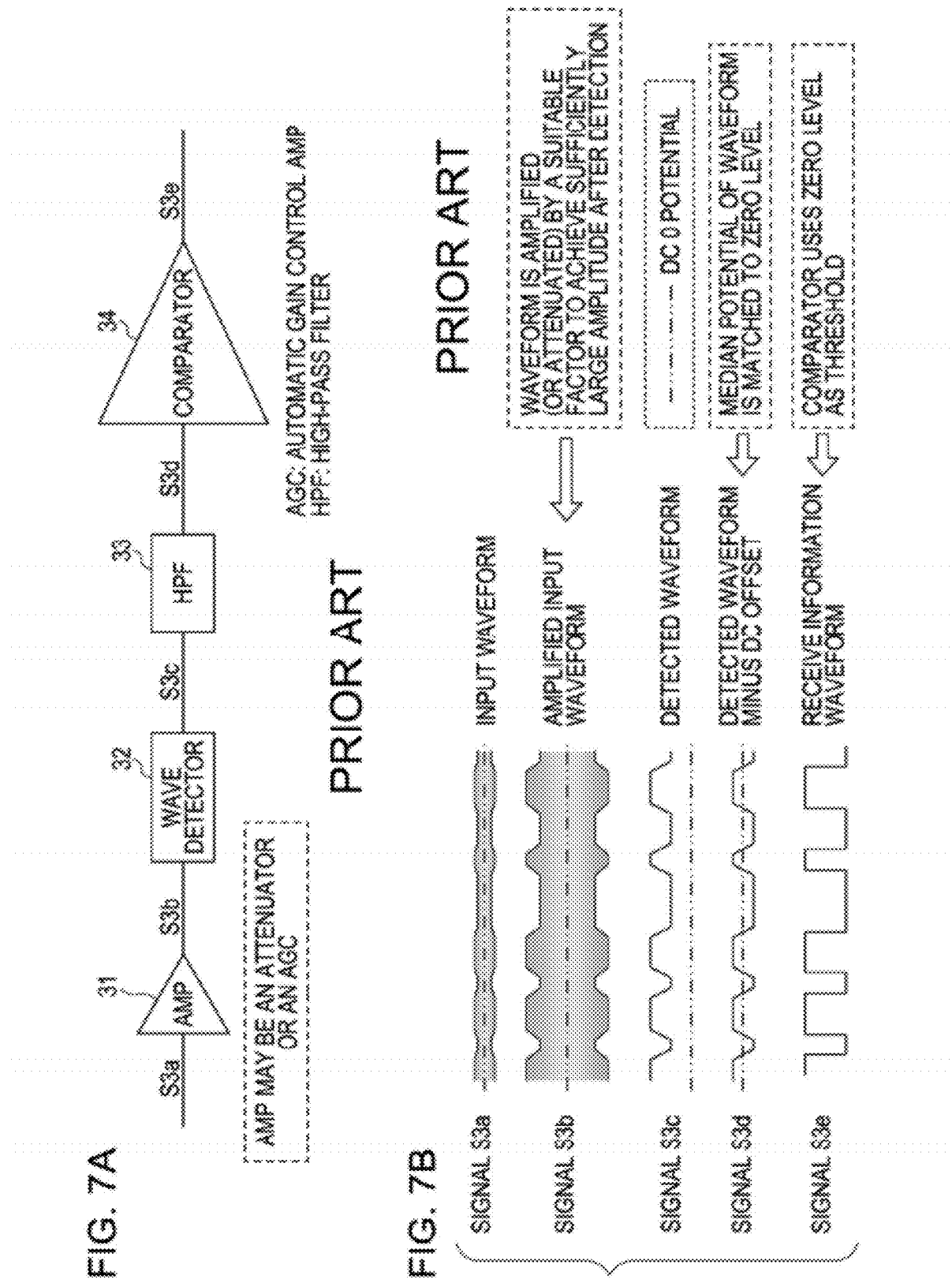
FIG. 7A illustrates a typical configuration of an incoming signal detector circuit in a communication apparatus of the related art.
FIG. 7B explains detection signals in the detector circuit shown in FIG. 7A.

FIG. 21 is a graph illustrating the relationship between the frequency and the relative (linear) level of the incoming signal strength. FIG. 21 is similar to the graph of frequency characteristics described earlier with reference to FIG. 6. However, while FIG. 6 illustrates characteristics with respect to the coupling coefficient k, FIG. 21 illustrates characteristics with respect to the distance between the transmitter and receiver antennas. FIG. 21 illustrates the relationship between the frequency and the incoming signal level for antenna distances from 3 mm to 50 mm.

The level of the 13.56 MHz carrier frequency shown in FIG. 20 is equivalent to the DC (i.e., 0 Hz frequency) level in FIG. 21. The average of the measured incoming signal levels (13.56+X) MHz and (13.56−X) MHz in FIG. 20 is thus equivalent to the relative level of the frequency X (MHz) shown in FIG. 21.

FIGS. 20 and 21 thus demonstrate that the incoming signal strength and resonant frequency varies significantly with small differences in the distance between the transmitter and receiver antennas. As the transmitter and receiver antennas become farther separated and the communication distance increases, the upper range attenuates sharply. However, if the transmitter and receiver antennas are brought close together and the communication distance is decreased, then a peak develops in the upper range. The input signal frequency characteristics with respect to the equalizer (EQ) 637 in the receiver 630 shown in FIG. 19 correspond to one of the frequency curves shown in FIG. 21, and as shown in FIG. 21, these curves differ significantly according to the distance between the transmitter and receiver antennas.

As a result, in order for the equalizer (EQ) 637 of the receiver 630 to perform optimal correction, it is desirable for the equalizer frequency characteristics applied in equalization to be modified according to the distance between the transmitter and receiver antennas. For example, the equalizer frequency characteristics to be applied may be determined from among the three patterns of signals indicated by the solid lines in graphs (b1) to (b3) shown in FIG. 15B and described earlier, for example. In the embodiment to be hereinafter described, information applied to the above determination is provided by the transmitter.

As described with reference to FIG. 21, frequency characteristics of the baseband signal (i.e., the post-detection signal) in the incoming signal differs according to the antenna distance. Consequently, if the distance between the antennas can be discovered by some means, then the optimal equalization curve can be determined.

In order to achieve the above process, in the present embodiment, the transmit antenna level (i.e., the antenna voltage Va) of the transmitter 610 shown in FIG. 19 is measured, and the measured antenna level information is provided to the receiver 630.

The transmit antenna level (i.e., voltage) varies according to the distance between the transmitter and receiver antennas. The correspondence between the transmit antenna level (i.e., voltage) and the distance between the transmitter and receiver antennas will now be described with reference to FIG. 22. In the graph shown in FIG. 22, the horizontal axis represents the distance between the transmitter and receiver antennas, while the vertical axis represents the transmit antenna level (in relative voltage) at the transmitter. The transmit antenna level corresponds to the antenna voltage Va of the transmit antenna 611 shown in FIG. 19.

Figure 22:
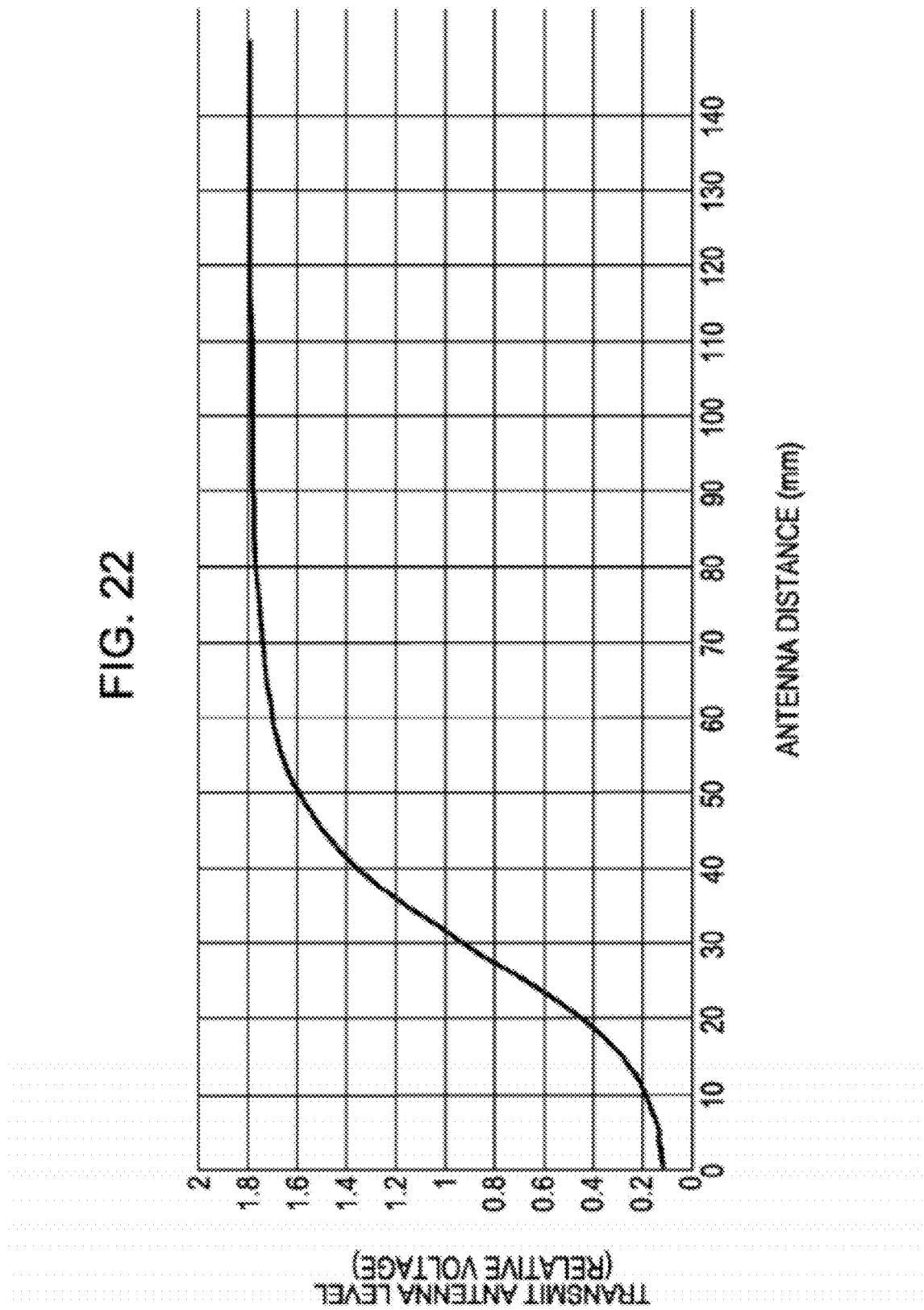
FIG. 22 illustrates the correspondence between the transmit antenna level (i.e., its voltage) and the distance between the transmit and receive antennas.

As shown in FIG. 22, the carrier level of the transmitter antenna monotonically decreases as the distance between the transmitter and receiver antennas decreases, with the transmit antenna level (i.e., the antenna voltage Va) also monotonically decreasing. For this reason, if the antenna voltage at the transmitter is measured, then decreases in its level can be used to determine that the receiver antenna has moved closer. The antenna distance can be determined to be short to the degree that the level has significantly decreased.

As shown in FIG. 22, the frequency characteristics are affected by the distance between the transmitter and receiver antennas. If the antenna distances decreases, then the voltage level of the transmitter antenna decreases. If the antenna distance increases, then the voltage level of the transmitter antenna increases. The transmit antenna voltage information is thus measured at the transmitter, and the measured voltage information is then provided to the receiver. In the receiver, the approximate antenna distance can be estimated according to this information. Since the antenna distance and the transmission path frequency characteristics exist in the relationship shown in FIG. 21, it also becomes possible to predict the transmission path frequency characteristics on the basis of the estimated antenna distance. The receiver performs equalization by selecting equalizer frequency characteristics that are the inverse of the predicted transmission path frequency characteristics. By performing such equalization processing, optimal equalization (i.e., correction) becomes possible, and accurate signal detection is realized.

B2. Embodiment wherein Equalization is Optimized on the Basis of Signal Level Information

Embodiment 7

Figure 23:
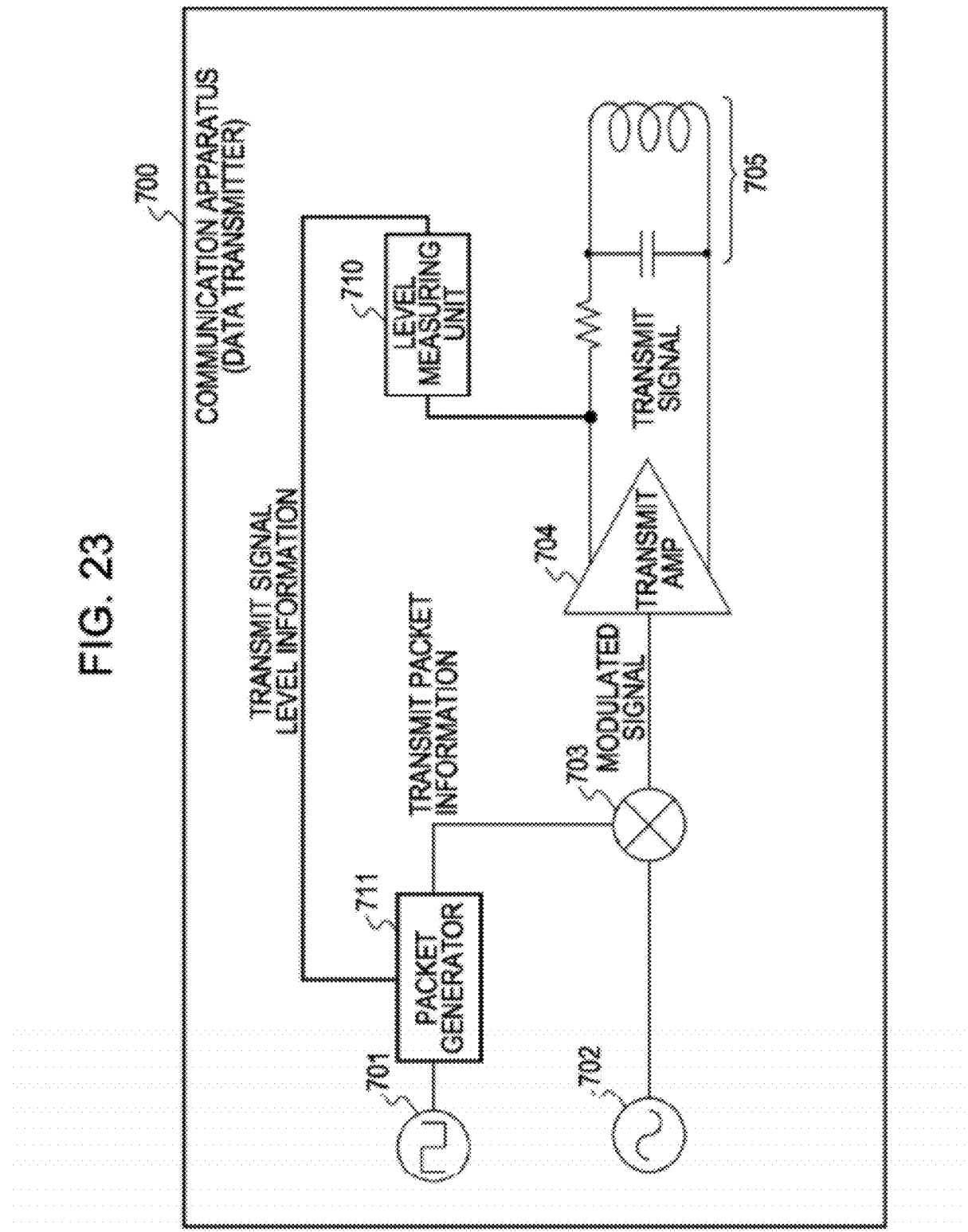
FIG. 23 illustrates an exemplary configuration of a data-transmitting communication apparatus.

FIG. 23 illustrates an exemplary configuration of a data transmitting communication apparatus 700 in accordance with the present embodiment. The communication apparatus 700 may be the reader/writer 100 or the transponder 200 described earlier with reference to FIG. 8, for example. However, FIG. 23 illustrates only the components of such apparatus that relate to data transmission.

In the communication apparatus 700 shown in FIG. 23, transmit information 701 is modulated onto a carrier signal 702. This modulated signal is generated in a modulator 703, and then transmitted from a transmit amp 704 via a transmit antenna 705. This configuration is the same as that of the reader/writer 100 described earlier with reference to FIG. 8. The communication apparatus 700 of the present embodiment also includes a level measuring unit 710 and a packet generator 711.

It should be appreciated that a packet generator also exists in the reader/writer 100 described earlier with reference to FIG. 8, but is omitted from illustration in FIG. 8. The packet generator in the reader/writer 100 described with reference to FIG. 8 generates packets having a structure for storing transmit information as data like that described earlier with reference to FIG. 17.

The packet generator 711 in the present embodiment not only generates packets storing transmit information, but additionally generates packets storing antenna level (i.e., antenna voltage Va) information regarding the transmit antenna 705, as measured by the level measuring unit 710. A packet storing such antenna level (i.e., antenna voltage Va) information is transmitted to the receiver.

Herein, it is desirable for the antenna level information to be provided to the receiver before the transmit data itself is transmitted. Consequently, a packet generation process different from that of ordinary transmit information is conducted. Specific storage examples for antenna level information packets will be given later.

Figure 24:
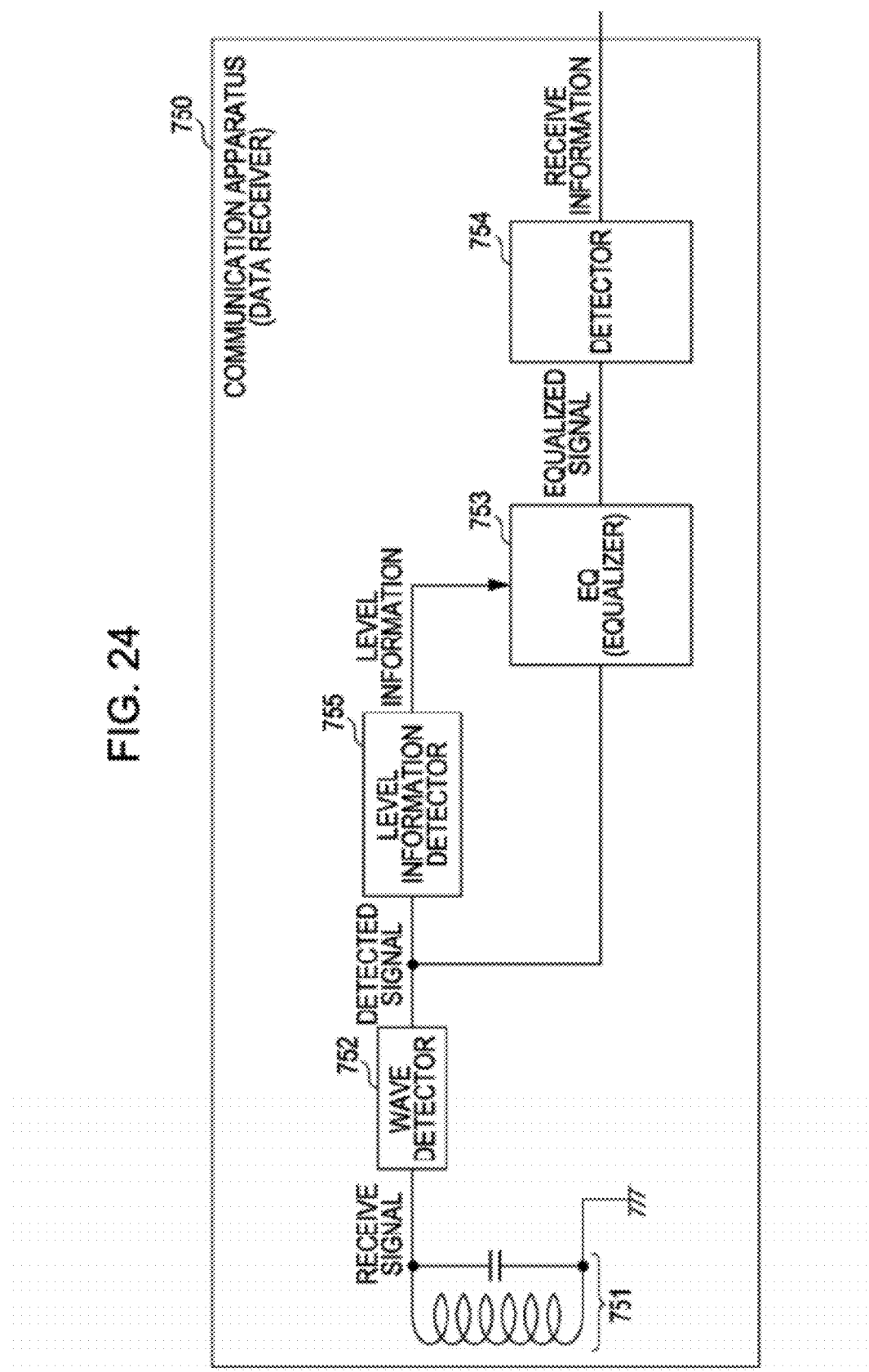
FIG. 24 illustrates an exemplary configuration of a data-receiving communication apparatus.

An exemplary configuration of a data receiving communication apparatus 750 in accordance with the present embodiment will now be described with reference to FIG. 24. The communication apparatus 750 may be the reader/writer 100 or the transponder 200 described earlier with reference to FIG. 8, for example. However, FIG. 24 illustrates only the components of such apparatus that relate to data reception.

In the communication apparatus 750, a signal received via an antenna 751 is detected in a wave detector 752. The wave detector 752 receives incoming information modulated onto a carrier signal as input, analyzes the envelope variation of the carrier signal, and generates a detection signal containing the incoming information. The output of the wave detector 752 is input into an equalizer (EQ) 753 and equalized, and then incoming signal detection is conducted in a comparator or similar detector 754. This process flow is similar to those of the foregoing embodiments described earlier.

The communication apparatus 750 of the present embodiment additionally includes a level information detector 755. The level information detector 755 accepts the output of the wave detector 752 as input, detects the antenna level information contained in the packet transmitted from the transmitter, and provides the detection result to the equalizer (EQ) 753.

On the basis of the antenna level information input from the level information detector 755, the equalizer (EQ) 753 determines the equalizer frequency characteristics to apply during equalization. In other words, the antenna distance is estimated according to the antenna level information (see FIG. 22), the transmission path frequency characteristics are estimated from the antenna distance (see FIG. 21), and equalization processing is executed using equalizer frequency characteristics that are the inverse of the estimated transmission path frequency characteristics. By conducting such equalization processing, optimal equalization (i.e., correction) becomes possible, and accurate signal detection is realized.

Herein, in order for the data receiving communication apparatus 750 to equalize the regular transmit information using optimal equalizer frequency characteristics, it is desirable to acquire the antenna level information and determine the optimal equalization curve before equalization of the regular transmit information is initiated.

Figure 25:
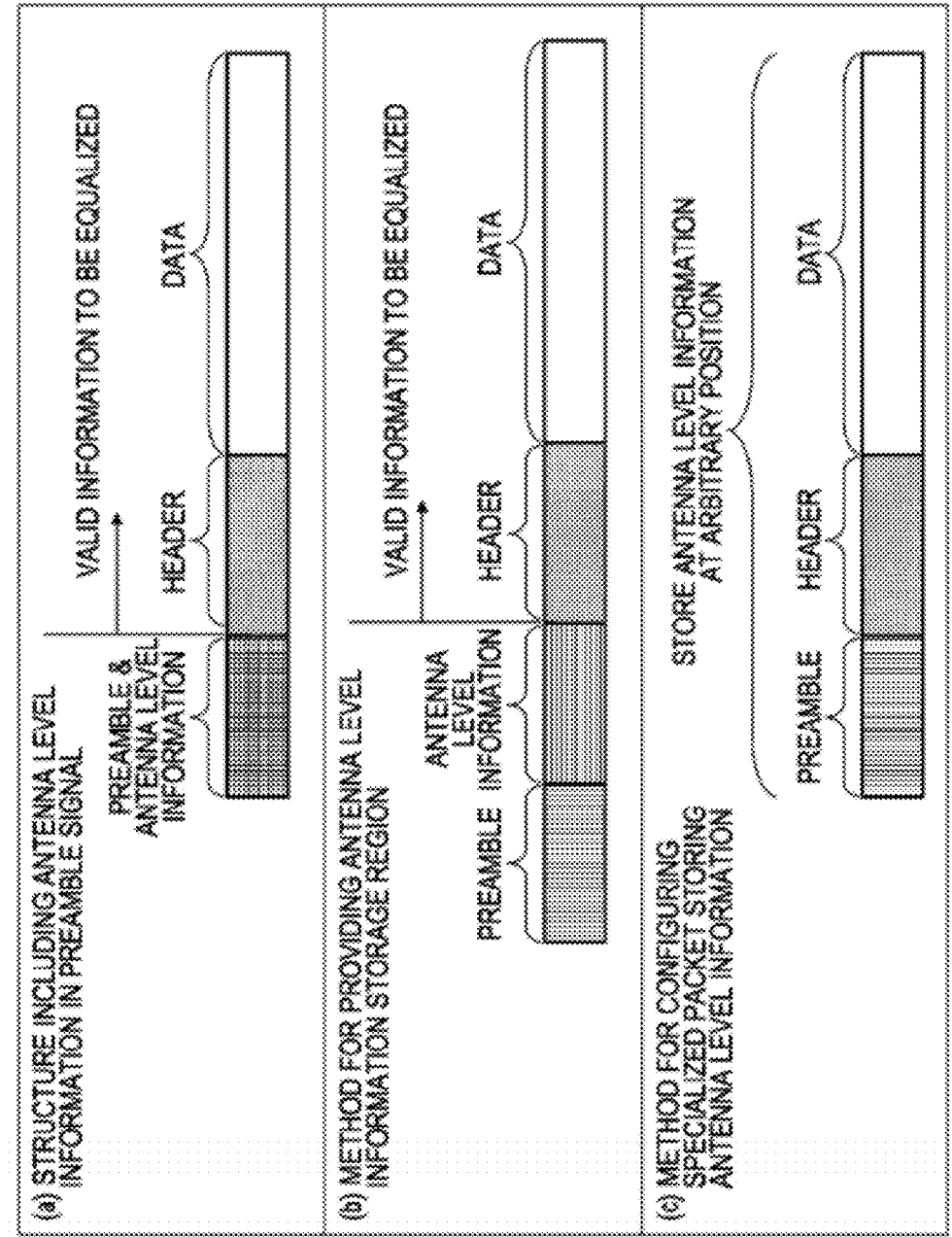
FIG. 25A illustrates an example of storing antenna level information in a packet.
FIG. 25B illustrates an example of storing antenna level information in a packet.
FIG. 25C illustrates an example of storing antenna level information in a packet.

Packet storage examples for storing antenna level information such that the antenna level information is obtained before equalization of the regular transmit information will now be described with reference to FIGS. 25A to 25C. FIGS. 25A to 25C illustrate three types of antenna level information packet storage examples. As described earlier with reference to FIG. 17, a packet herein contains a preamble (or null signal portion), a header, and data.

The preamble is normally made up of a simple pattern such as a single, repeating wavelength, and is used for recognizing that packet reception has started, and for clock synchronization in the receive circuits. The header contains portions such as a synchronization (SYNC) signal used for bit synchronization, a length specifying the packet length, and an error detection (parity) signal with respect to the length. The header is an important part for detecting the packet as a whole. After the above, the transmit information is stored in the data portion. Accurate signal detection is demanded for at least the header and the data portions, while optimal equalization processing is preferably conducted for the data portion.

Consequently, it is desirable to embed the antenna level information in a packet region preceding the header and the data portion. FIGS. 25A and 25B illustrate the following two examples of storing the antenna level information so as to satisfy the above conditions.

(a) Storing the antenna level information in the preamble signal region (b) Defining a region for storing the antenna level information in front of the header information The data transmitting communication apparatus that executes data transmission stores the antenna level information in a packet by means of either configuration (a) or (b) above.

Alternatively, the data transmitting communication apparatus may be configured to use a special-purpose, antenna level information notification packet that differs from an ordinary data packet storing transmit data. In this case, the antenna level information notification packet is transmitted before transmitting the data packet storing the ordinary transmit data. In this case, the antenna level information may be stored in any region constituting the packet, as shown in FIG. 25C.

The packet generator 711 in the communication apparatus 700 shown in FIG. 23 thus generates a packet storing information corresponding to the antenna level information measured by the level measuring unit 710, and in one of the formats shown in FIGS. 25A to 25C.

The packet storing the antenna level information is transmitted from the transmitting apparatus to the receiving apparatus. Herein, the timing whereby the packet storing the antenna level information is transmitted may follow one of the two patterns shown by way of example in FIG. 26.

(1) Storing antenna level information only in advance packet when starting communication (2) Storing antenna level information in all packets Either of the above configurations may be used.

The left side of FIG. 26 illustrates the example wherein the antenna level information is stored only in an advance packet when starting communication. In this example, the antenna level information is stored only in an advance packet when starting communication, and once the transmitting apparatus receives an acknowledgement from the receiving apparatus regarding the packet storing the antenna level information, ordinary data packets are transmitted without storing the antenna level information therein.

The right side of FIG. 26 illustrates the example wherein the antenna level information is stored in all packets. In this example, the antenna level information is stored and transmitted in all of the packets storing the ordinary data.

The transmitting apparatus may generate and transmit packets according to either of the above configurations.

The packet storing the antenna level information and transmitted from the transmitter is input into the level information detector 755 via the antenna 751 and the wave detector 752 of the receiving communication apparatus 750 shown in FIG. 24, and the antenna level information is obtained. The level information detector 755 thus extracts antenna level information from incoming data that has not be equalized. Consequently, the antenna level information is preferably embedded so as to be obtainable from communication data not yet corrected for distortion.

Figure 27:
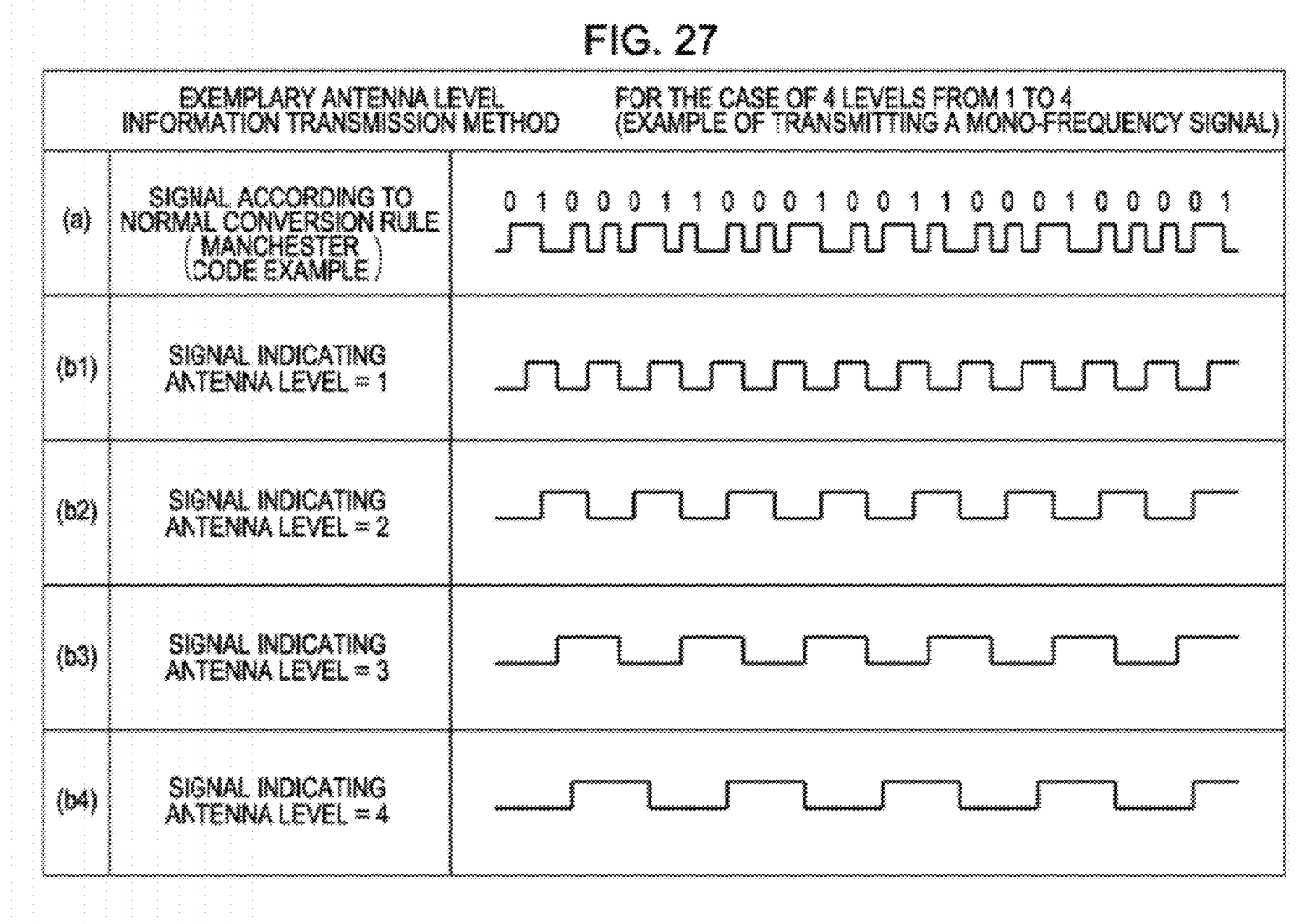

Specific antenna level information storage examples will now be described with reference to FIGS. 27 and 28. FIG. 27 illustrates an example wherein a signal region is set in a format different from the ordinary encoding format, and wherein the antenna level signal storage region is a data region different from the ordinary encoding region.

Consider, for example, the case of using Manchester code for encoding the communication data. Manchester code is an encoding format read by setting specific patterns in a signal (0, 1). For example, a (0, 1) signal like that shown in row (a) of FIG. 27 may be set. Data from the preamble to the data region of the packet is recorded according to Manchester code.

A region having patterns different from the ordinary conversion rules (i.e., Manchester code) is also set. Such patterns may be like those shown in rows (b1) to (b4) of FIG. 27, for example. The signal patterns shown in rows (b1) to (b4) of FIG. 27 are simple repeating patterns of a single frequency, wherein the frequency is changed according to the antenna level. With single frequencies, the fundamental frequency is not affected by the frequency characteristics of the channel, and a repeating waveform at that frequency is reliably achieved. For this reason, correct detection is assured.

The patterns (b1) to (b4) are respectively associated with different antenna level information. For example, the antenna level (i.e., the voltage Va) as measured by the level measuring unit 710 of the communication apparatus 700 shown in FIG. 23 may be subdivided into n ranks (i.e., antenna levels from 1 to n) in the range from Low to High. The signal patterns shown in FIG. 27 may then be associated with these antenna levels from 1 to n. The example shown in FIG. 27 is for the case where n=4, or in other words, the case where the antenna level (i.e., the voltage Va) as measured by the level measuring unit 710 has been subdivided into four ranks:

(b1) antenna level=1,
(b2) antenna level=2,
(b3) antenna level=3, and
(b4) antenna level=4.

The level information detector 755 of the receiving communication apparatus 750 shown in FIG. 24 detects a unique signal pattern region different from that of the ordinary encoded data (i.e., the Manchester code region), and determines whether that unique signal pattern is one of the patterns (b1) to (b4) shown in FIG. 27. By means of this determination, it can be determined which of the four subdivisions from Low to High is exhibited by the antenna level.

The signal patterns (b1) to (b4) shown in FIG. 27 are repeating patterns of respectively different, single frequencies. The level information detector 755 may thus detect which frequency pattern is exhibited from among (b1) to (b4) shown in FIG. 27. Since the fundamental frequency is not affected by the frequency characteristics of the transmission path (i.e., the channel), a repeating waveform at the given frequency is reliably achieved. For this reason, correct detection is assured.

As shown in FIG. 27, the periods of the signal patterns indicating the antenna level information are set longer than the period of Manchester code. In other words, the antenna level information signal patterns are set to be relatively easily readable, even without distortion correction. Although the level information detector 755 obtains the antenna level information from an unprocessed signal not yet subjected to equalization (i.e., distortion correction), it becomes possible to read the antenna level information without error by adopting signal patterns like those shown in FIG. 27.

Figure 28:
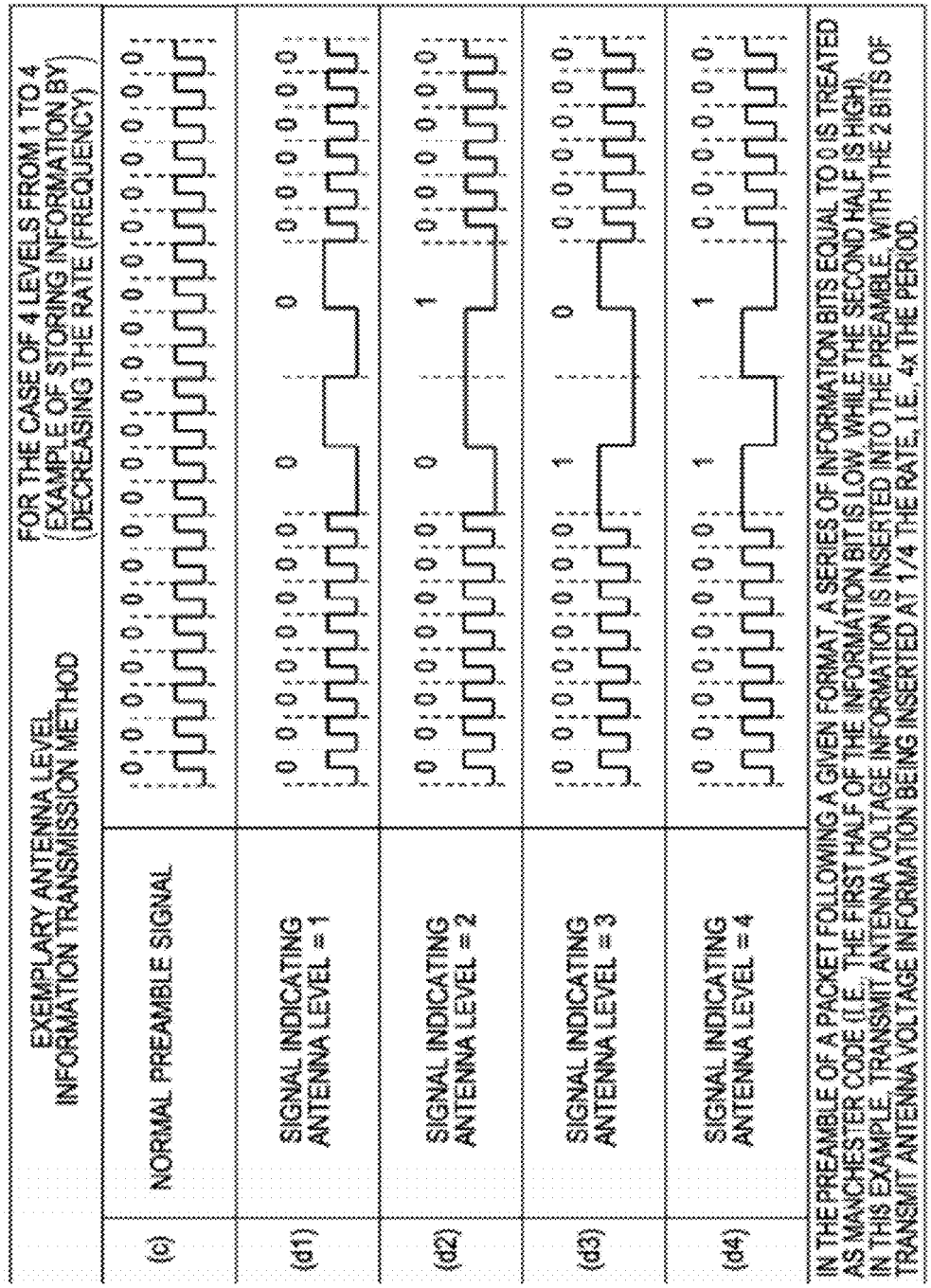
FIG. 28 illustrates a specific example of storing antenna level information.

FIG. 28 illustrates an antenna level information storage example different from the example shown in FIG. 27. In the example shown in FIG. 28, the antenna level information is stored in the preamble region.

In the example shown in FIG. 28, the signal bit encoding (i.e., conversion) format is similar for both the antenna level information (00), (01), (10), and (11), as well as for other data regions, but wherein the antenna level information is set at a rate different from that of the other data regions.

More specifically, the antenna level information is modulated according to the same rules as those of the ordinary information, but at a slower rate. In other words, the interval of variation is lengthened for just the antenna level information, causing the transmission rate to fall. When the transmission rate falls, the band of used frequencies narrows proportionally to the rate. Thus, even if the frequency characteristics vary, that variation occurs within a narrow band. As a respectively, waveform distortion is small, and correction detection can be realized. The above will be later described with reference to FIG. 29.

The preamble region of a packet is normally made up of a simple pattern such as a single, repeating wavelength, and is used for recognizing that packet reception has started, and for clock synchronization in the receive circuits. Normally, a specific pattern is set in common for all packets.

For example, the bit information in the preamble of a packet according to a given format may be set to a series of 0s in Manchester code. This is the pattern shown in row (c) of FIG. 28. As shown in row (c) of FIG. 28, the first half of the information bit is set Low, while the second half is set High.

Into such a preamble region made up of a regular pattern, a unique signal pattern different from the regular pattern is inserted, and this unique signal pattern is taken to be the antenna level signal. Such signal patterns are shown by way of example in rows (d1) to (d4) of FIG. 28. The period (i.e., rate) of the signal patterns shown in rows (d1) to (d4) of FIG. 28 is set differently from that of the regular, Manchester code pattern of the preamble. In the approximate center of each signal pattern (d1) to (d4) in FIG. 28, a signal pattern of longer period than the other signal portions is formed. The period (i.e., the rate) in this region is set to be four times the period of the surrounding data.

These patterns (d1) to (d4) respectively express the two-bit information (00), (01), (10), and (11), and are set as signal patterns indicating four different antenna levels.

For example, the antenna level (i.e., the voltage Va) as measured by the level measuring unit 710 of the communication apparatus 700 shown in FIG. 23 may be subdivided into n ranks (i.e., antenna levels from 1 to n) in the range from Low to High. The signal patterns shown in FIG. 28 may then be associated with these antenna levels from 1 to n. The example shown in FIG. 28 is for the case where n=4, or in other words, the case where the antenna level (i.e., the voltage Va) as measured by the level measuring unit 710 has been subdivided into four ranks:

(d1) antenna level=1,
(d2) antenna level=2,
(d3) antenna level=3, and
(d4) antenna level=4.

The level information detector 755 of the receiving communication apparatus 750 shown in FIG. 24 detects a unique signal pattern region having a different rate from the preamble region, and determines whether that unique signal pattern is one of the patterns (d1) to (d4) shown in FIG. 28. By means of this determination, it can be determined which of the four subdivisions from Low to High is exhibited by the antenna level.

Herein, the period in the antenna level information region shown in FIG. 28 is set longer than the period of the other, regular signal. In other words, a low frequency is set. This is similar to the signal storage example of FIG. 27 described earlier. By setting a low frequency in this way, signal reading becomes easier without performing equalization.

Figure 29:
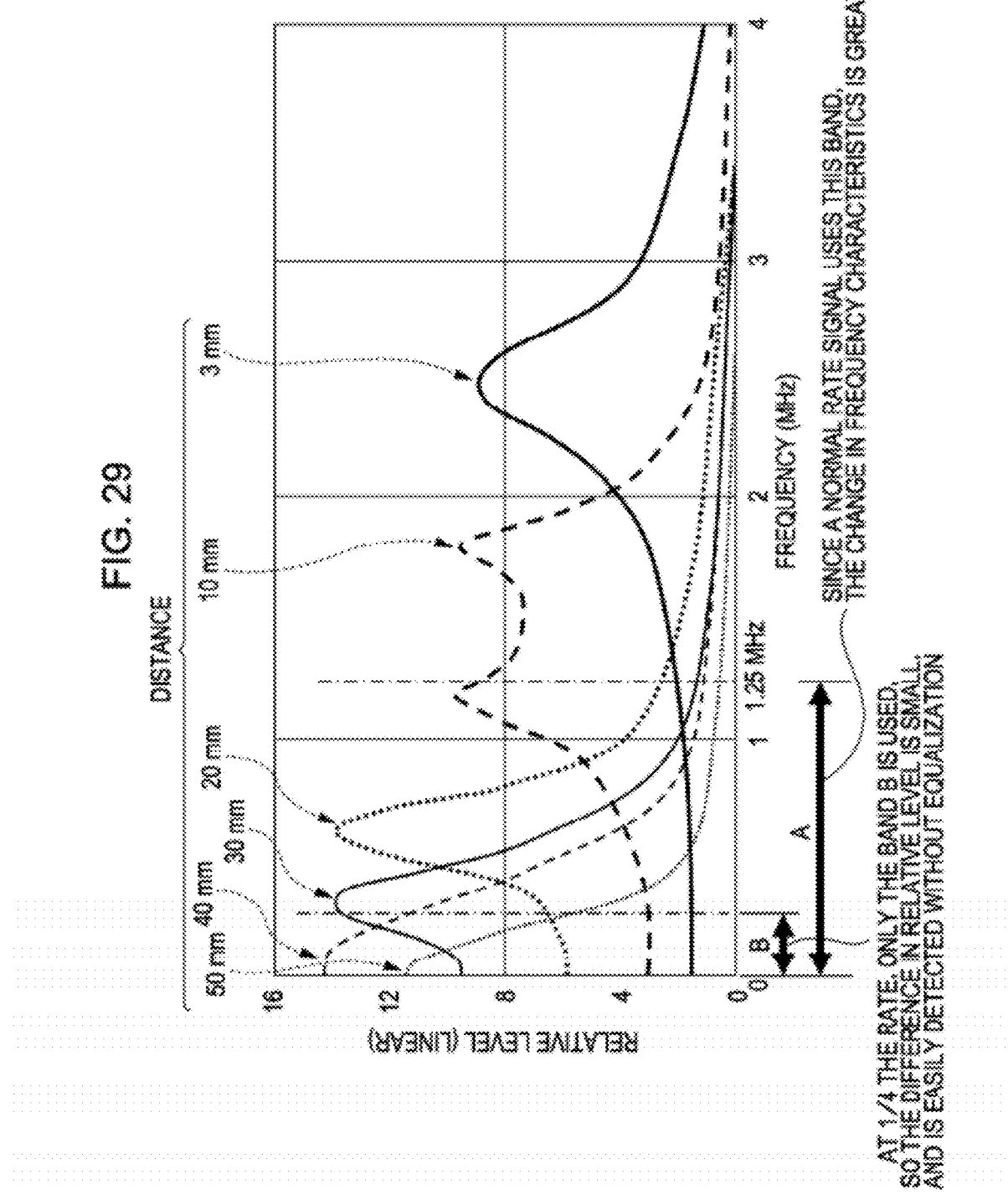
FIG. 29 illustrates frequencies in the antenna level information storage area.

The reason for the easier signal reading will now be explained with reference to FIG. 29. The graph shown in FIG. 29 illustrates the baseband signal (i.e., post-detection signal) frequency characteristics of a baseband signal, similar to that described earlier with reference to FIG. 21. As described earlier, the characteristics differ according to the antenna distance.

If the frequency with the shortest repeating wavelength used in ordinary data transmission is taken to be 1.25 MHz, then the band used for ordinary data transmission becomes the band A from 0 MHz to 1.25 MHz. In this band, signal level variation is large for all antenna distances, and accurate signal detection is difficult without correction (i.e., without conducting equalization processing).

However, in the embedding region for the antenna level information shown by way of example in FIG. 28, the period (i.e., rate) is four times that of the regular data of the preamble, as described earlier. If the regular data of the preamble corresponds to 1.25 MHz, then the frequency region corresponding to four times the period (i.e., rate) becomes the region of the band B shown in FIG. 29. In the region of this band B, signal level variation is small for all antenna distances, and accurate signal detection is comparatively easy, even without correction (i.e., even without conducting equalization processing).

Thus, although the level information detector 755 of the receiving communication apparatus 750 shown in FIG. 24 detects antenna level information from a signal that has not been equalized, the signal to be detected by the level information detector 755 is in a comparatively stable frequency region, which enables the reading of accurate antenna level information.

Although the examples shown in FIGS. 27 and 28 are both herein described as subdividing the antenna level into four ranks, it should be appreciated that the antenna level is not limited to four ranks, and that it is possible to define the signal using an arbitrary number of ranks n (where n is an integer not less than 2). For example, while two bits are used to store a four-pattern signal in the example shown in FIG. 28, it is also possible to use a three-bit signal to define eight ranks If larger numbers of bits are set, it becomes possible to define a great variety of subdivision information.

A specific example of the configuration and processing in a receiving apparatus that receives and equalizes antenna level information will now be described with reference to FIGS. 30 to 33. The basic configuration of the data receiver is as described earlier with reference to FIG. 24. In the communication apparatus 750 shown in FIG. 24, the output of the wave detector 752 is input into the level information detector 755, where the antenna level information contained in a packet transmitted from a transmitter is detected and then provided to the equalizer (EQ) 753. On the basis of the antenna level information input from the level information detector 755, the equalizer (EQ) 753 determines the equalizer frequency characteristics to apply during equalization. Hereinafter, a specific configuration and processing example will be described for such equalization processing.

Figure 30:
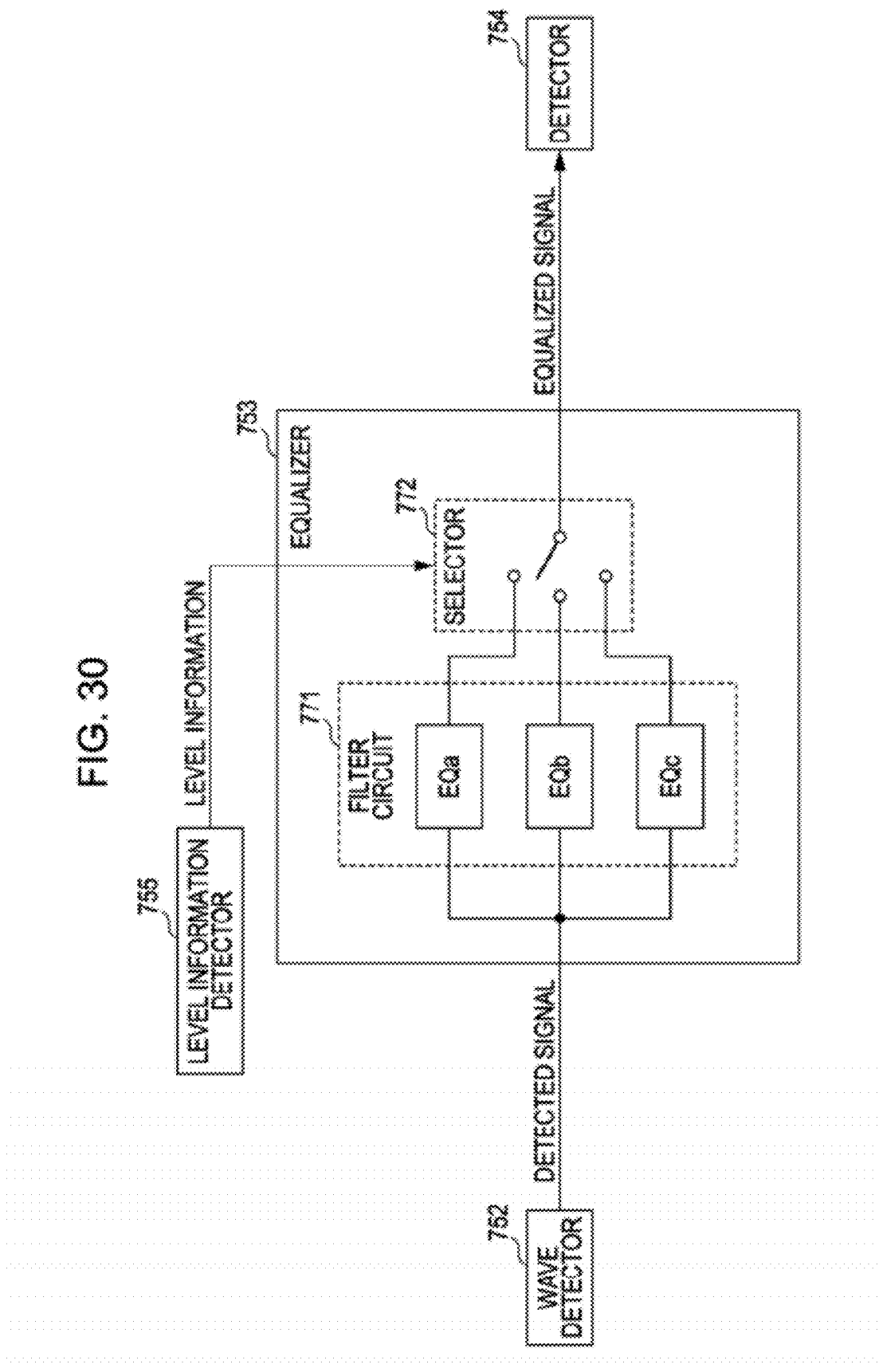
FIG. 30 illustrates a configuration of and specific processing example for a receive apparatus that receives and equalizes antenna level information.

FIG. 30 illustrates a specific, exemplary configuration of the equalizer 753. The equalizer 753 includes a filter circuit 771 and a selector 772. The filter circuit 771 includes equalizers (EQa) to (EQc) that conduct three different equalization processes. These equalizers are similar to the three equalizers in the fifth embodiment described earlier with reference to FIG. 14, and each conducts different distortion correction.

In other words, the three equalizers (EQa) to (EQc) in the filter circuit 771 execute equalization processing using correction characteristics (i.e., equalization curves) corresponding to the graphs (b1) to (b3) described earlier with reference to FIG. 15.

As described earlier with reference to FIG. 21, the baseband frequency characteristics vary greatly and complexly according to distance. However, these frequency characteristics can be roughly classified into three types. These three categories can be expressed as follows using the frequencies 1T, 2T, and DC shown in FIG. 21, where 1T=the frequency with the shortest repeating wavelength (referred to as 1T, since the wavelength varies every clock), 2T=a frequency double the length of 1T (referred to as 2T, since the wavelength varies every two clocks), and DC=the zero frequency.

For example, consider a transmission system where 1T is 1.25 MHz, 2T is 0.625 MHz, and DC is 0 MHz. In this case, the relationships among the magnitudes of the DC, 2T, and 1T amplitudes in the baseband frequency characteristics can be divided into the following three patterns. These three patterns correspond to the graphs (b1) to (b3) shown in FIG. 15B.

(b1) DC>2T>1T=monotonically decreasing (i.e., a falling curve)
(b2) DC<2T>1T=central spike (i.e., a peaked curve)
(b3) DC<2T<1T=monotonically increasing (i.e., a rising curve)

The curves illustrated using broken lines in graphs (b1) to (b3) of FIG. 15B express the relationship between the frequency and the incoming signal level with respect to various antenna distances (i.e., different coupling coefficients k).

As FIG. 21 demonstrates, the respective relationships between the frequency characteristics and antenna distances in (b1) to (b3) are approximately as follows.

(b1) Monotonically decreasing (i.e., a falling curve)
DC>2T>1T=antenna distances of 50 mm, 40 mm, 30 mm
(b2) Central spike (i.e., a peaked curve)
DC<2T>1T=antenna distance of 20 mm
(b3) Monotonically increasing (i.e., a rising curve)
DC<2T<1T=antenna distances of 10 mm, 3 mm In order to equalize the three patterns of signals having the above frequency characteristics with respect to the antenna distance, it is desirable to apply respective equalizer frequency characteristics that are the inverse of the above three patterns. This corresponds to the frequency characteristics indicated by the solid lines in graphs (b1) to (b3) of FIG. 15B and described earlier.

In other words, it is desirable to conduct equalization processing that applies the equalizer frequency characteristics like the following.

(b1) For antenna distances of 50 mm, 40 mm, and 30 mm,
equalizer frequency characteristics=DC<2T<1T
(b2) For an antenna distance of 20 mm,
equalizer frequency characteristics=DC>2T<1T
(b3) For antenna distances of 10 mm and 3 mm,
equalizer frequency characteristics=DC>2T>1T The three equalizers (EQa) to (EQc) in the filter circuit 771 shown in FIG. 30 each execute equalization processing using the above equalizer frequency characteristics (b1) to (b3), respectively, and then output the equalization results to the selector 772. In other words, (1) the equalizer (EQa) executes equalization processing using
(b1) equalizer frequency characteristics=DC<2T<1T
and applied to antenna distances of 50 mm, 40 mm, and 30 mm;
(2) the equalizer (EQb) executes equalization processing using
(b2) equalizer frequency characteristics=DC>2T<1T
and applied to an antenna distance of 20 mm; and
(3) the equalizer (EQc) executes equalization processing using
(b3) equalizer frequency characteristics=DC>2T>1T
and applied to antenna distances of 10 mm and 3 mm.

Equalization processing is executed in the above three configurations, and the respective equalization results are output to the selector 772.

On the basis of the antenna level information input from the level information detector 755, the selector 772 selects and outputs one from among the inputs received from the three equalizers (EQa) to (EQc).

More specifically, the level information detector 755 inputs n ranks of antenna level information from Low to High, as described earlier by way of example and with reference to FIGS. 27 and 28. The selector 772 then re-divides the antenna level information into three levels. For example, the selector 772 may re-divide the antenna level information into the three levels of High, Middle, and Low, as shown in FIG. 31.

Figure 31:
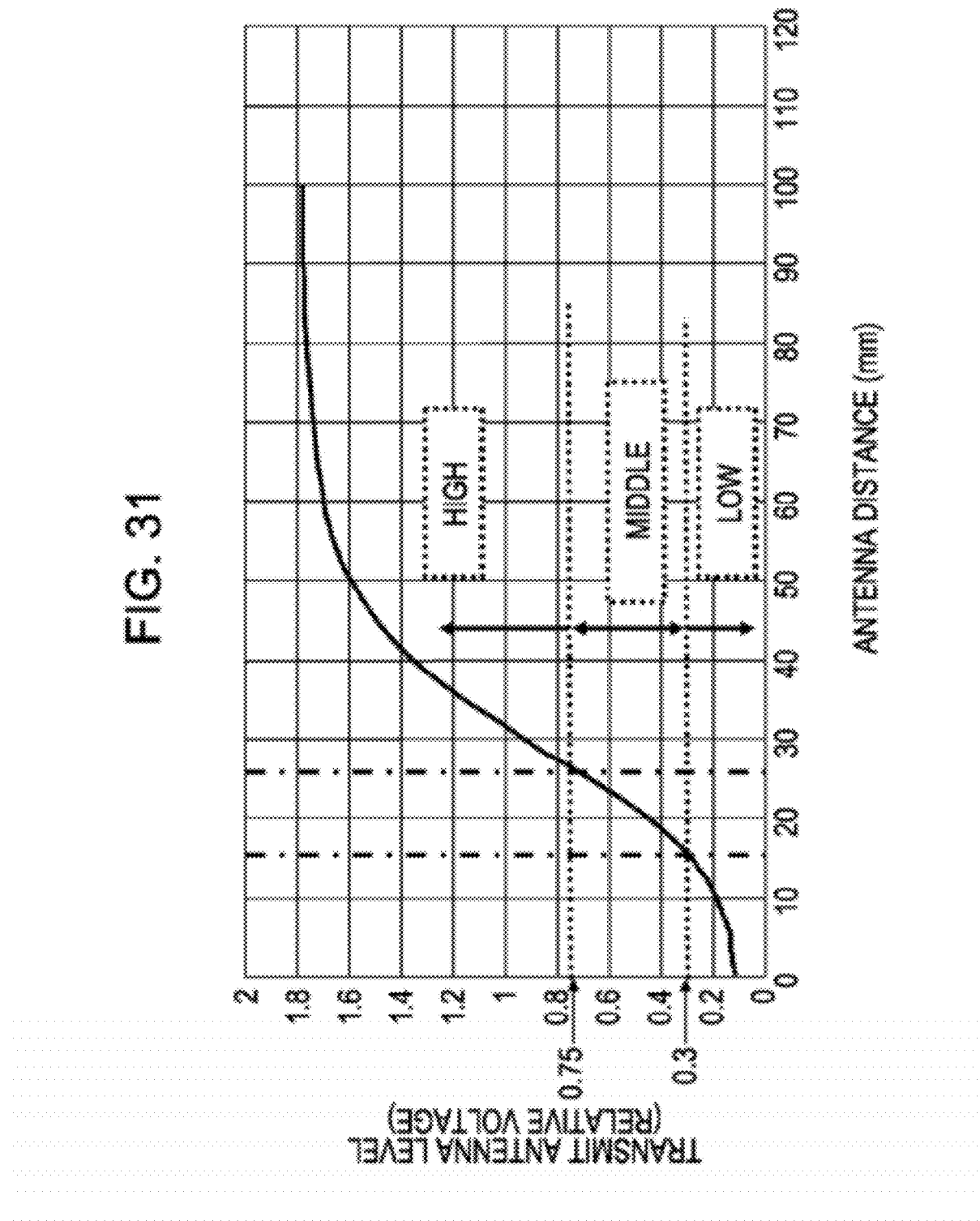
FIG. 31 illustrates an example of segmenting antenna level information.

The graph illustrated in FIG. 31 is similar to the graph described earlier with reference to FIG. 22, with the horizontal axis representing the distance between the transmitter and receiver antennas, and the vertical axis representing the transmit antenna level (in relative voltage) at the transmitter. The High, Middle, and Low regions are divided according to the transmit antenna level (in relative voltage) as follows:

High=0.75 or greater,
Middle=0.3 to 0.75, and
Low=0.3 or less.

On the basis of settings like the above, the selector 772 conducts selection processing as follows.

(Case 1)
When the antenna level information input from the level information detector 755 is High (i.e., 0.75 or greater), the antenna level corresponds to an antenna distance of 50 mm, 40 mm, or 30 mm. Consequently, the equalization results of the equalizer (EQa) are selected. In other words, equalizer frequency characteristics where DC<2T<1T are selected.

(Case 2)
When the antenna level information input from the level information detector 755 is Middle (i.e., between 0.3 and 0.75), the antenna level corresponds to an antenna distance of 20 mm. Consequently, the equalization results of the equalizer (EQb) are selected. In other words, equalizer frequency characteristics where DC<2T>1T are selected.

(Case 3)
When the antenna level information input from the level information detector 755 is Low (i.e., 0.3 or less), the antenna level corresponds to an antenna distance of 10 mm or 3 mm. Consequently, the equalization results of the equalizer (EQc) are selected. In other words, equalizer frequency characteristics where DC>2T>1T are selected.

The equalizer 753 shown in FIG. 30 executes processing to select an equalization result according to the antenna level as above. As a result, optimally-equalized results are generated in the equalizer (EQ) 753. The frequency characteristics used for the optimal equalization are the approximate inverse of the frequency characteristics of the transmission path, having been selected according to the distance between the transmitter and receiver antennas. The equalization results are output to the downstream detector 754, and high-precision signal detection is realized.

Figure 32:
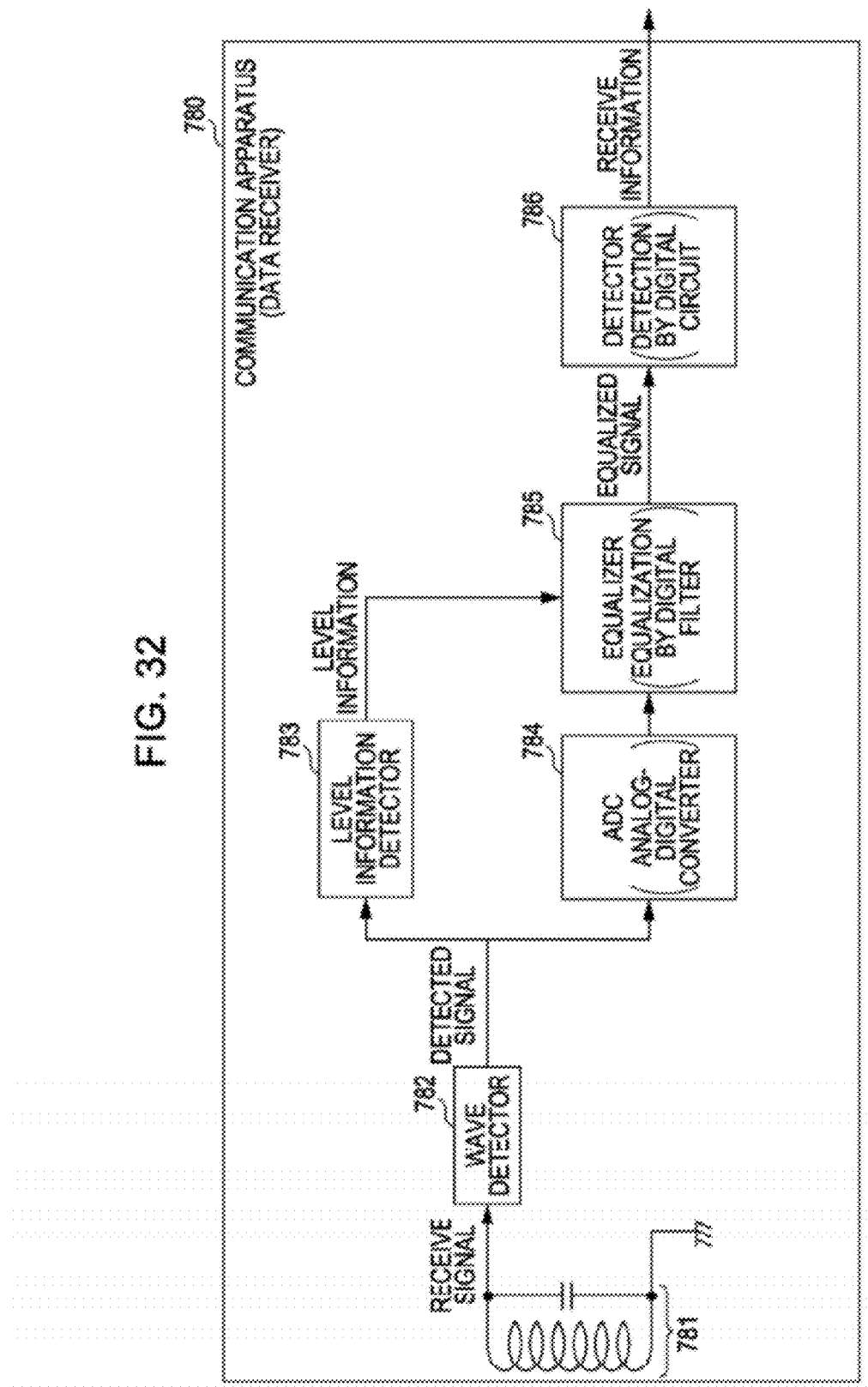
FIG. 32 illustrates an exemplary configuration of a communication apparatus having an equalizer that implements a digital filter.

FIG. 32 illustrates an exemplary configuration of a communication apparatus to which a digital filter has been applied, the apparatus having an equalizer that conducts equalization processing using digital signals. In the communication apparatus 780 shown in FIG. 32, an incoming signal from the receive antenna 781 is input into a wave detector 782, and the detection signal generated in the wave detector 782 is then input into a level information detector 783 and an analog-to-digital converter (ADC) 784.

The processing executed in the level information detector 783 is similar to that of the level information detector described with reference to FIG. 24. The level information detector 783 accepts the output of the wave detector 782 as input, detects antenna level information contained in a packet transmitted from the transmitter, and provides the detection result to an equalizer 785.

The analog-to-digital converter (ADC) 784 executes analog-to-digital conversion with respect to the detection signal to generate a digital version of the detection signal, which is then input into the equalizer 785.

The equalizer 785 executes equalization processing using a digital filter. The equalizer 785 may be realized in a configuration using a finite impulse response (FIR) filter, for example.

Figure 33:
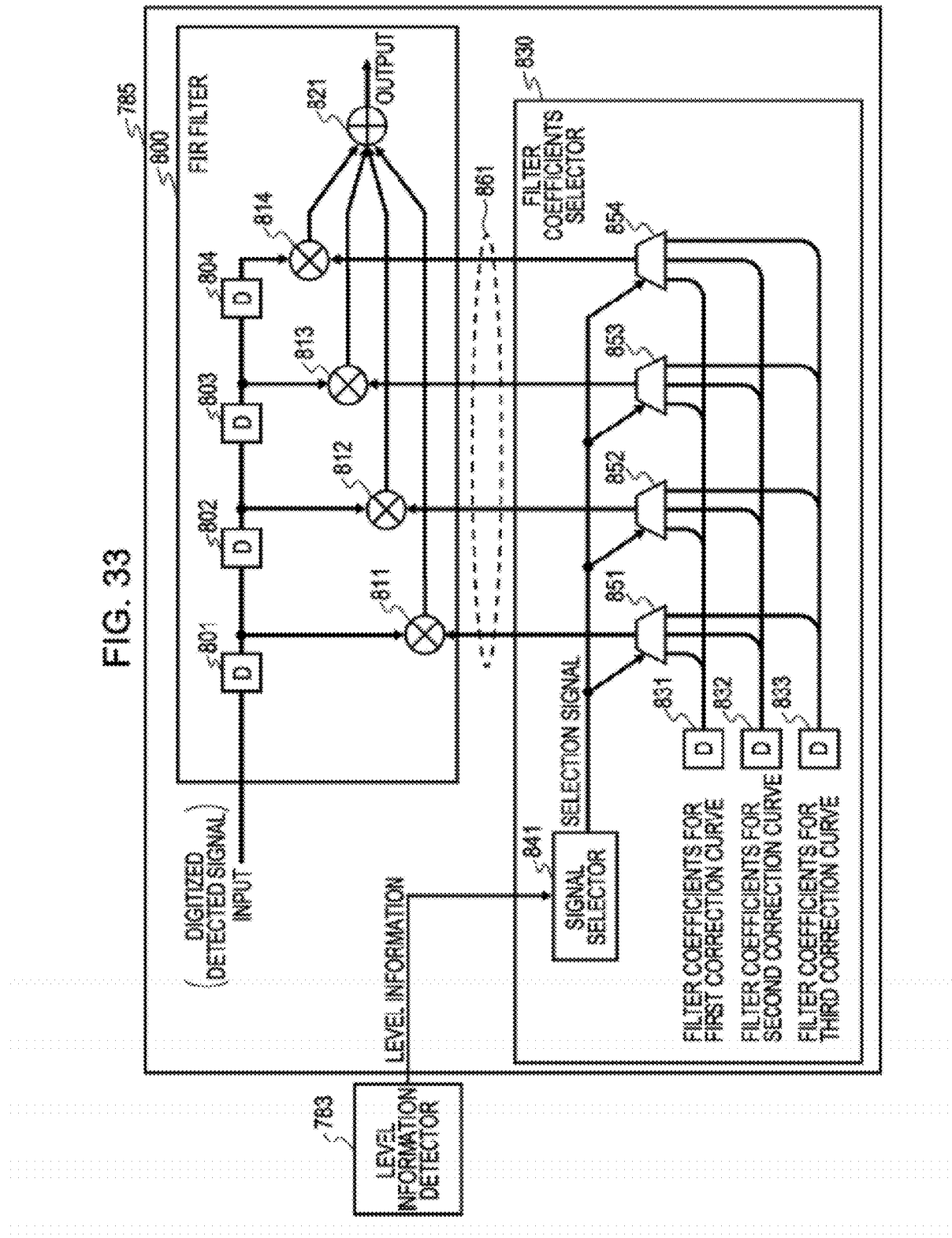
FIG. 33 illustrates an exemplary configuration of an equalizer implementing a digital filter.

A detailed exemplary configuration of the equalizer 785 in the present embodiment is illustrated in FIG. 33. As shown in FIG. 33, the equalizer 785 includes an FIR filter 800 and a filter coefficients selector 830. The FIR filter 800 accepts the digital version of the detection signal as input in 1-bit units, and includes: delay elements 801 to 804 that delay output by one clock; multipliers 811 to 814 that multiply the output of the delay elements 801 to 804 by filter coefficients 861; and an adder 821 that adds together the multiplier outputs. This configuration is similar to that of a typical FIR filter of the related art.

The filter coefficients selector 830 determines the filter coefficients 861 to be supplied to the multipliers 811 to 814 according to the antenna level information input from the level information detector 783.

Filter coefficients are successively input into filter coefficients input units 831 to 833. The filter coefficients herein correspond to first through third correction curves, and are used to conduct equalization processing similar to that respectively conducted by the three equalizers (EQa) to (EQc) in the filter circuit 771 described with reference to FIG. 30. These filter coefficients are stored in memory within the communication apparatus in advance.

More specifically, the filter coefficients retrieved from memory and successively input into the filter coefficients input unit 831 to 833 are the filter coefficients used to execute the three types of equalization processing described earlier with reference to graphs (b1) to (b3) shown in FIG. 15B. In other words, the filter coefficients input unit 831 for the first correction curve accepts filter coefficients for executing correction (i.e., equalization) using equalizer frequency characteristics such that DC<2T<1T, which are applied to antenna distances of 50 mm, 40 mm, and 30 mm;

the filter coefficients input unit 832 for the second correction curve accepts filter coefficients for executing correction (i.e., equalization) using equalizer frequency characteristics such that DC>2T<1T, which are applied to an antenna distance of 20 mm; and the filter coefficients input unit 833 for the third correction curve accepts filter coefficients for executing correction (i.e., equalization) using equalizer frequency characteristics such that DC>2T>1T, which are applied to antenna distances of 10 mm and 3 mm.

The filter coefficients input into the filter coefficients input units 831 to 833 are output to selectors 851 to 854. According to a selection signal output by a signal selector 841, the selectors 851 to 854 each select one set of filter coefficients from among those configured by the filter coefficients input units 831 to 833, and output the selected set of filter coefficients to the multipliers 811 to 814 in the FIR filter 800.

The signal selector 841 outputs selection signals according to the antenna level information input from the level information detector 783. More specifically, the level information detector 783 may, for example, input n ranks of antenna level information into the signal selector 841, as described earlier with reference to FIGS. 27 and 28. The signal selector 841 then re-divides the n ranks of antenna level information into a number of levels according to the number of sets of filter coefficients (three, in the present example) used in the equalizer 785. For example, the signal selector 841 may re-divide the antenna level information into the three levels of High, Middle, and Low, as shown in FIG. 31.

Similarly to that described earlier with reference to FIG. 31, the case will be described wherein the following levels are set:

High=0.75 or greater,
Middle=0.3 to 0.75, and
Low=0.3 or less.

In this case, the signal selector 841 conducts selection processing like the following.

(Case 1)

When the antenna level information input from the level information detector 783 is High (i.e., 0.75 or greater), the antenna level corresponds to an antenna distance of 50 mm, 40 mm, or 30 mm. Consequently, the signal selector 841 outputs a selection signal selecting the filter coefficients set by the filter coefficients input unit 831 for the first correction curve, such that equalization is executed using equalizer frequency characteristics where DC<2T<1T.

(Case 2)

When the antenna level information input from the level information detector 783 is Middle (i.e., between 0.3 and 0.75), the antenna level corresponds to an antenna distance of 20 mm. Consequently, the signal selector 841 outputs a selection signal selecting the filter coefficients set by the filter coefficients input unit 832 for the second correction curve, such that equalization is executed using equalizer frequency characteristics where DC<2T>1T.

(Case 3)

When the antenna level information input from the level information detector 783 is Low (i.e., 0.3 or less), the antenna level corresponds to an antenna distance of 10 mm or 3 mm. Consequently, the signal selector 841 outputs a selection signal selecting the filter coefficients set by the filter coefficients input unit 833 for the third correction curve, such that equalization is executed using equalizer frequency characteristics where DC>2T>1T.

In this way, the FIR filter 800 conducts filtering by applying filter coefficients set according to the antenna level. As a result, optimal equalization is performed using frequency characteristics that are the approximate inverse of the frequency characteristics of the transmission path, having been selected according to the distance between the transmitter and receiver antennas. The equalization results thus generated in the equalizer 785 is output to a downstream detector 786, and high-precision signal detection is realized.

The present embodiment differs from the configuration shown in FIG. 30 and earlier described, and has the merit of being realized without making the filter hardware more complex, as the present embodiment simply involves the addition of a register for storing filter coefficients and a signal selector. Also, the number of sets of filter coefficients stored in memory is not limited to the three sets described above, and an arbitrary n sets, such as four or more, may be prepared in advance and stored in memory. By thus allowing for selective use of a great variety of filter coefficients in this way, optimal correction processing for a variety of characteristics becomes possible.

The foregoing thus describes the present invention in detail and with reference to particular embodiments thereof. However, it should be appreciated as obvious to those skilled in the art that modifications and substitutions of the foregoing exemplary embodiments may be made without departing from the spirit and scope of the present invention. In other words, the foregoing discloses the present invention by means of examples, and is not to be interpreted as being limiting. The scope of the present invention is to be determined in conjunction with the attached claims.

In addition, it is possible to execute the series of processes described in the present specification by means of hardware, software, or a compound configuration of both hardware and software. In the case of execution by means of software, a program stating a processing sequence may be installed and executed in the memory of a computer built into special-purpose hardware. Alternatively, the program may be installed and executed on a general-purpose computer capable of executing various processing.

It should be understood that various changes and modifications to the presently preferred embodiments described herein will be apparent to those skilled in the art. Such changes and modifications can be made without departing from the spirit and scope of the present subject matter and The invention is claimed as follows:

1. A communication apparatus comprising:
a signal detector configured to execute processing to detect incoming information from a signal received wirelessly;
wherein the signal detector includes:
a wave detector configured to accept as input an incoming signal wherein incoming information has been modulated onto a carrier signal, to analyze the envelope variation of the incoming signal, and to generate a detection signal containing the incoming information,
an equalizer configured to execute correction processing with respect to the detection signal and to output a corrected detection signal
a detector configured to accept as input the corrected detection signal generated by the equalizer, and to detect incoming information therefrom; and
a level information detector configured to extract, from the incoming signal, transmit antenna level information indicating the voltage of the transmit antenna as measured at the data transmitting apparatus, and then output the extracted antenna level information to the equalizer;
wherein the equalizer determines the optimal equalization characteristics according to the antenna level information, and outputs an equalization result in accordance with the optimal equalization characteristics.

2. The communication apparatus according to claim 1, wherein the equalizer is configured to execute processing for correcting distortion contained in the detection signal, and is configured to execute processing for correcting distortion produced with respect to the incoming signal along the wireless communication path.

3. The communication apparatus according to claim 2, wherein the equalizer is configured to revert the incoming signal back to its original state by applying a filter whose characteristics are the inverse of those of the distortion produced with respect to the incoming signal along the wireless communication path.

4. The communication apparatus according to claim 1, further comprising:
an analog-to-digital converter configured to generate a digital signal by digitally converting the detection signal generated by the wave detector;
wherein the equalizer accepts the digital signal as input, generates a corrected digital signal by means of digital signal processing, and outputs the corrected digital signal to the detector.

5. The communication apparatus according to claim 4, wherein the equalizer includes an adaptive equalizer configuration that executes different equalization processing according to the distortion in the input signal with respect to the equalizer.

6. The communication apparatus according to claim 1, wherein the equalizer analyzes the optimal equalization characteristics with respect to the characteristics of the incoming signal, and executes equalization processing according to the analysis result.

7. The communication apparatus according to claim 1, wherein the equalizer determines the optimal equalization characteristics to be frequency characteristics that are the approximate inverse of the frequency characteristics of the transmission path as estimated according to the antenna level information.

8. The communication apparatus according to claim 1, wherein the equalizer includes:
a plurality of equalizers configured to execute equalization processing in accordance with a plurality of different equalization characteristics, and
a selector configured to accept the antenna level information as input, and selectively output one equalization result from among the equalization results of the plurality of equalizers,
and wherein
the selector selectively outputs the equalization result of the equalizer that executed equalization processing using frequency characteristics that are the approximate inverse of the frequency characteristics of the transmission path as estimated according to the antenna level information.

9. The communication apparatus according to claim 1, further comprising:
an analog-to-digital converter configured to generate a digital signal by digitally converting the detection signal generated by the wave detector;
wherein the equalizer includes:
a filter configured to accept the digital signal as input, filter the digital signal by applying filter coefficients and thereby generate a corrected digital signal, and then output the corrected digital signal to the detector, and
a filter coefficients selector configured to select a set of filter coefficients from among a plurality of sets of filter coefficients configured for the filter in advance, and then output the selected set of filter coefficients to the filter,
and wherein a set of filter coefficients is selected by the filter coefficients selector such that equalization processing is executed using frequency characteristics that are the approximate inverse of the frequency characteristics of the transmission path as estimated according to the antenna level information.

10. The communication apparatus according to claim 9, wherein the filter is a finite impulse response filter.

11. The communication apparatus according to claim 1, wherein the incoming signal has been modulated by means of amplitude shift keying.

12. A communication apparatus comprising:
a signal detector configured to execute processing to detect incoming information from a signal received wirelessly;
wherein the signal detector includes:
a wave detector configured to accept as input an incoming signal wherein incoming information has been modulated onto a carrier signal, to analyze the envelope variation of the incoming signal, and to generate a detection signal containing the incoming information,
an equalizer configured to execute correction processing with respect to the detection signal and to output a corrected detection signal
a detector configured to accept as input the corrected detection signal generated by the equalizer, and to detect incoming information therefrom,
wherein the equalizer is made up of a plurality of equalizers configured to execute processing in accordance with different equalization characteristics, and further includes a selector configured to select the optimal equalization result according to the characteristics of the incoming signal from among the outputs of the plurality of equalizers, and output the selected result to the detector;

a header detector configured to analyze headers contained in the plurality of equalization results output from the plurality of equalizers; and a signal selector configured to select the equalizer output to be input into the detector, according to the analysis result of the header detector;

wherein the header detector detects at least one of either the synchronization (SYNC) information or the error rate in the headers, and according to the detection result of the header detector, the signal selector selects one equalizer that output an optimal equalization result from among the plurality of equalizers, and according to the selection result, selects the equalization output to be input into the detector.

13. A signal processing method whereby incoming information is detected in a communication apparatus, the method comprising:

detecting incoming information from a signal received wirelessly;

accepting as input an incoming signal where incoming information has been modulated onto a carrier signal, analyzing the envelope variation of the incoming signal, and generating a detection signal containing the incoming information;

equalizing the detection signal and outputting a corrected detection signal;

detecting incoming information from the corrected detection signal generated in the equalizing step;

extracting, from the incoming signal, transmit antenna level information indicating the voltage of a transmit antenna, and outputting the extracted antenna level information; and determining the optimal equalization characteristics according to the antenna level information, and outputting an equalization result in accordance with the optimal equalization characteristics.

* * * * *